US012633784B2

(12) United States Patent
Kim et al.

(10) Patent No.: US 12,633,784 B2
(45) Date of Patent: May 19, 2026

(54) ELECTRONIC DEVICE DISPLAYING INFORMATION GUIDING ALIGNMENT WITH CHARGING DEVICE

(71) Applicant: SAMSUNG ELECTRONICS CO., LTD., Suwon-si (KR)

(72) Inventors: Hyunjoo Kim, Suwon-si (KR); Jinki Jung, Suwon-si (KR); Mingi Song, Suwon-si (KR); Junseok Yang, Suwon-si (KR); Yongsang Yun, Suwon-si (KR); Minyoung Chang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 714 days.

(21) Appl. No.: 18/086,641

(22) Filed: Dec. 22, 2022

(65) Prior Publication Data

US 2023/0163644 A1     May 25, 2023

Related U.S. Application Data

(63) Continuation of application No. PCT/KR2022/017119, filed on Nov. 3, 2022.

(30) Foreign Application Priority Data

Nov. 3, 2021     (KR) ........................ 10-2021-0149479
Nov. 3, 2022     (KR) ........................ 10-2022-0145054

(51) Int. Cl.
*H02J 50/90*          (2016.01)
*G06F 1/16*           (2006.01)
(Continued)

(52) U.S. Cl.
CPC .............. *H02J 50/90* (2016.02); *G06F 1/163* (2013.01); *G06F 1/1652* (2013.01);
(Continued)

(58) Field of Classification Search
CPC ....................................................... H02J 50/90
(Continued)

(56) References Cited

U.S. PATENT DOCUMENTS 9,921,736 B2      3/2018  Seo et al.
10,500,964 B2    12/2019  Ichikawa
(Continued)

FOREIGN PATENT DOCUMENTS

KR      10-2013-0069066 A     6/2013
KR           101511271 B1     4/2015
(Continued)

OTHER PUBLICATIONS

International Search Report mailed Feb. 13, 2023 for PCT/KR2022/017119.
(Continued)

*Primary Examiner* — Ahmed H Omar
(74) *Attorney, Agent, or Firm* — CANTOR COLBURN LLP

(57)          ABSTRACT

A method includes receiving a wireless signal at an electronic device from an external electronic device. The method further includes determining whether the wireless signal indicates that power provided by the external electronic device to the electronic device satisfies a threshold. The method further includes, responsive to determining that the power provided by the external electronic device to the electronic device fails to satisfy the threshold, determining a state of the electronic device. The method further includes, responsive to determining the state of the electronic device, displaying a screen based on the state of the electronic device.

20 Claims, 28 Drawing Sheets

(51) Int. Cl.
    *H02J 7/00*             (2006.01)
    *H02J 50/80*          (2016.01)

(52) U.S. Cl.
    CPC .......... *H02J 7/00034* (2020.01); *H02J 50/80*
               (2016.02); *G06F 1/1616* (2013.01)

(58) Field of Classification Search
    USPC ......................................................... 320/108
    See application file for complete search history.

(56)               References Cited

U.S. PATENT DOCUMENTS

| | | | |
|---|---|---|---|
| 2014/0015493 A1 | 1/2014 | Wirz et al. | |
| 2014/0253029 A1 | 9/2014 | Uchida et al. | |
| 2018/0052649 A1 | 2/2018 | Patel | |
| 2018/0287413 A1 | 10/2018 | Jung | |
| 2018/0323660 A1* | 11/2018 | Lee | H02J 50/12 |
| 2020/0373784 A1 | 11/2020 | Yun et al. | |
| 2021/0313844 A1 | 10/2021 | Kim et al. | |
| 2022/0085662 A1 | 3/2022 | Narayana Bhat et al. | |
| 2022/0187871 A1* | 6/2022 | Yamazaki | G09G 5/36 |
| 2022/0286541 A1 | 9/2022 | Lee et al. | |

FOREIGN PATENT DOCUMENTS

| | | |
|---|---|---|
| KR | 10-2017-0041389 A | 4/2017 |
| KR | 20170068307 A | 6/2017 |
| KR | 10-1973148 B1 | 8/2019 |
| KR | 10-2056191 B1 | 12/2019 |
| KR | 10-2020-0002686 A | 1/2020 |
| KR | 10-2020-0028729 A | 3/2020 |
| KR | 20210036185 A | 4/2021 |
| KR | 10-2021-0064616 A | 6/2021 |
| KR | 20210110360 A | 9/2021 |
| WO | 2013/069089 A1 | 5/2013 |

OTHER PUBLICATIONS

International Search Report mailed Sep. 2, 2022 for PCT/KR2022/007615.

* cited by examiner

100

502

IDENTIFY THAT ELECTRONIC DEVICE IS
MOUNTED ON EXTERNAL
ELECTRONIC DEVICE

504

ELECTRONIC DEVICE
ALIGNED WITH EXTERNAL
ELECTRONIC DEVICE?

YES

NO

506

DISPLAY SCREEN INCLUDING
INFORMATION GUIDING
ELECTRONIC DEVICE
TO BE ALIGNED WITH
THE EXTERNAL ELECTRONIC DEVICE

508

DISPLAY SCREEN INCLUDING
INFORMATION GUIDING THAT
BATTERY IS BEING CHARGED

Check alignment

Make sure the center part of the back of your phone which marked below is aligned with the center of the charger.

RECEIVE FIRST WIRELESS SIGNAL ~ 802

TRANSMIT RESPONSE SIGNAL TO FIRST WIRELESS SIGNAL ~ 804

TRANSMIT CONFIGURATION INFORMATION ~ 806

RECEIVE SECOND WIRELESS SIGNAL ~ 808

EMIT FIRST SIGNAL THROUGH
UWB COMMUNICATION CIRCUITRY 902

RECEIVE SECOND SIGNAL THROUGH
UWB COMMUNICATION CIRCUITRY 904

IDENTIFY RELATIVE LOCATION RELATIONSHIP
BASED ON FIRST SIGNAL AND SECOND SIGNAL 906

DISPLAY FIRST SCREEN OR SECOND SCREEN 908

IDENTIFY RELATIVE LOCATION RELATIONSHIP BASED ON AT LEAST ONE SIGNAL TRANSMITTED OR RECEIVED VIA NFC CIRCUITRY ~1002

DISPLAY FIRST SCREEN OR SECOND SCREEN ~1004

ELECTRONIC DEVICE DISPLAYING INFORMATION GUIDING ALIGNMENT WITH CHARGING DEVICE

CROSS-REFERENCE TO RELATED APPLICATIONS

This application is a continuation of International Application No. PCT/KR2022/017119 designating the United States, filed on Nov. 3, 2022, which is based on and claims the benefit of a Korean patent application number 10-2021-0149479, filed on Nov. 3, 2021, in the Korean Intellectual Property Receiving Office, and of a Korean Patent Application No. 10-2022-0145054, filed on Nov. 3, 2022, in the Korean Intellectual Property Office, the disclosures of which are incorporated by reference herein in their entireties.

BACKGROUND

Technical Field

This disclosure relates to an electronic device displaying information for guiding an alignment with a charging device.

Description of Related Art

An electronic device such as a smartphone, a tablet personal computer (PC), a smart watch, and the like, may include a power receiver to obtain electric power wirelessly, for providing enhanced convenience. The power obtained wirelessly through the power receiver through a coil in the electronic device can be used to charge a battery in the electronic device.

SUMMARY

According to an embodiment, provided is an electronic device including a first housing including a first surface and a second surface opposite the first surface, a second housing including a third surface and a fourth surface faced away the third surface, a third housing including a hinge structure pivotably connecting a first side surface of the first housing and a second side surface of the second housing facing the first side surface of the first housing, a display including a flexible display disposed on the first surface and the third surface and extending across the third housing, a battery that is rechargeable, a memory configured to store instructions, and a processor, when executing the instructions, configured to receive a wireless signal for charging the battery from an external electronic device; based on detecting, while a state of the electronic device is a first state in which an angle between a first direction the first surface faces and a second direction the third surface faces is within a first range, that a power provided based on the wireless signal is less than a designated power, display, via the display, a first screen including first information guiding the electronic device to be aligned with the external electronic device for charging of the battery; and based on detecting, while the state of the electronic device is a second state in which the angle is within a second range different from the first range, that the power is less than the designated power, display, via the display, a second screen including the first information and second information guiding to change the state to the first state.

According to an embodiment, provided is an electronic device including a housing, a display rollable into the housing, a battery that is rechargeable, a memory configured to store instructions, and a processor, when executing the instructions, configured to receive, from an external electronic device, a wireless signal for charging the battery; based on detecting, while the electronic device is in a first state in which a first display area of the display is exposed and a second display area of the display adjacent to the first display area is rolled into the housing, that a power provided based on the wireless signal is less than a designated power, display, within the first display area, a first screen including first information guiding the electronic device to be aligned with the external electronic device for charging of the battery; based on detecting, while the electronic device is in a second state in which both the first display area and the second display area are exposed, that the power is less than the designated power, display, within the first display area and the second display area, a second screen including the first information and second information guiding to change the state of the electronic device to the first state.

According to an embodiment, provided is an electronic device including a first housing, a second housing that is caused to move or rotate with respect to the first housing, a first antenna within the first housing, a second antenna within the second housing, a flexible display that is deformed according to movement or rotation of the second housing with respect to the first housing, a battery that is rechargeable, a charging circuit, a sensing circuit, a memory configured to store instructions, and a processor, when executing the instructions, configured to: charge the battery using the charging circuit, based on a wireless signal received from an external electronic device via the first antenna; in response to identifying that the power for charging of the battery is less than a designated power, based on the wireless signal received via the second antenna from the external electronic device, identify a relative location relationship between at least one of the first antenna or the second antennas and at least one coil of the external electronic device using the sensing circuit; and based on the relative location relationship, display information to inform that the electronic device is to be aligned with the external electronic device, using the flexible display.

BRIEF DESCRIPTION OF THE DRAWINGS

The above and other aspects, features, and advantages of certain embodiments of the disclosure will be more apparent from the following description, taken in conjunction with the accompanying drawings, in which.

DETAILED DESCRIPTION

Figure 1A:
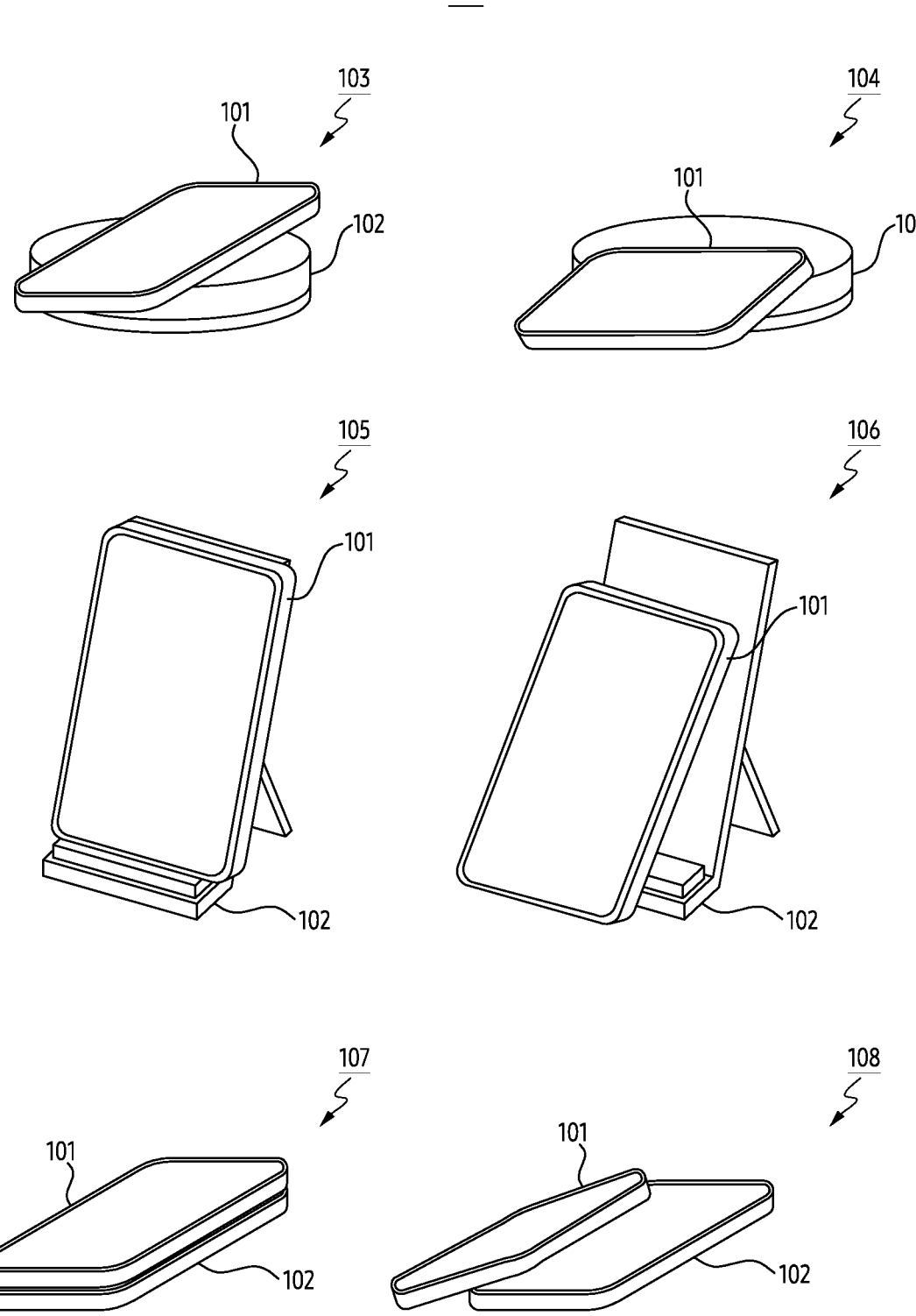
FIG. 1A illustrates examples of an environment including an electronic device and an external electronic device according to an embodiment.

An electronic device according to an embodiment of the present disclosure can provide an enhanced user experience by adaptively providing a notification according to different states of the electronic device mounted onto or positioned relative to an external electronic device wirelessly providing the electric power.

The disclosure now will be described more fully hereinafter with reference to the accompanying drawings, in which various embodiments are shown. This disclosure may, however, be embodied in many different forms, and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An electronic device may wirelessly obtain electric power from an external electronic device to charge a rechargeable battery within the electronic device with the obtained power. For the electronic device to wirelessly acquire the power, at least one coil in the electronic device needs to be located within a certain distance from at least one coil in the external electronic device. Accordingly, in the case where the electronic device is mounted onto or positioned relative to the external electronic device with the at least one coil of the electronic device being spaced apart from the at least one coil in the external electronic device over a certain distance, a user of the electronic device may receive a kind of notification to be served in the electronic device as an alarm.

The electronic device, in use, may provide either a folding state or an unfolding state through a flexible display, or provide either a state in which a part of a display area of the flexible display is rolled up or a state in which the entire display area of the flexible display is exposed. The efficiency of wirelessly acquiring the power from any external electronic device may change depending on different states of the electronic device, and therefore, a scheme of enabling the electronic device to provide the notification on different information according to various states of the electronic device in use may be implemented.

FIG. 1A illustrates examples of an environment including an electronic device and an external electronic device according to an embodiment.

Referring to FIG. 1A, an environment 100 may include an electronic device 101 and an external electronic device 102. In an embodiment, the electronic device 101 may be a device that wirelessly acquires electric power from the external electronic device 102 to charge at least one rechargeable battery in the electronic device 101. For example, the electronic device 101 may be a user device having at least one display, such as a smartphone, a tablet device, a laptop computer, a smart watch, augmented reality (AR) glasses or the like. In an embodiment, the external electronic device 102 may be a device that wirelessly provides the electronic device 101 with the electric power for charging the at least one battery in the electronic device 101. For example, the external electronic device 102 may be a charging device or a charger such as a charging pad, a charging cradle, or a user device (e.g., a smartphone) capable of providing a function for charging at least one battery in another electronic device (e.g., an electronic device 101).

For example, the electronic device 101 may receive a wireless signal from at least one coil in the external electronic device 102 through at least one coil in the electronic device 101, and charge the at least one battery using the power provided based on the wireless signal. For example, the electronic device 101 may charge the at least one battery based on the wireless signal received from the external electronic device 102, while being mounted on or positioned relative to the external electronic device 102.

For example, the charging efficiency for the at least one battery performed based on the wireless signal may change depending upon a distance between at least one coil in the electronic device 101 and at least one coil in the external electronic device 102. For example, the distance between the at least one coil of the electronic device 101 and the at least one coil in the external electronic device 102 may vary depending on how the electronic device 101 is mounted on or positioned relative to the external electronic device 102. For example, on condition that the electronic device 101 is aligned with the external electronic device 102, as in an arrangement 103, an arrangement 105, and an arrangement 107, respectively, the at least one coil within the electronic device 101 may be properly adjacent to the at least one coil within the external electronic device 102. The charging efficiency may be represented as a first value in an arrangement in which the at least one coil in the electronic device 101 is adjacent to the at least one coil in the external electronic device 102. For another example, on condition that the electronic device 101 is not properly aligned (i.e., misaligned) with the external electronic device 102, as seen in the arrangement 104, the arrangement 106, and the arrangement 108, respectively, the at least one coil may be placed spaced apart from the at least one coil in the external electronic device 102 over a certain distance. The charging efficiency may be represented as a second value lower than the first value, in an arrangement in which the at least one coil in the electronic device 101 is located spaced apart from the at least one coil in the external electronic device 102 over the certain distance. In other words, the charging efficiency when the electronic device 101 is mounted on or positioned relative to the external electronic device 102 in an arrangement (e.g., one or more of the arrangements 104, 106, and 108) of being not properly aligned with the external electronic device 102 may be lower than the charging efficiency when it is mounted on or positioned relative to the external electronic device 102 in an arrangement (e.g., one or more of the arrangements 103, 105, and 107) of being fittingly aligned with the external electronic device 102. Accordingly, on condition that the electronic device 101 is not fittingly mounted onto or positioned relative to the external electronic device 102 for charging the at least one battery, as seen in each of the arrangements 104, 106, and 108, the electronic device 101 may control to provide a notification or information as an alarm or alert.

Figure 1B:
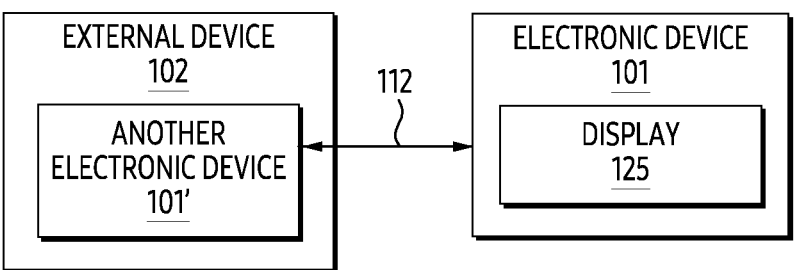
FIG. 1B illustrates an example of an environment including an electric device, another electric device, and an external electronic device according to an embodiment.

In an embodiment, another electronic device 101' is a device that includes at least one battery but does not include a display. For example, the another electronic device 101' could be wireless headphones, a charging case for a device such as wireless headphones or the like. As an example, FIG. 1B illustrates an environment including the electronic device 101 (having a display 125), the another electronic device 101' (without a display), and the external electronic device 102 according to an embodiment. In such an embodiment, the another electronic device 101' can be communicatively coupled (shown as link 112) with the electronic device 101 using one or more of cellular communication, Bluetooth, near-field communication (NFC), wireless fidelity (Wi-Fi), ultra-wide band (UWB) communication, etc. This provides for communication between the electronic device 101 and the another electronic device 101'. The another electronic device 101' may receive a wireless signal from at least one coil in the external electronic device 102 through at least one coil in the electronic device 101, and charge the at least one battery using the power provided based on the wireless signal. For example, the electronic device 101 may charge the at least one battery based on the wireless signal received from the external electronic device 102, while being mounted on or positioned relative to the external electronic device 102.

A wireless signal can be transmitted from a coil of the electronic device 102 to a coil of the another electronic device 101'. For example, based on the reception strength of the wireless signal received through the coil of the another electronic device 101', the processor 110 may identify the relative location relationship between the external device 102 and the another electronic device 101'. A screen can then be displayed on the display 125 of the electronic device 101 including information to guide the another electronic device 101' to be aligned with the external electronic device 102 for charging a battery of the another external electronic device 101'.

Figure 1C:
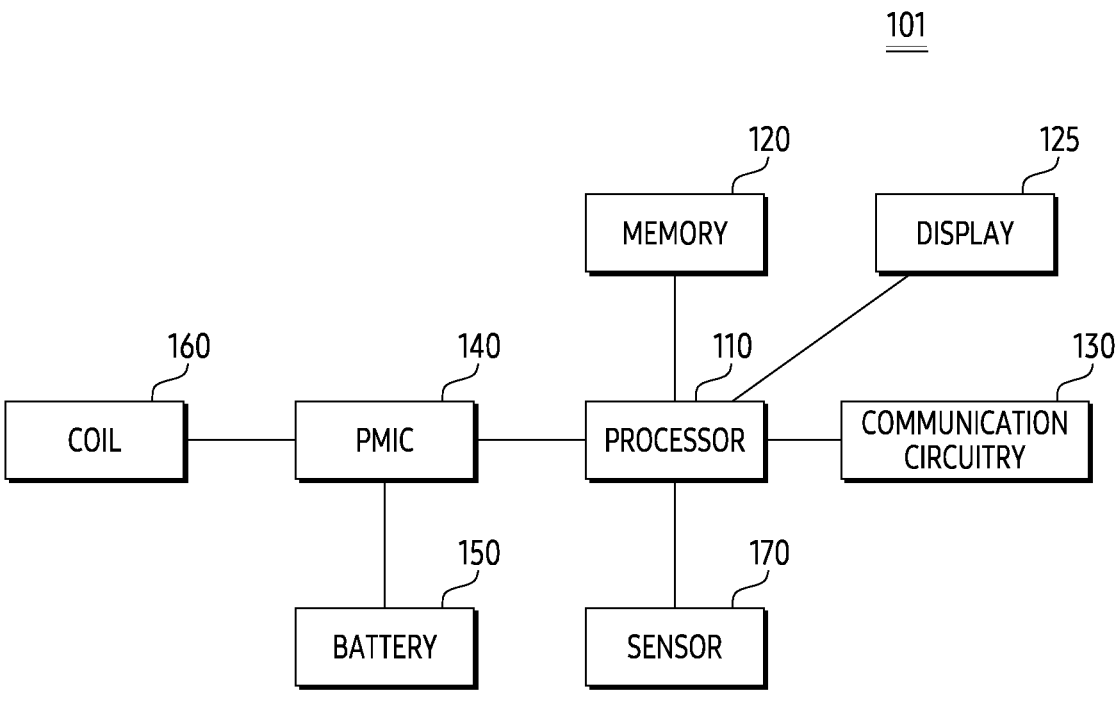
FIG. 1C is a simplified block diagram of an electronic device according to an embodiment.

FIG. 1C is a simplified block diagram of an electronic device according to an embodiment. The block diagram may represent at least a part of functional configurations or components of the electronic device 101 illustrated in FIG. 1A and FIG. 1B.

Referring to FIG. 1C, the electronic device 101 may include a processor 110, a memory 120, a display 125, a communication circuitry 130, a power management integrated circuitry (PMIC) 140, a battery 150, a coil 160, and a sensor 170.

The processor 110 may control the overall operation of the electronic device 101. For example, the processor 110 may write data into the memory 120 and read out data from the memory 120. As another example, the processor 110 may display information on the display 125. As another example, the processor 110 may be configured to transmit signals via the communication circuitry 130 to another electronic device (e.g., an external electronic device 102, a wearable device 777 shown in FIG. 7C, or a wearable device 778 shown in FIG. 7C), and/or receive signals from another electronic device (e.g., an external electronic device 102, a wearable device 777 shown in FIG. 7C, or a wearable device 778 shown in FIG. 7C). According to various embodiments, the processor 110 may include a plurality of processors. For example, the processor 110 may include an application processor (AP) to control an upper layer of elements such as an application and so on, a communication processor (CP) to control communications, and a display controller to control a screen displayed on the display 125, and so on.

The processor 110 may be configured to implement the procedures and/or methods proposed in the present disclosure.

The memory 120 may store one or more instructions for controlling the electronic device 101, a set of control command codes, control data, user data or the like. For example, the memory 120 may store an application, an operating system (OS), a middleware, a device driver or the like.

The memory 120 may include one or more volatile memories or non-volatile memories. The volatile memory may include, for example, a dynamic RAM (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include, for example, a read only memory (ROM), a programmable ROM (PROM), an electrically programmable ROM (EPROM), an electrically erasable programmable ROM (EEPROM), a flash memory, and so on.

The memory 120 may include a non-volatile medium such as a hard disk drive (HDD), a solid state disk (SSD), an embedded multi-media card (eMMC), a universal flash storage (UFS), and so on.

The memory 120 may be operably or operatively connected or coupled with the processor 110.

The display 125 may be a liquid crystal display (LCD) or a light emitting diode (LED) display. The display 125 may display various types of information (e.g., multimedia, text data, etc.) to the user. For example, the display 125 may display a graphical user interface (GUI) so that the user can interact with the electronic device 101.

The display 125 may be implemented in various forms. For example, the display 125 may be implemented as multiple displays including a plurality of displays. For another example, the display 125 may be implemented as an edge display including a planar display portion and at least one curved display portion extending from the planar portion. As another example, the display 125 may be implemented as a foldable display. As another example, the display 125 may be implemented as a rollable display. However, the examples are not limited thereto.

The display 125 may be implemented as a touch screen to receive a touch input. For example, the touch input may include at least one of a single-tap input, a double-tap input, a hovering input, a hold and release input, and a drag and drop input. However, the input is not limited thereto.

The display 125 may be operably or operatively coupled with processor 110.

The communication circuitry 130 may have various communication functions (e.g., cellular communication, Bluetooth, NFC, Wi-Fi, UWB communication, etc.) for communication between the electronic device 101 and at least one external device (e.g., an external electronic device 102). In other words, the communication circuitry 130 may establish communication between the electronic device 101 and the at least one external device.

The communication circuitry 130 may be operably or operatively coupled with the processor 110.

The PMIC 140 may be configured to provide the power obtained from the battery 150 to each of various components within the electronic device 101 (e.g., the processor 110, the memory 120, the display 125, the communication circuitry 130, and/or the sensor 170), under the control of the processor 110. The PMIC 140 may be used to charge the battery 150 based on the power obtained through the coil 160 under the control of the processor 110.

The PMIC 140 may be operably or operatively coupled with the processor 110.

The battery 150 may be used to provide the power for driving the components in the electronic device 101. In an embodiment, the battery 150 may include at least one battery. In an embodiment, the battery 150 may include at least one rechargeable battery.

The coil 160 may be configured to receive a wireless signal for charging the battery 150 from the outside. For example, the coil 160 may be configured to receive the wireless signal emitted, outputted, or transmitted from the coil of the external electronic device 102. The wireless signal may be provided to the PMIC 140 through the coil 160. However, it is not limited thereto.

The sensor 170 may obtain data for identifying a state of the electronic device 101 or a state in the vicinity of the electronic device 101. For example, the sensor 170 may include at least one of a gyro sensor, an acceleration sensor, a geomagnetic sensor, or the like.

The sensor 170 may be operably or operatively coupled with the processor 110.

The electronic device 101 illustrated through FIG. 1C may include a sensing circuit to identify whether the electronic device 101 is aligned with the external electronic device 102. The above components may be exemplified through FIG. 1D.

Figure 1D:
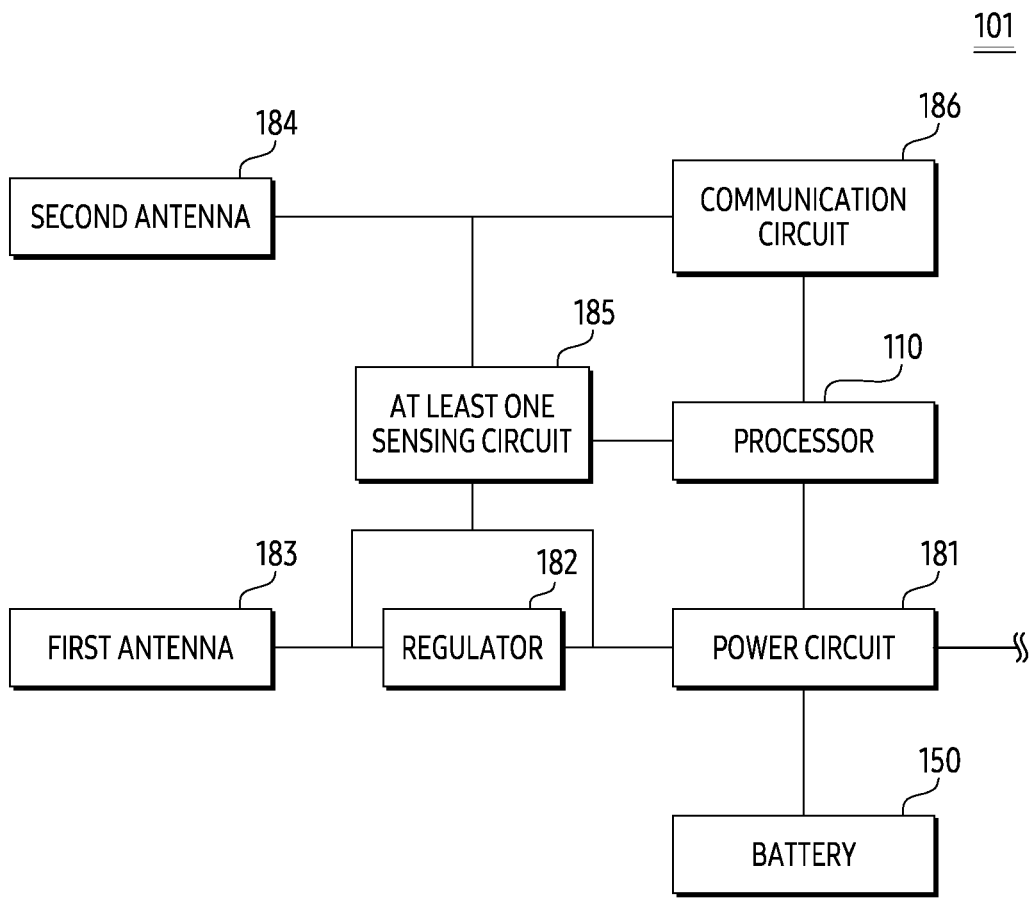
FIG. 1D illustrates an example of components of an electronic device including a sensing circuit for identifying alignment with an external electronic device 102 according to an embodiment.

FIG. 1D illustrates an example of components of the electronic device including a sensing circuit to identify alignment with the external electronic device 102, according to an embodiment.

Referring to FIG. 1D, the electronic device 101 may include a processor 110, a battery 150, a power circuit 181, a regulator 182, a first antenna 183, and a second antenna 184, at least one sensing circuit 185, and a communication circuit 186.

In an embodiment, the processor 110 may include at least a portion of the processor 110 of FIG. 1C. For example, the processor 110 may control other components of the electronic device 101 (e.g., the power circuit 181, the at least one sensing circuit 185, and the communication circuit 186). For example, the processor 110 may be operatively coupled to at least part of the other components.

In one embodiment, the battery 150 may include the battery 150 of FIG. 1C.

In one embodiment, the power circuit 181 may include the PMIC 140 of FIG. 1C. For example, the power circuit 181 may be used to recharge the battery 150 based on the wireless power signal obtained through the first antenna 183 and the regulator 182, or provide power to the components of the electronic device 101 (e.g., memory 120, display 125, communication circuit 130, and/or sensor 170 of FIG. 1C).

In an embodiment, the regulator 182 may be used to obtain a DC voltage of the wireless power signal, by rectifying an AC voltage of the wireless power signal obtained through the first antenna 183. For example, the regulator 182 may include one or more diodes or MOSFETs. For example, the regulator 182 may include a bridge diode or a bridge converter circuit. However, the present disclosure is not limited thereto. For example, the regulator 182 may include a non-bridge type of circuit.

In an embodiment, the first antenna 183 may be used to obtain the wireless power signal. For example, the first antenna 183 may include a coil 160.

In one embodiment, the second antenna 184 may be used for magnetic secure transmission (MST), near field communication (NFC), and/or radio frequency (RF) communication. For example, the second antenna 184 may be used to identify whether the electronic device 101 is aligned with the external electronic device 102. For example, the second antenna 184 may include a coil with a certain pattern. Although not shown in FIG. 1D, the second antenna 184 may be spaced apart from the first antenna 183. For example, as shown in FIGS. 2A to 4B, when the electronic device 101 includes a plurality of housings, the second antenna 184 may be located within another housing that is distinct from the housing in which the first antenna 183 is located. However, the present disclosure is not limited thereto. In one embodiment, the second antenna 184 may be adjacent to the first antenna 183. For example, the second antenna 184 may be disposed to surround the first antenna at least partially 183. For example, when the second antenna 184 is disposed to at least partially surround the first antenna 183, the second antenna 184 may be used for the charging. For example, when the second antenna 184 is disposed so as to surround the first antenna at least partially 183, the first antenna 183 and the second antenna 184 may be used to identify whether the electronic device 101 is aligned with the external electronic device 102. In various embodiments, the second antenna 184 may be disposed to surround the first antenna 183.

In one embodiment, the at least one sensing circuit 185 may be used to detect or identify a state of the wireless power signal obtained via the first antenna 183 and provided to the power circuit 181. For example, the at least one sensing circuit 185 may be used to identify voltage, current, waveform, or ripple of a signal input to the regulator 182 and/or a signal output from the regulator 182.

In an embodiment, the at least one sensing circuit 185 may be used to identify whether the electronic device 101 is aligned with the external electronic device 102, based on a wireless signal (eg, a power signal, a communication signal) acquired through the second antenna 184. As another example, the at least one sensing circuit 185 may be used to identify the state of a signal output or transmitted through the second antenna 184 from the communication circuit 186 and/or through the communication circuit 186 from the second antenna 184.

In one embodiment, the communication circuitry 186 may be used to support communications performed using the second antenna 184. For example, the communication circuit 186 may include at least a portion of the communication circuit 130. However, the disclosure is not limited thereto.

The components illustrated in FIG. 1D may be used to perform operations to be illustrated below.

FIGS. 2A, 2B, 3A, 3B, 4A and 4B illustrate examples of different states of an electronic device. The electronic device may include the electronic device 101 illustrated in FIG. 1A and FIG. 1B or the electronic device 101 illustrated in FIG. 1C.

The electronic device 101 may have various form factors.

In an embodiment, the electronic device 101 may be a bar type of electronic device.

In an embodiment, the electronic device 101 may be a foldable electronic device including a foldable display (e.g., a display 125). For example, the electronic device 101 may provide various states through the foldable display. For example, the electronic device 101 may provide an unfolding state and a folding state.

Figure 2A:
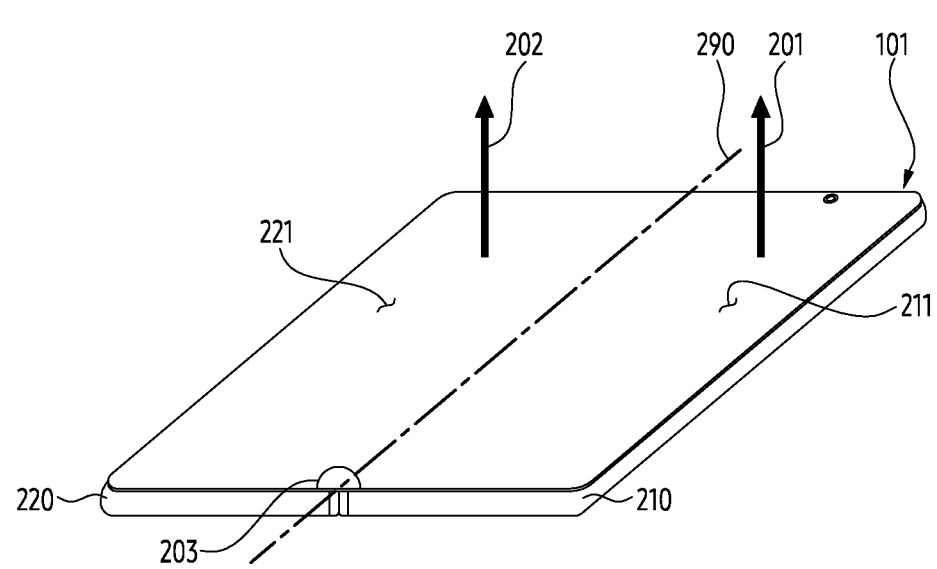
FIGS. 2A, 2B, 3A, 3B, 4A and 4B each illustrate examples of various states of an electronic device.
Figure 2B:
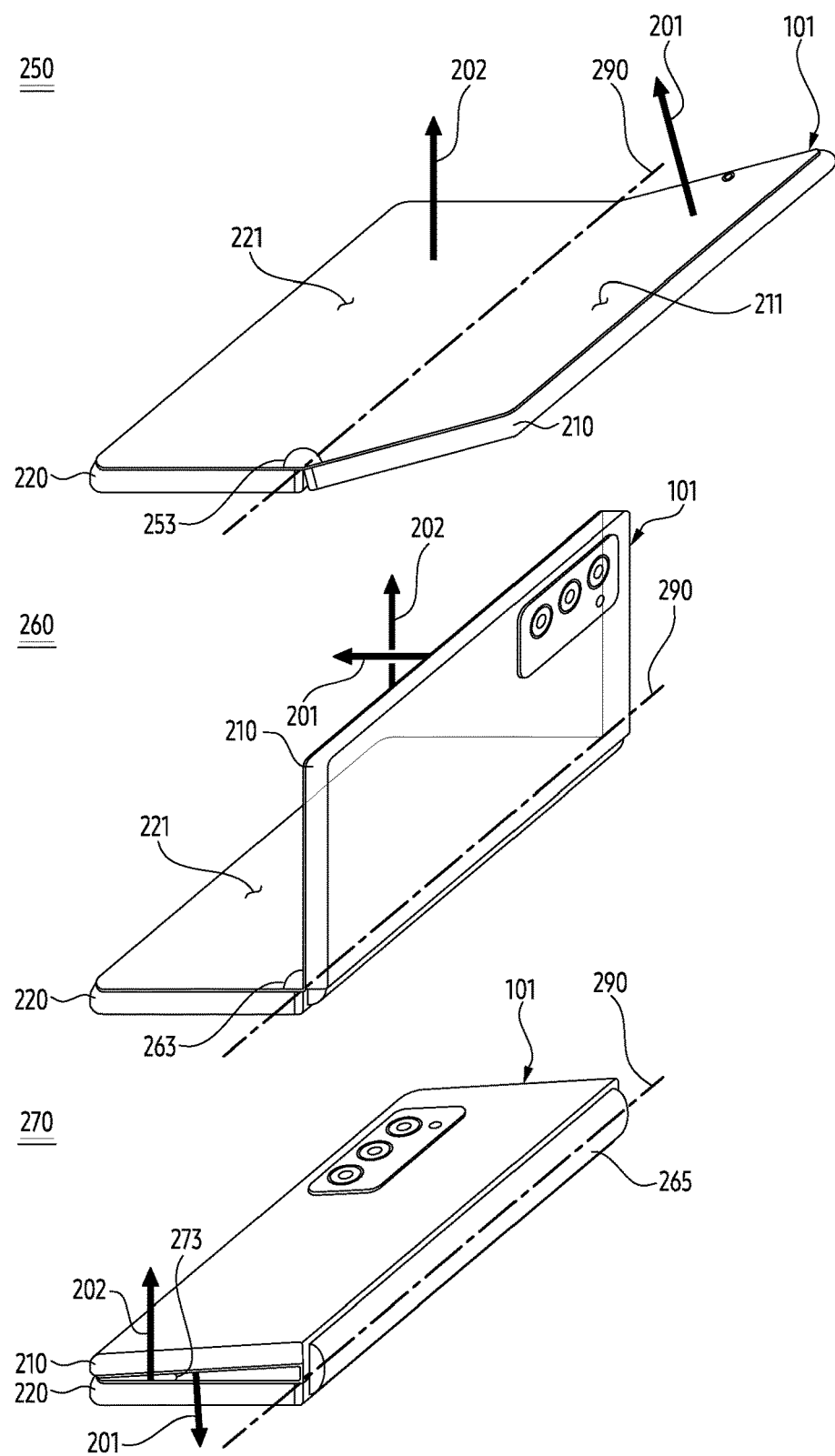

For example, referring to FIG. 2A, the electronic device 101 may be in an unfolding state 200 in which a first housing 210 and a second housing 220 are fully folded out by a hinge structure within a third housing (e.g., a third housing 265 shown in FIG. 2B). In an embodiment, the state 200 may mean a state that a first direction 201 in which a first surface 211 of the first housing 210 faces corresponds to a second direction 202 in which a second surface 221 of the second housing 220 faces. For example, in the state 200, the first direction 201 may be substantially parallel to the second direction 202. For example, in the state 200, the first direction 201 may be in the same direction as the second direction 202. In an embodiment, in the state 200, the first surface 211 may form a substantially flat surface with the second surface 221. In an embodiment, an angle 203 between the first surface 211 and the second surface 221 in the state 200 may be substantially 180 degrees. In an embodiment, the state 200 may stand for a state that the entire display area of the foldable display can be provided substantially on one plane. For example, in the state 200, the display area of the foldable display may not have any curved surface. The unfolding state may be referred to as either one of an unfolded state, an outspread state or an outspreading state.

For another example, referring to FIG. 2B, the electronic device 101 may provide different folding states such as a state 250, a state 260, and a state 270, in which the first housing 210 and the second housing 220 are partially or fully folded by a hinge structure in the third housing 265. In an embodiment, in the folding state having the state 250, the state 260 and the state 270, the first direction 201 in which the first surface 211 faces may become different from the second direction 202 in which the second surface 221 faces. For example, in the state 250, the angle between the first direction 201 and the second direction 202 may be substantially 45 degrees so that the first direction 201 and the second direction 202 are distinct from each other, and in the state 260, the angle between the first direction 201 and the second direction 202 may be substantially 90 degrees so that the first direction 201 and the second direction 202 are distinct from each other, and further, in the state 270, the angle between the first direction 201 and the second direction 202 may be substantially 180 degrees so that the first direction 201 and the second direction 202 are quite different from, rather opposite to, each other. In an embodiment, the angle between the first surface 211 and the second surface 221 in the folding state may be substantially greater than or equal to substantially 0 degrees and less than substantially 180 degrees. For example, in the state 250, the angle 253 between the first surface 211 and the second surface 221 may be substantially 135 degrees, in the state 260, the angle 263 between the first surface 211 and the second surface 221 may be substantially 90 degrees, and in the state 270, the angle 273 between the first surface 211 and the second surface 221 may be substantially 0 degrees. The folding state may be referred to as a folded state.

The folding state may have a plurality of sub-folding states, unlike the unfolding state. For example, the folding state may include the plurality of sub-folding states including, for instance, a fully folding state 270 in which the first surface 211 substantially fully overlaps the second surface 221 by rotation about the hinge structure within the third housing 265, the state 250, and the state 260, both of which states 250 and 260 correspond to an intermediate folding state between the fully folding state 270 and the unfolding state (e.g., a state 200 of FIG. 2A). For example, the electronic device 101 may provide the state 270 in which the first surface 211 and the second surface 221 are caused to face each other by means of the hinge structure in the third housing 265. Further, for example, the electronic device 101 may provide the state 270 in which the first direction 201 is substantially opposite to the second direction 202. As another example, the state 270 may stand for a state in which the display area of the foldable display is not viewed from a user looking at the electronic device 101. However, it is not limited thereto.

In an embodiment, in relation to charging the battery 150 based on a wireless signal received from the external electronic device 102, a plurality of states may be defined in the electronic device 101. For example, a first state of the plurality of states may be a state in which an angle between the first direction 201 and the second direction 202 is within a first range (e.g., substantially 170 degrees to substantially 190 degrees). For example, the first state may include the state 270. For example, a second state of the plurality of states may be a state in which the angle between the first direction 201 and the second direction 202 is within a second range (e.g., between substantially −5 degrees to substantially +5 degrees) distinct from the first range. For example, the second state may include the state 200.

For example, various sensors may be used to identify whether the electronic device 101 is in either the first state or the second state. For example, the processor 110 may identify the angle by means of at least one of a hall sensor in the electronic device 101, acceleration sensors in the electronic device 101, or gyro sensors in the electronic device 101. For example, the hall sensor making up a pair with a magnet in the second housing 220 may be included in the first housing 210. For example, the hall sensor making up a pair with the magnet in the first housing 210 may be included in the second housing 220. For example, a first acceleration sensor of the acceleration sensors may be included in the first housing 210, and a second acceleration sensor of the acceleration sensors may be included in the second housing 220. For example, a first gyro sensor of the gyro sensors may be included in the first housing 210, and a second gyro sensor of the gyro sensors may be included in the second housing 220. However, it is not limited thereto.

Although not shown in FIGS. 2A and 2B, the electronic device 101 may include a coil 160 or a first antenna 183 for charging the battery 150 within the first housing 210 (or the second housing 220), and may include a second antenna 184 for identifying whether the electronic device 101 is aligned with the external electronic device 102 within the second housing 220 (or the first housing 210). However, the present disclosure is not limited thereto. For example, the electronic device 101 may include the coil 160 (or the first antenna 183) for charging the battery 150 in the first housing 210 or the second housing 220 and the second antenna 184 for identifying whether the electronic device 101 is aligned with the external electronic device 102.

Although not shown in FIGS. 2A and 2B, the electronic device 101 may have another display distinct from the foldable display, on a surface of the second housing 220 opposite the second surface 221 of the second housing 220. The other display will be described in more detail in the following description.

In an embodiment, the electronic device 101 may be another foldable electronic device distinguished from the foldable electronic device illustrated in FIGS. 2A and 2B. For example, the electronic device 101, which is the other foldable electronic device, may include another foldable display that can be folded in another direction distinct from the direction in which the foldable display of the foldable electronic device shown in FIGS. 2A and 2B can be folded. For example, the electronic device 101 may provide various states via the other foldable display. For example, the electronic device 101 may provide an unfolding (or unfolded) state and a folding (or folded) state.

Figure 3A:
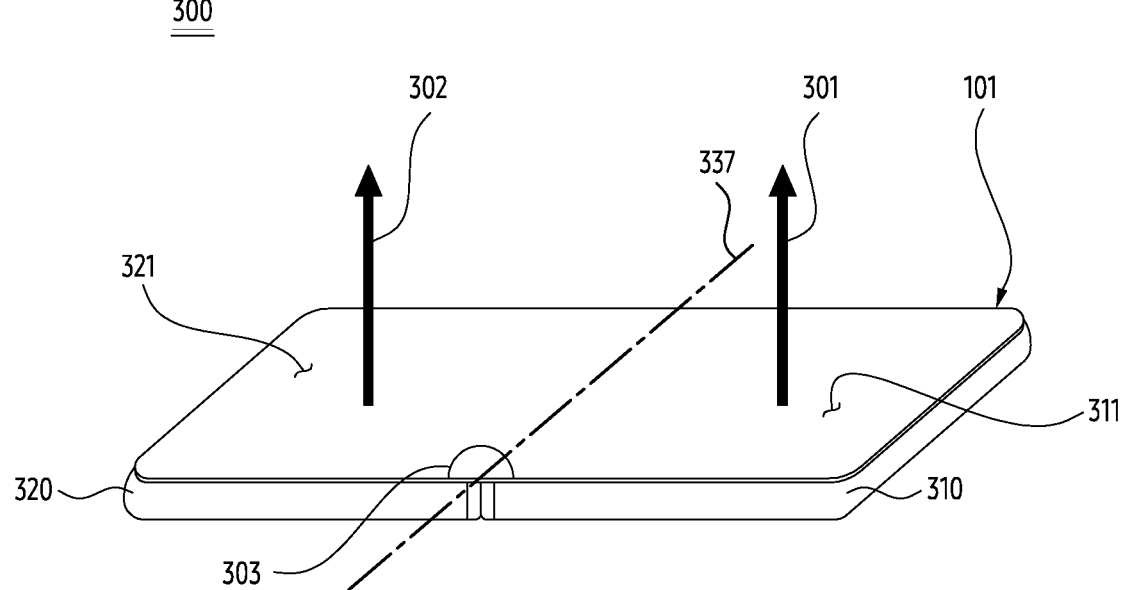
Figure 3B:
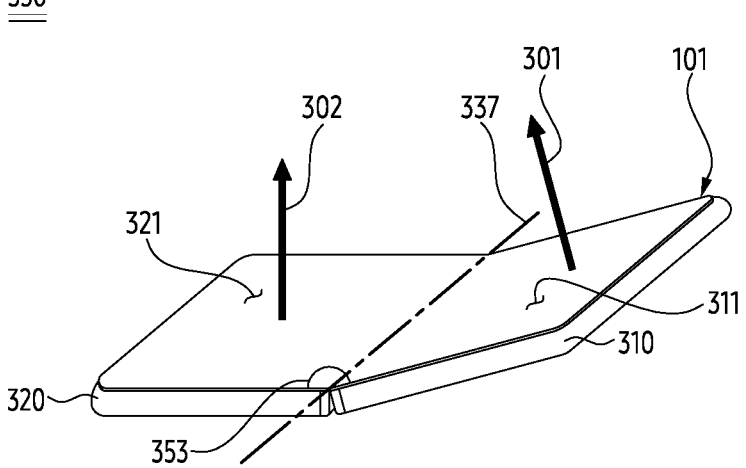
Figure 3B:
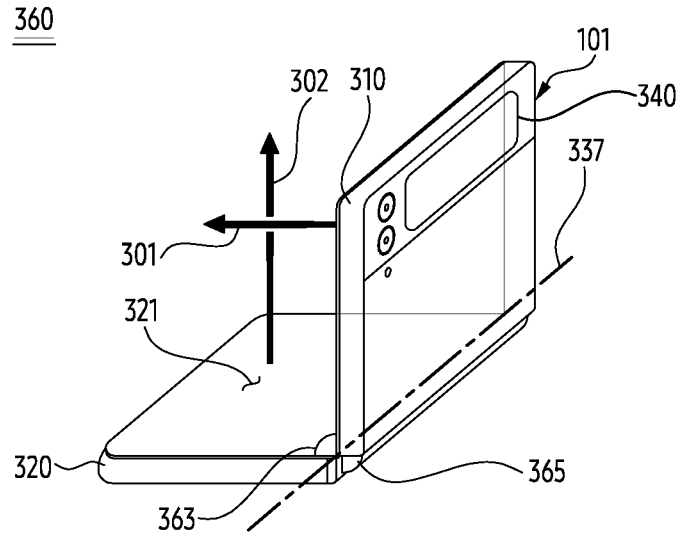
Figure 3B:
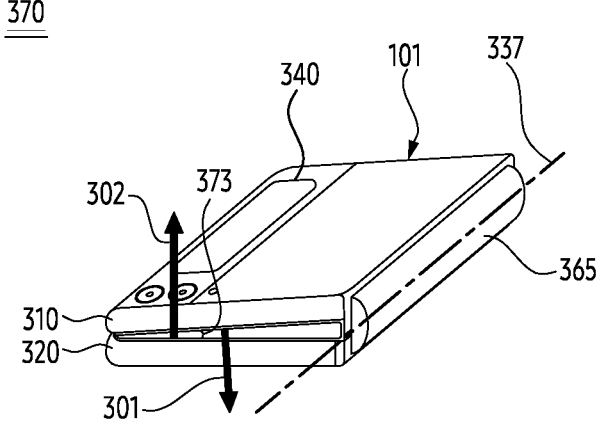

For example, referring to FIG. 3A, the electronic device 101 may be in a an unfolding state 300 in which a first housing 310 and a second housing 320 are fully folded out by rotation about a hinge structure within a third housing (a third housing 365 illustrated in FIG. 3B). In an embodiment, the state 300 may stand for a state that a first direction 301 in which a first surface 311 of a first housing 310 faces corresponds to a second direction 302 in which a second surface 321 of a second housing 320 faces. For example, in the state 300, the first direction 301 may be substantially parallel to the second direction 302. For example, in the state 300, the first direction 301 may be substantially in the same direction as the second direction 302. In an embodiment, in the state 300, the first surface 311 may form a substantially flat surface with the second surface 321. In an embodiment, an angle 303 between the first surface 311 and the second surface 321 in the state 300 may be substantially 180 degrees. In an embodiment, the state 300 may mean a state in which the entire display area of the foldable display can be provided substantially on a single plane. For example, in the state 300, the display area of the foldable display may not include any curved surface. The unfolding state may be referred to as either one of an unfolded state, an outspread state or an outspreading state.

For another example, referring to FIG. 3B, the electronic device 101 may provide different states such as a state 350, a state 360 and a state 370 in the folding state, in which the first housing 310 and the second housing 320 are partially or fully folded by rotation of a hinge structure within the third housing 365. In an embodiment, the folding state including the state 350, the state 360 and the state 370 may stand for a state that the first direction 301 in which the first surface 311 faces becomes different from the second direction 302 in which the second faces. For example, in the state 350, the angle between the first direction 301 and the second direction 302 may be substantially 45 degrees so that the first direction 301 and the second direction 302 are distinct from each other, and in the state 360, the angle between the first direction 301 and the second direction 302 may be substantially 90 degrees so that the first direction 301 and the second direction 302 are distinct from each other, and further, in the state 370, the angle between the first direction 301 and the second direction 302 may be substantially 180 degrees so that the first direction 301 and the second direction 302 are distinct from, rather opposed to, each other. In an embodiment, the angle between the first surface 311 and the second surface 321 in the folding state may be greater than or equal to substantially 0 degree and less than substantially 180 degrees. For example, in the state 350 the angle 353 between the first surface 311 and the second surface 321 may be substantially 135 degrees, in the state 360 the angle 363 between first surface 311 and second surface 321 may be substantially 90 degrees, and in the state 370 the angle 373 between the first surface 311 and the second surface 321 may be substantially 0 degree. The folding state may be referred to as a folded state.

Unlike the unfolding state, the folding state may include a plurality of sub-folding states. For example, the folding state may include the plurality of sub-folding states including a fully folding state 370 in which the first surface 311 substantially fully overlaps the second surface 321 by rotation of the hinge structure within the third housing 365, and the state 350 and the state 360, both of which correspond to an intermediate folding state between the fully folding state 370 and the unfolding state (e.g., a state 300 of FIG. 3A). For example, the electronic device 101 may provide the state 370 in which the first surface 311 and the second surface 321 face each other by rotation of the hinge structure within the third housing 365. For example, the electronic device 101 may provide the state 370 in which the first direction 301 is substantially opposite to the second direction 302. As another example, the state 370 may stand for a state in which the display area of the foldable display is not viewable from the user looking at the electronic device 101. However, it is not limited thereto.

In an embodiment, in relation to charging the battery 150 based on a wireless signal received from the external electronic device 102, a plurality of states may be defined in the electronic device 101. For example, a first state of the plurality of states may be a state in which an angle between the first direction 301 and the second direction 302 is within a first range. For example, the first state may include the state 370. For example, a second state of the plurality of states may be a state in which the angle between the first direction 301 and the second direction 302 is within a second range distinct from the first range. For example, the second state may include the state 300.

For example, various sensors may be used to identify whether the electronic device 101 is either in the first state or in the second state. For example, the processor 110 may identify the angle by means of at least one of a hall sensor in the electronic device 101, acceleration sensors in the electronic device 101, or gyro sensors in the electronic device 101. For example, the hall sensor making up a pair with a magnet in the second housing 320 may be included in the first housing 310. For example, the hall sensor making up a pair with a magnet in the first housing 310 may be included in the second housing 320. For example, a first acceleration sensor of the acceleration sensors may be included in the first housing 310, and a second acceleration sensor of the acceleration sensors may be included in the second housing 320. For example, a first gyro sensor of the gyro sensors may be included in the first housing 310, and a second gyro sensor of the gyro sensors may be included in the second housing 320. However, it is not limited thereto.

Although not illustrated in FIGS. 3A and 3B, the electronic device 101 may include a coil 160 or a first antenna 183 for charging the battery 150 within the first housing 310 (or the second housing 320) and include a second antenna 184 for identifying whether the electronic device 101 is aligned with the external electronic device 102 within the second housing 320 (or the first housing 310). However, the present disclosure is not limited thereto. For example, in the first housing 310 or in the second housing 320, the electronic device 101 may include the coil 160 (or the first antenna 183) for charging the battery 150, and the second antenna 184 for identifying whether the electronic device 101 is aligned with the external electronic device 102.

Unlike the electronic device 101 shown in FIGS. 2A and 2B, the electronic device 101 shown in FIGS. 3A and 3B may include another display 340 distinct from the foldable display, on a surface of the first housing 320 opposite the first surface 321 of the first housing 310.

In the states of the electronic device 101 illustrated in FIGS. 2A to 2B, the angle between the first housing 210 and the second housing 220 changes with respect to a folding axis 290, while in the states of the electronic device 101 shown in FIGS. 3A to 3B, the angle between the first housing 310 and the second housing 320 changes with respect to a folding axis 337 substantially perpendicular to the folding axis 290 when the orientation of the electronic device 101 shown in FIGS. 2A to 2B is substantially the same as the orientation of the electronic device 101 shown in FIGS. 3A to 3B.

In an embodiment, the electronic device 101 may be an electronic device including a rollable display. For example, the electronic device 101 may provide various states on the rollable display.

Figure 4A:
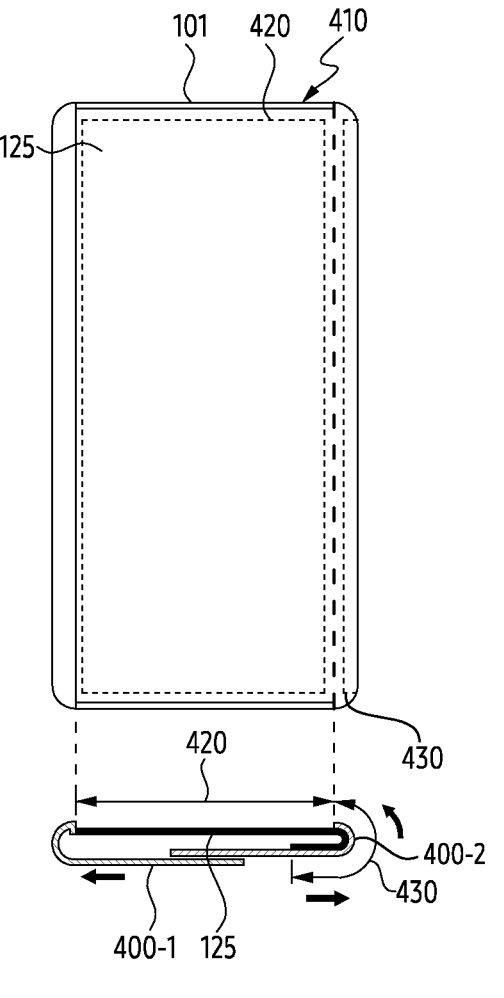

For example, referring to FIG. 4A, the electronic device 101 may provide, as a state of a plurality of states, a state 410 in which a part of the display area of the display 125 is exposed and a remaining part of the display area 125 is rolled into the housing 400 (e.g., a second portion 400-2 of the housing 400). The state 410 may be a state in which the display 125 provides a minimum size of viewable area. The state 410 may be a state in which the display 125 provides an exposed display area having a minimum size. The state 410 may be also a state in which there is no more display area of the display 125 to be rolled into the housing (e.g., the second portion 400-2 of the housing 400) due to the limited space formed by the housing 400 (e.g., the second portion 400-2 of the housing 400). In the state 410, a part of the display area exposed through a first portion 400-1 of the housing 400 may be referred to as a first display area 420. In the state 410, the remaining part of the display area rolled into the housing 400 (e.g., the second portion 400-2 of the housing 400) may be referred to as a second display area 430. In the state 410, the first display area 420 may be a viewable display area. In the state 410, the first display area 420 may be a display area (e.g. the display area exposed through the first portion 400-1 of the housing 400) exposed out of the housing 400 (e.g., the second portion 400-2 of the housing 400). In the state 410, the second display area 430 may be of a non-viewable display area due to its rolling into the housing 400 (e.g., the second portion 400-2 of the housing 400). In the state 410, the second display area 430 may be a display area covered with the housing 400 due to its rolling into the housing 400 (e.g., the second portion 400-2 of the housing 400).

Figure 4B:
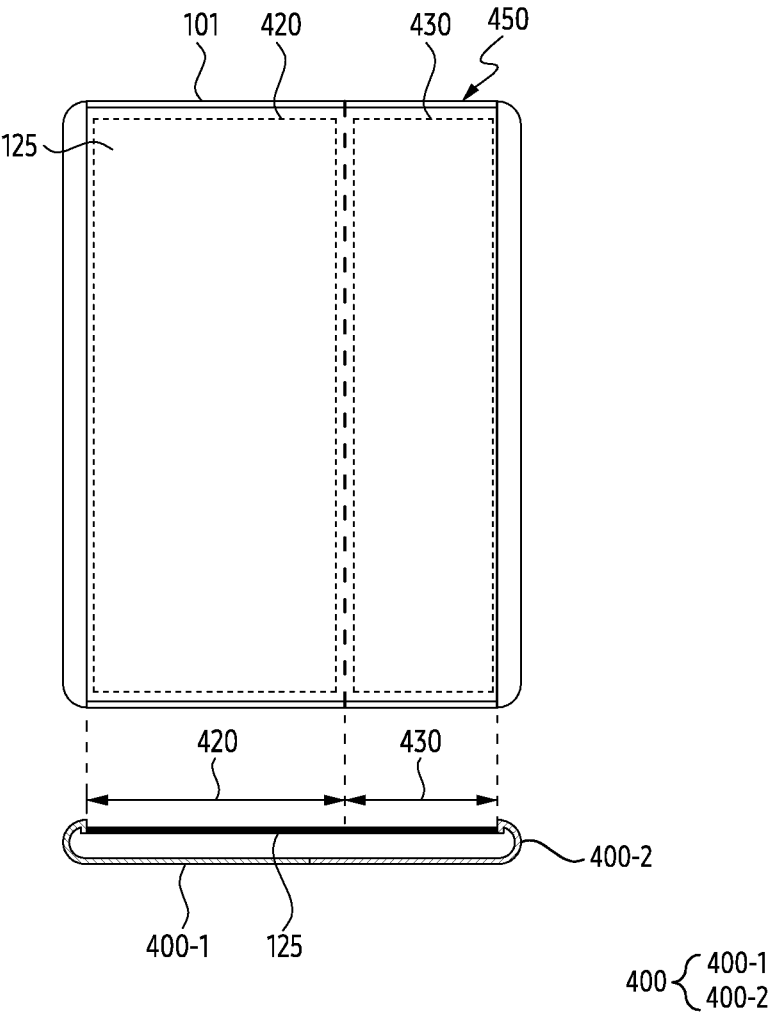

For another example, referring to FIG. 4B, the display 125 may provide a state 450 in which the entire display area of the display 125 is exposed out, as another state of the plurality of states. The state 450 may be a state in which the display 125 provides a maximum size of viewable area. The state 450 may be a state in which the display 125 provides an exposed display area of a maximum size. The state 450 may be a state in which no more display area remains to be extended out of the housing 400 (e.g., the second portion 400-2 of the housing 400). In the state 450, both the first display area 420 and the second display area 430 may be of a visible display area. In the state 450, the first display area 420 and the second display area 430 may be a display area fully exposed out of the housing 400.

Although not shown in FIGS. 4A and 4B, the display 125 may have an intermediate state between the state 410 and the state 450. The intermediate state may refer to a state in which the first display area 420 and a part of the second display area 430 are exposed and the remaining part of the second display area 430 is rolled into the housing 400 (e.g., the second portion 400-2 of the housing 400). In the intermediate state, the first display area 420 and the part of the second display area 430 may be a viewable display area. In the intermediate state, the first display area 420 and the part of the second display area 430 may be a display area exposed out of the housing 400 (e.g., the second portion 400-2 of the housing 400). In the intermediate state, the remaining part of the second display area 430 may be a non-viewable display area due to its rolling into the housing 400 (e.g., the second portion 400-2 of the housing 400). In the intermediate state, the remaining part of the second display area 430 may be a display area covered with the housing 400 (e.g., the second portion 400-2 of the housing 400) by being rolled into the housing 400 (e.g., the second portion 400-2 of the housing 400).

In an embodiment, in relation to charging the battery 150 based on a wireless signal received from the external electronic device 102, a plurality of states may be defined in the electronic device 101. For example, a first state of the plurality of states of the electronic device 101 may be a state in which the size of the display area exposed out of the housing 400 is less than a specified size. For example, a first state may include the state 410. For example, a second state of the plurality of states of the electronic device 101 may be a state in which the size of the display area exposed out of the housing 400 is equal to or greater than the specified size. For example, the second state may include the state 450.

For example, various sensors may be used to identify whether the electronic device 101 is either in the first state or in the second state. For example, although not shown in FIGS. 4A and 4B, a sensor for identifying a position of an edge of the display 125 rolled into the housing 400 may be used for the processor 110 to identify whether the electronic device 101 is either in the first state or in the second state.

Although not shown in FIGS. 4A and 4B, the electronic device 101 may include a coil 160 or a first antenna 183 for charging the battery 150 in the first portion 400-1 of the housing 400 (or the second portion 400-2 of the housing 400), and a second antenna 184 for identifying whether the electronic device 101 is aligned with the external electronic device 102 in the second portion 400-2 of the housing 400 (or the first portion 400-1 of the housing 400). For example, when the first antenna 183 and the second antenna 184 are respectively located in different parts of the housing 400, the relative location relationship between the first antenna 183 and the second antenna 184 may change according to the second portion 400-2 of the housing 400 being moved relative to the first portion 400-1 of the housing 400. For example, information on the change of the relative location relationship may be used to identify whether the electronic device 101 is aligned with the external electronic device 102. However, the present disclosure is not limited thereto. For example, the electronic device 101 may include the coil 160 (or the first antenna 183) for charging the battery 150, or the second antenna 184 for identifying whether the electronic device 101 is aligned with the external electronic device 102, in the first portion 400-1 of the housing 400 or the second portion 400-2 of the housing 400.

Figure 5A:
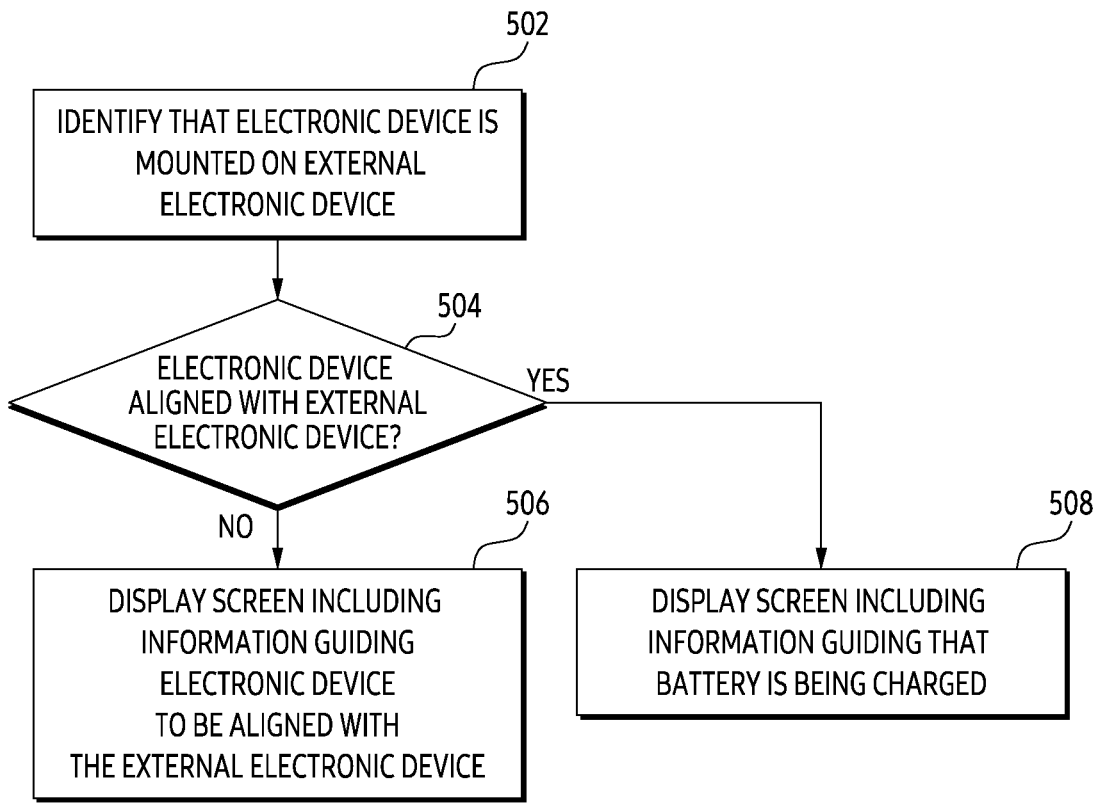
FIG. 5A is a flowchart illustrating a method of displaying a screen including information to guide an electronic device to be aligned with an external electronic device according to an embodiment.

FIG. 5A is a flowchart illustrating a method of displaying a screen with information to guide an electronic device to be aligned with an external electronic device according to an embodiment. This method may be executed by the electronic device 101 illustrated in FIGS. 1A, 1B, 1C, 2A, 2B, 3A, 3B, 4A and 4B, or the processor 110 of the electronic device 101 illustrated in FIG. 1C.

Figure 5B:
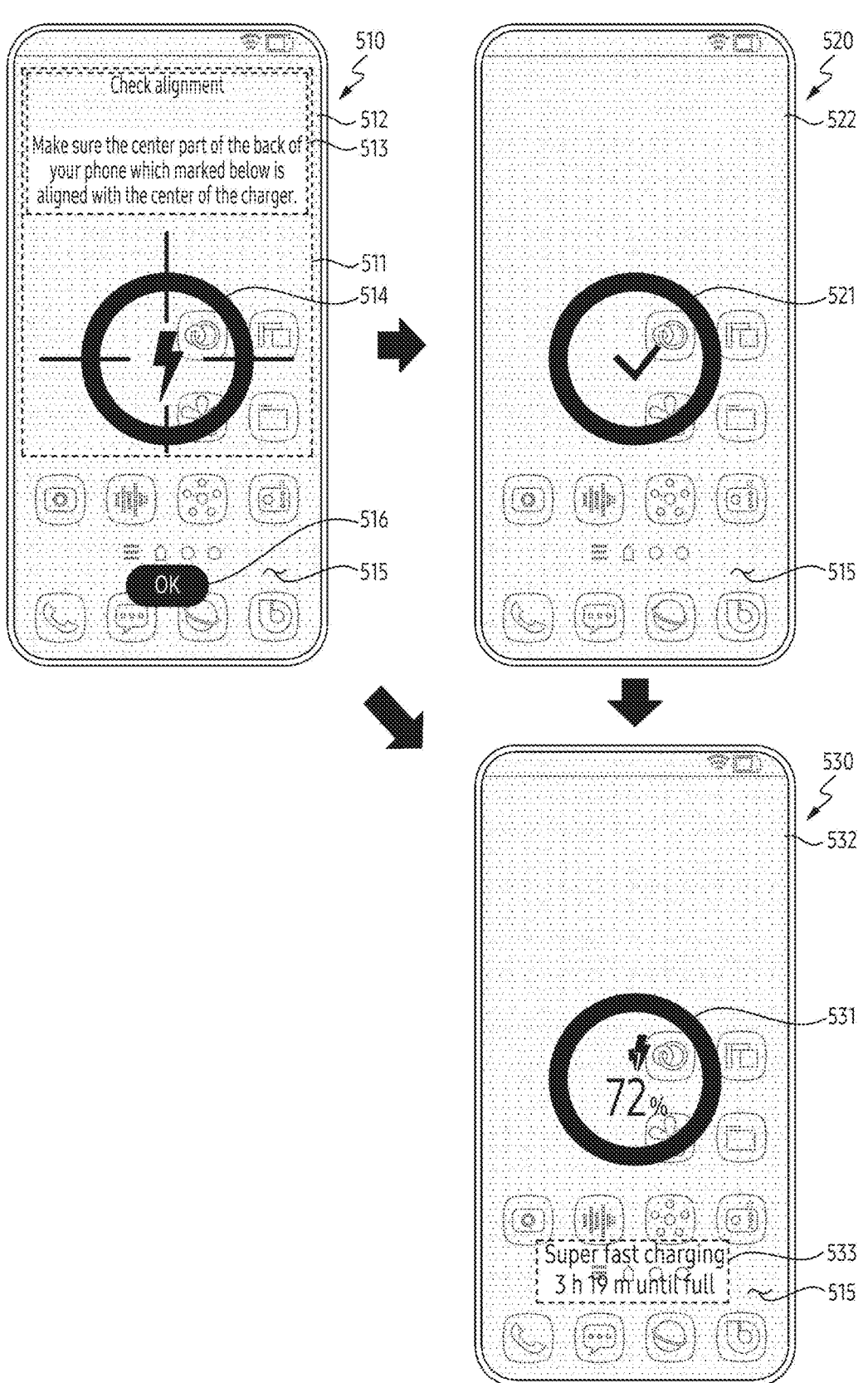
FIG. 5B illustrates examples of a screen displayed according to an embodiment.

FIG. 5B illustrates an example of a screen displayed according to an embodiment.

Referring to FIG. 5A, in operation 502, the processor 110 may identify that the electronic device 101 is positioned relative to the external electronic device 102 for charging the battery 150. For example, the processor 110 may identify that the electronic device 101 is positioned relative to the external electronic device 102, based on a wireless signal obtained from the external electronic device 102 through a coil 160. For example, the processor 110 may identify that the electronic device 101 is positioned relative to the external electronic device 102, further based on establishing connection with the external electronic device 102 via a communication circuitry 130. For example, the processor 110 may identify a relative location relationship between the electronic device 101 and the external electronic device 102 through the communication circuitry 130, and identify that the electronic device 101 is positioned relative to the external electronic device 102, further based on the relative location relationship. For example, the processor 110 may identify that the electronic device 101 is positioned relative to the external electronic device 102, further based on data obtained through the sensor 170. However, it is not limited thereto.

In operation 504, the processor 110 may identify whether the electronic device 101 is properly aligned with the external electronic device 102, based on the aforementioned identification. For example, when the electronic device 101 is aligned with the external electronic device 102, it may mean that the electronic device 101 is positioned relative to the external electronic device 102 in an arrangement that a distance between the center of the coil 160 in the electronic device 101 and the center of at least one coil in the external electronic device 102 is within a certain distance (e.g., 1 cm). For example, when the electronic device 101 is properly aligned with the external electronic device 102, it may mean that the electronic device 101 is positioned relative to the external electronic device 102 in a state in which the power obtained based on a wireless signal for charging the battery 150 from the external electronic device 102 is equal to or more than a predetermined power level. However, it is not limited thereto.

In an embodiment, the processor 110 may identify that the electronic device 101 is aligned with the external electronic device 102 through at least one of the communication circuitry 130, the coil 160, or the sensor 170. For example, the processor 110 may identify that the electronic device 101 is aligned with the external electronic device 102, by executing at least one of the operations defined from the description of FIG. 5A, the operations defined from the description of FIG. 8, the operations defined from the description of FIG. 9, the operations defined from the description of FIG. 10, and/or the operations defined from the description of FIG. 11. However, it is not limited thereto.

In an embodiment, the processor 110 may execute operation 508 on condition that the electronic device 101 is properly aligned with the external electronic device 102, otherwise execute operation 506.

In the operation 506, the processor 110 may display a screen including information to guide the electronic device 101 to be aligned with the external electronic device 102, based on identifying that the electronic device 101 is not fittingly aligned with the external electronic device 102. For example, the information may include a text guiding the electronic device 101 to be aligned with the external electronic device 102. For example, the information may include a visual object displayed at a location in a display area of the display 125 corresponding to the location of the coil 160 of the electronic device 101 in order to guide alignment of the coil 160 of the electronic device 101 with the at least one coil of the external electronic device 102. For example, referring to FIG. 5B, the processor 110 may provide a display state 510 on the display 125, on condition that the electronic device 101 is not aligned with the external electronic device 102. In the display state 510, the processor 110 may display a screen 512 including information 511 on the display 125. For example, the information 511 may include a text 513 to guide a center part of a back of a housing of the electronic device 101 to be aligned with a center part of the external electronic device 102. For example, the information 511 may include a visual object 514 in an area of the screen 512 corresponding to the area in which the coil 160 of the electronic device 101 is located. For example, the coil 160 (or the first antenna 183) may be disposed beneath the area where the visual object 514 is displayed. For example, the second antenna 184 may be positioned beneath the area where the visual object 514 is displayed. For example, the processor 110 may display the visual object 514 within an area corresponding to the area in which the coil 160 (or the first antenna 183 and/or the second antenna 184) is located, so that a user of the electronic device 101 can recognize how to change the position or posture of the electronic device 101 or the external electronic device 102, in order for the user to fittingly align the electronic device 101 with the external electronic device 102. However, it is not limited thereto.

In an embodiment, the screen 512 may be superimposed on another screen displayed via the display 125. For example, the screen 512 may be superimposed on a home screen (wall paper) 515. For example, the screen 512 may be superimposed on other screen displayed through the display 125 immediately before displaying the screen 512, in order to inform that the electronic device 101 is in a state different from the user's intention to charge the battery 150 of the electronic device 101. The home screen 515 shown in FIG. 5B may be replaced by a lock screen, an always-on-display (AOD) screen, or an execution screen of an application operating in a foreground state, being displayed through the display 125 immediately before displaying the screen 512. In an embodiment, the screen 512 may be configured to be translucent in order to intuitively inform the user which screen was being displayed through the display 125 immediately before displaying the screen 512. For example, the home screen 515 may be viewed through the screen 512.

In an embodiment, displaying on the screen 512 may change over time or based on the occurrence of another event. For example, the processor 110 may control the display 125 to change luminance of the screen 512 from a first luminance to a second luminance higher than the first luminance, on condition that a predetermined time duration has elapsed from the timing of displaying the screen 512 or that another condition has occurred. For example, the processor 110 may control the display 125 to change the size of the text 513 in the screen 512 from a first size to a second size larger than the first size, on condition that a predetermined time duration has elapsed from the timing at which the screen 512 is displayed or that another condition has occurred. For example, the processor 110 may change the color of the text 513 or the visual object 514 in the screen 512, on condition that a predetermined time duration has elapsed from the timing of displaying the screen 512 or that another condition has occurred. For example, the processor 110 may further display a visual effect around the text 513 or the visual object 514 in the screen 512, on condition that a predetermined time duration has elapsed from the timing of displaying the screen 512 or that another condition has occurred. For example, the processor 110 may control the display 125 to cause at least one of the text 513 or the visual object 514 in the screen 512 to blink, on condition that a predetermined time duration has elapsed from the timing of displaying the screen 512 or that another condition has occurred. According to embodiments, the processor 110 may output audio signals through a speaker of the electronic device 101 or provide vibrations through an actuator of the electronic device 101 instead of changing displaying of the screen 512, on condition that a predetermined time duration has elapsed from the timing of displaying the screen 512 or that another condition has occurred. However, it is not limited thereto.

In an embodiment, displaying on the screen 512 may be ceased based on a specified condition.

For example, the displaying on the screen 512 may be ceased based on identifying that the electronic device 101 is fittingly aligned with the external electronic device 102. For example, the processor 110 may change the display state 510 to the display state 520 based on identifying that the electronic device 101 is aligned with the external electronic device 102 in the display state 510. For example, in the display state 520, the processor 110 may display a screen 522 including information 521 representing that the electronic device 101 is aligned with the external electronic device 102. For example, the coil 160 (or the first antenna 183) may be positioned beneath the area where the information 521 is displayed. For example, the second antenna 184 may be positioned beneath the area where the information 521 is displayed. In an embodiment, the screen 522 may be superimposed on the home screen 515. In an embodiment, the processor 110 may switch the display state 520 to a display state 530, after providing the display state 520 for a specified time duration or based on the occurrence of another event. For example, in the display state 530, the processor 110 may display a screen 532 including information 531 to guide that charging of the battery 150 is progressing. For example, the information 531 may include at least one of a visual object or a text to indicate a remaining capacity of the battery 150 in charging. For example, the coil 160 (or the first antenna 183) may be positioned beneath the area where the information 531 is displayed. For example, the second antenna 184 may be positioned beneath the area where the information 531 is displayed. In an embodiment, the screen 532 may further include information 533 to indicate a time to be taken for the battery 150 to be fully charged. However, the disclosure is not limited thereto. According to embodiments, the processor 110 may switch the display state 510 to the display state 530 without providing the display state 520 in the interim, based on identifying that the electronic device 101 is aligned with the external electronic device 102 in the display state 510.

As another example, displaying on the screen 512 may be ceased based on a user input onto the screen 512. For example, in response to receiving a user input onto an executable object 516 on the screen 512 in the display state 510, the processor 110 may cease to display the screen 512 and then display other screen (e.g., the home screen 515) disposed beneath the screen 512. As another example, based on a specified user input received for the screen 512 in the display state 510, the processor 110 may cease to display the screen 512 and the display the other screen (e.g., the home screen 515) positioned beneath the screen 512. For example, the specified user input may be at least one tap input for any area on the screen 512. As another example, upon the occurrence of an event (e.g., receiving a message or email), the processor 110 may cease to display the screen 512 and display another screen (e.g., a messaging application or email application, etc.) However, it is not limited thereto.

As another example, displaying of the screen 512 may be ceased based on identifying that the electronic device 101 positioned relative to the external electronic device 102 is moved farther away from the external electronic device 102. For example, based on identifying that the electronic device 101 is moved farther away from the external electronic device 102, through at least one of the communication circuitry 130, the coil 160, or the sensor 170, the processor 110 may cease to display the screen 512 and then display the other screen (e.g., the home screen 515 positioned beneath the screen 512).

In operation 508, the processor 110 may display a screen including information to guide that the battery 150 is in charging, based on identifying that the electronic device 101 is aligned with the external electronic device 102. For example, referring to FIG. 5B, the processor 110 may provide the display state 530.

As described above, on condition that the battery 150 is being not charged or charged at a lower power level than a specified power level, as opposed to the user's intention to charge the battery 150 of the electronic device 101, the electronic device 101 may display a screen including information to guide the electronic device 101 to be properly aligned with the external electronic device 102 for charging the battery 150, thereby enhancing the usability of the electronic device 101. In an embodiment, the electronic device 101 may change displaying of the information or the screen over time, in order to inform that the electronic device 101 is in a charging state that may be not suitable for the user's intention.

Figure 6A:
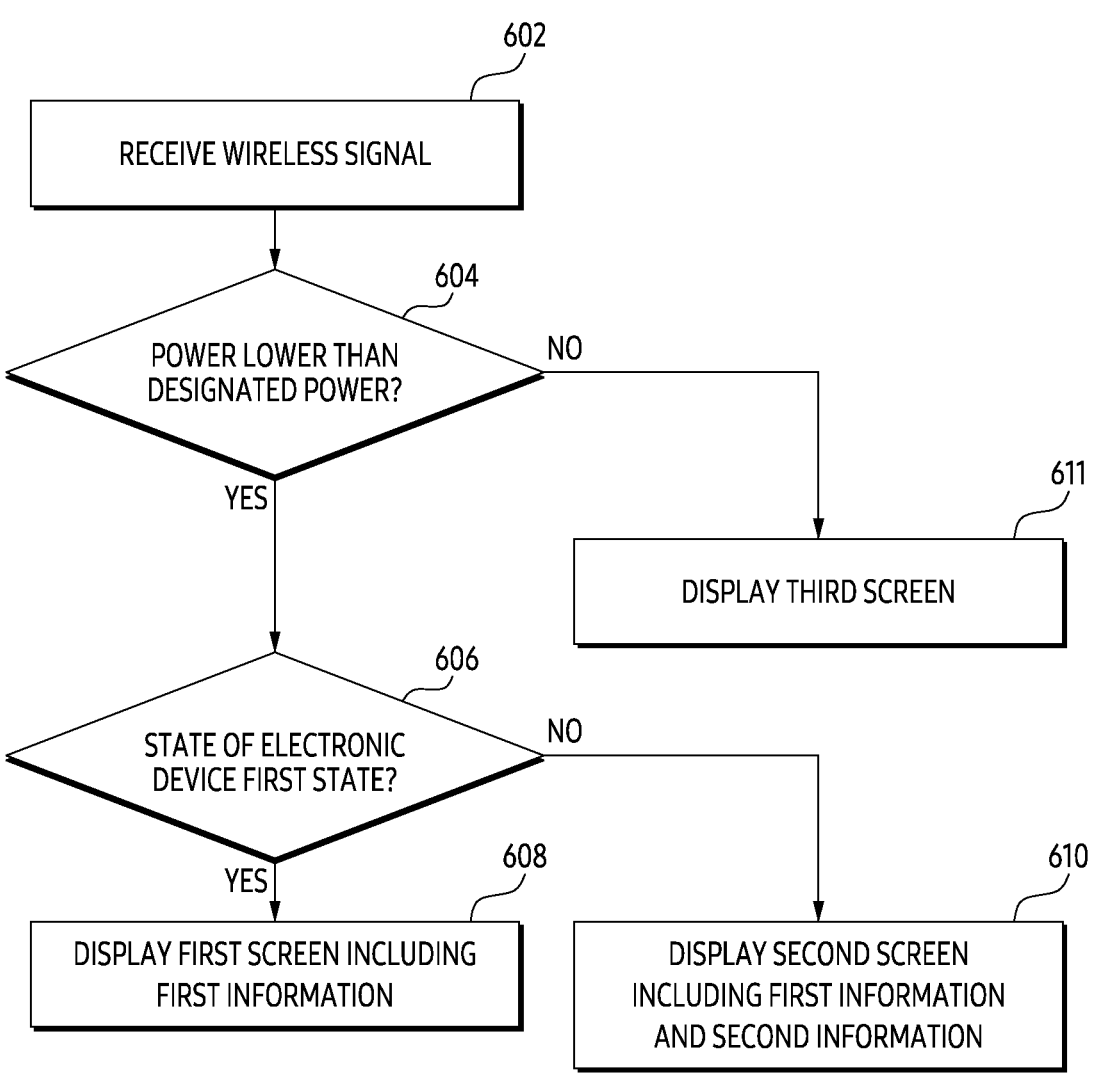
FIG. 6A is a flowchart illustrating a method of displaying a screen based on whether an electronic device is in a folding state according to an embodiment.

FIG. 6A is a flowchart illustrating a method of displaying a screen based on whether an electronic device is in a folding state, according to an embodiment. This method may be executed by the electronic device 101 illustrated in FIGS. 1A, 1B, 1C, 2A, 2B, 3C and 3B or the processor 110 of the electronic device 101 illustrated in FIG. 1C.

Figure 6B:
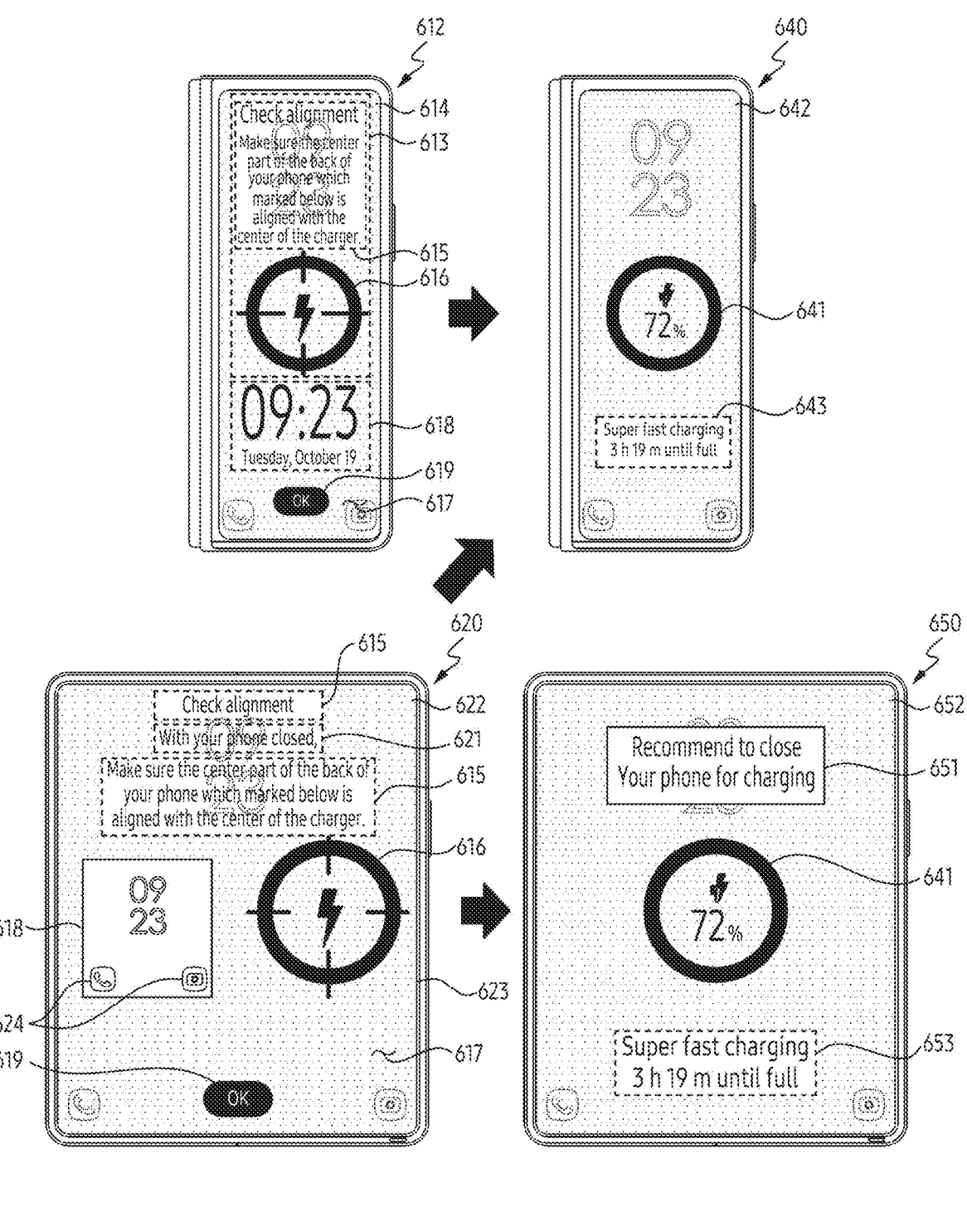
FIGS. 6B, 6C and 6D illustrate examples of various screens displayed either in an unfolding state or in a folding state according to an embodiment.
Figure 6C:
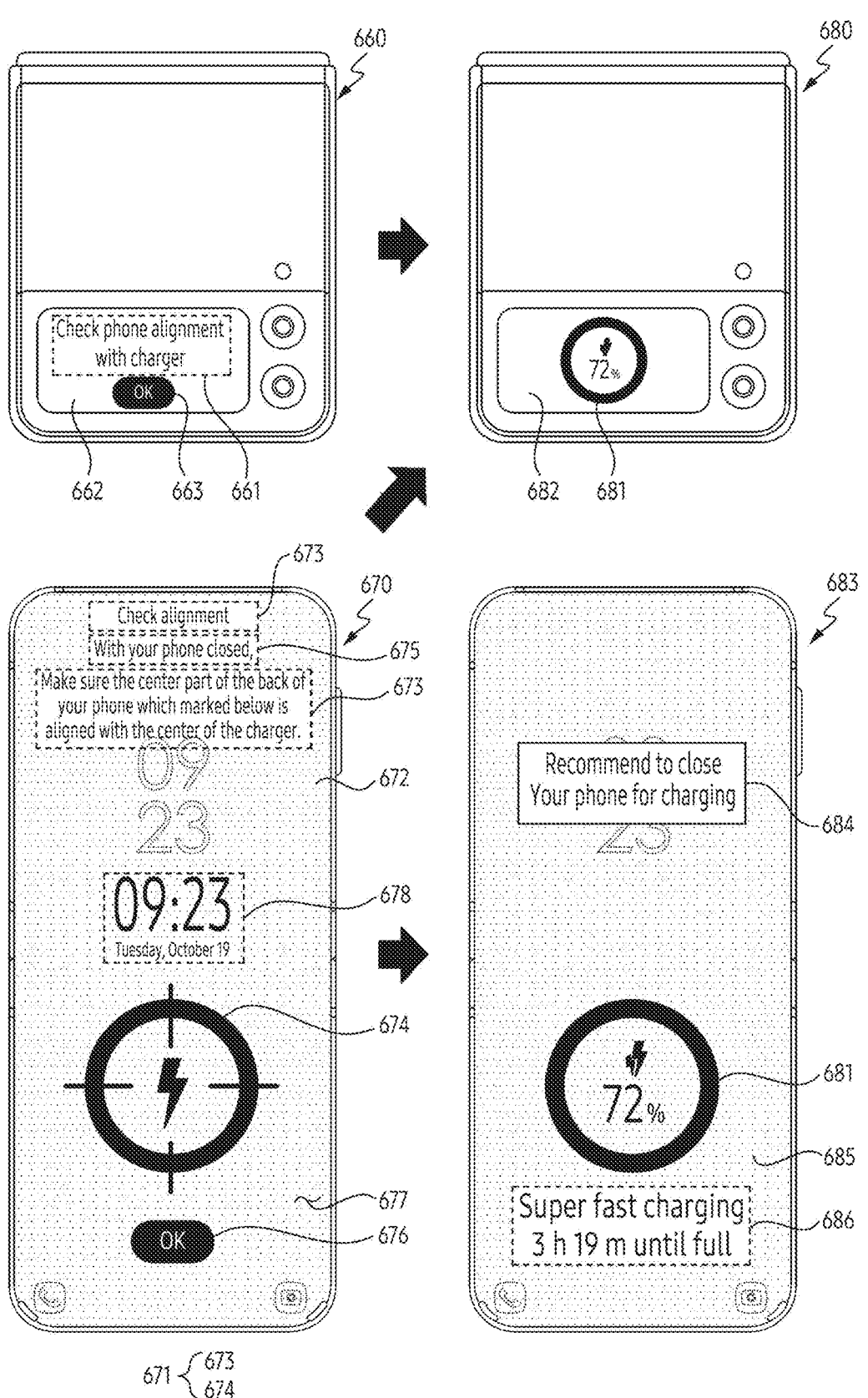
Figure 6D:
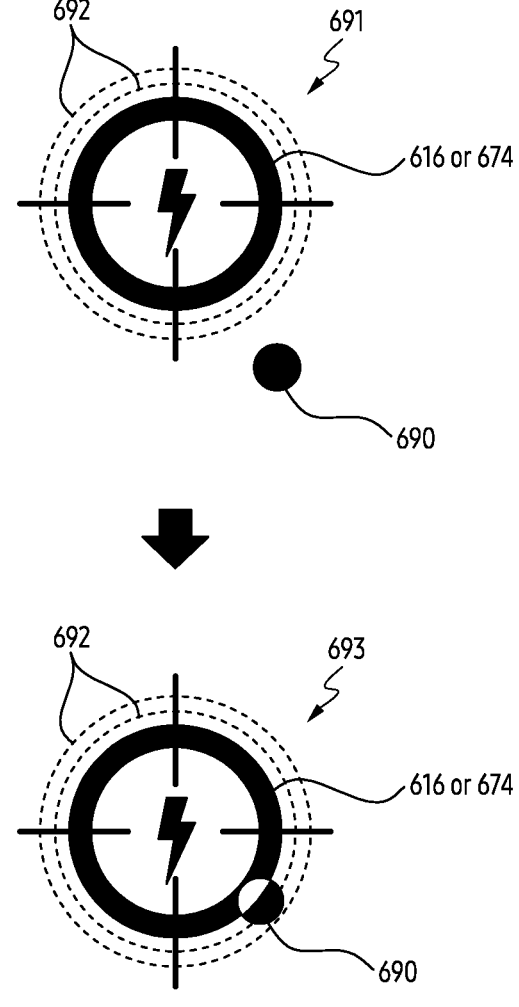

FIGS. 6B to 6D illustrate examples of a screen displayed either in an unfolding state or in a folding state, according to an embodiment.

Referring to FIG. 6A, in operation 602, the processor 110 may receive a wireless signal for charging the battery 150 from the external electronic device 102. For example, the wireless signal may be received via the coil 160 from at least one coil of the external electronic device 102. For example, the processor 110 may acquire electric power for charging the battery 150, using a PMIC 140, based on the wireless signal received through the coil 160. For example, the processor 110 may obtain the power provided based on the wireless signal.

In operation 604, the processor 110 may identify whether the power is lower than a designated power. For example, the processor 110 may identify whether the power is less than a designated power, in order to identify whether the electronic device 101 is aligned with the external electronic device 102. For example, the designated power may be a parameter defined in the electronic device 101 to identify whether the power capable of normally charging the battery 150 is obtained based on the wireless signal. For example, the designated power may be a parameter defined in the electronic device 101 to identify whether the electronic device 101 is aligned with the external electronic device 102 for charging the battery 150. In an embodiment, the designated power may be of a fixed value. In an embodiment, the designated power may be of a value that may change according to the capability of the electronic device 101, the state of the electronic device 101, the capability of the external electronic device 102, or the state of the external electronic device 102. When the designated power is of a changeable value, the processor 110 may execute at least one operation for identifying the designated power. An example of the at least one operation will be described later.

In an embodiment, the processor 110 may perform operation 606 on condition that the power is less than the designated power, and perform operation 611 on condition that the power is greater than or equal to the designated power.

FIG. 6A illustrates an example of executing operation 606 or operation 611 according to whether the power is less than the designated power, but operation 604 may be replaced with another operation. According to an embodiment, the processor may charge the battery using an antenna (e.g., the coil 160) and identify its charging state. For example, instead of executing operation 604, the processor 110 may identify whether the internal temperature of the electronic device 101 is equal to or greater than a designated temperature. For example, the processor 110 may execute operation 606 based on identifying that the temperature is equal to or greater than the designated temperature, and execute operation 611 based on identifying that the temperature is below the designated temperature. However, the disclosure is not limited thereto.

For example, in operation 604, the processor 110 may further identify whether the internal temperature of the electronic device 101 is equal to or greater than the designated temperature. For example, the processor 110 may identify whether the internal temperature of the electronic device 101 is equal to or greater than the designated temperature, on condition that the power is equal to or greater than the designated power. For example, the processor 110 may execute operation 611 on condition that the power is greater than or equal to the designated power and the temperature is less than the designated temperature, and may execute operation 606 on condition that the power is greater than or equal to the specified power and the temperature is greater than or equal to the designated temperature, and execute operation 606 on condition that the power is less than the designated power.

In the operation 606, the processor 110 may identify whether the state of the electronic device 101 is in either a first state or a second state. For example, the first state may be the first state defined through the description of FIGS. 2A and 2B (or the description of FIGS. 3A and 3B), and the second state may be the second state defined through the description of FIGS. 2A and 2B (or the description of FIGS. 3A and 3B). For example, since the electronic device 101 in the second state, providing a larger size than the electronic device 101 in the first state, is highly likely to be positioned relative to the external electronic device 102 in an unstable manner, the processor 110 may identify whether the state of the electronic device 101 is the first state or the second state. In an embodiment, the processor 110 may perform operation 608 on condition that the state of the electronic device 101 is the first state, and perform operation 610 on condition that the state of the electronic device 101 is the second state.

FIG. 6A shows an example of executing the operation 606 after executing the operation 604, but it is only for convenience of the description. The operations 604 and 606 may be replaced with other similar operations. For example, on condition that the power is less than the designated power and the state of the electronic device 101 is the first state, the processor 110 may execute the operation 608, and on condition that the power is less than the designated power and the state of the electronic device 101 is the second state, the processor 110 may execute the operation 610, and further, on condition that the power is equal to or greater than the designated power, the processor 110 may execute the operation 611. As another example, on condition that the power is less than the designated power while the electronic device 101 is in the first state, the processor 110 may execute the operation 608, and on condition that the power is less than the designated power while the electronic device 101 is in the second first state, the processor 110 may execute the operation 610, and further, on condition that the power is equal to or greater than the designated power, the processor 110 may execute the operation 611. However, it is not limited thereto.

In operation the 608, the processor 110, based on identifying that the state of the electronic device 101 is the first state, may display a first screen including first information to guide the electronic device 101 to be aligned with the external electronic device 102 for charging the battery 150.

For example, referring to FIG. 6B, the processor 110 may provide a display state 612, based on identifying that the state of the electronic device 101 is the first state defined through the description of FIGS. 2A and 2B. In the display state 612, the processor 110 may display a first screen 614 including first information 613 to guide the electronic device 101 to be aligned with the external electronic device 102 for charging the battery 150. For example, the first screen 614 may be displayed through another display (e.g., the other display defined through the description of FIGS. 2A and 2A) disposed on a surface of the second housing 220 opposite the second surface 221 of the second housing 220. For example, the other display may be disposed on the surface of the second housing 220 of the first housing 210 including the coil 160 and the second housing 220 not including the coil 160. For example, the other display may be disposed on the surface of the second housing 220, unlike the foldable display of the electronic device 101 disposed on the first surface 211 of the first housing 210 and the second surface 221 of the second housing 220.

In an embodiment, in the display state 612, the first information 613 may include a text 615 to guide a center part of a surface of the first housing 210 opposite the first surface 211 of the first housing 210 to be aligned with the center of the electronic device 102. For example, the first information 613 may include a visual object 616 within an area of the first screen 614 corresponding to the area in the first housing 210 in which the coil 160 of the electronic device 101 is located. For example, the visual object 616 may at least partially overlap at least part of the coil 160 (or the first antenna 183) when the other display is viewed from above. For example, the visual object 616 may at least partially overlap at least part of the second antenna 184 when the other display is viewed from above. For example, the processor 110 may display the visual object 616 in the area of the first screen 614 corresponding to the area in which the coil 160 is located, so that the user of the electronic device 101 can recognize how to change the position (or posture) of the electronic device 101 or the external electronic device 102 in order to place the electronic device 101 in alignment with the external electronic device 102. In an embodiment, the first screen 614 may further include an executable object 619 for executing a function of ceasing to display the first screen 614. However, it is not limited thereto.

In an embodiment, the first screen 614 may be superimposed on another screen.

For example, the first screen 614 may be superimposed on a lock screen 617. For example, the first screen 614 may be superimposed on the screen that was displayed through the other display immediately before displaying the first screen 614, in order to inform that the electronic device 101 is in a state different from the user's intention to charge the battery 150 of the electronic device 101. In an embodiment, the first screen 614 may further include a visual object 618 for providing at least part of information in the screen disposed beneath the first screen 614. For example, the processor 110 may further display in the first screen 614 the visual object 618 for providing information on the local time in the lock screen 617 covered with displaying the first screen 614 as superimposed on the lock screen 617. However, it is not limited thereto. In an embodiment, at least part of the first screen 614 may be formed to be translucent. For example, the processor 110 may display the first screen 614 translucently, so that the information on the lock screen 617 disposed beneath the first screen 614 can be viewed in the remaining area of the first screen 614 excluding the area displaying the first information 613. In an embodiment, the first screen 614 may include an opaque area displaying the first information 613 and a translucent remaining area. However, it is not limited thereto.

In an embodiment, displaying on the first screen 614 may change over time or based on the occurrence of another event. For example, the processor 110 may increase luminance of the first screen 614 to draw the user's attention, on condition that a specified time duration has elapsed from the timing of displaying the first screen 614 or based on the occurrence of another event. For example, the processor 110 may increase the size of the text 615 to draw the user's attention more, on condition that a specified time duration has elapsed from the timing of displaying the first screen 614 or based on the occurrence of another event. For example, the processor 110 may change the color of the text 615 or the visual object 616 to draw the user's attention further, on condition that a specified time duration has elapsed from the timing of displaying the first screen 614 or based on the occurrence of another event. For example, on condition that a specified time duration has elapsed from the timing of displaying the first screen 614, the processor 110 may further display a visual effect around the text 615 or the visual object 616 to draw the user's attention more. For example, the processor 110 may control the other display to cause at least one of the text 615 and the visual object 616 to blink to draw the user's attention more, on condition that a specified time duration has elapsed from the timing of displaying the first screen 614 or based on the occurrence of another event. According to embodiments, the processor 110 may output audio signals via a speaker of the electronic device 101 or provide vibrations through an actuator of the electronic device 101 to draw the user's attention, in lieu of changing the displaying on the first screen 614, on condition that a specified time duration has elapsed from the timing of displaying the first screen 614 or based on the occurrence of another event. However, it is not limited thereto.

For another example, referring to FIG. 6C, the processor 110, based on identifying that the state of the electronic device 101 is the first state defined through the description of FIGS. 3A and 3B, may provide a display state 660. In the display state 660, the processor 110 may display a first screen 662 including first information 661 to guide the electronic device 101 to be aligned with the external electronic device 102 for charging the battery 150. For example, the first screen 662 may be displayed through another display (e.g., the other display defined through the description of FIGS. 3A and 3B) disposed on a surface of the first housing 310 opposite the first surface 311 of the first housing 310. For example, the other display may be disposed on the surface of the first housing 310 of the first housing 310 not including the coil 160 and the second housing 320 including the coil 160. For example, the other display may be disposed on the surface of the first housing 310, as opposed to the foldable display of the electronic device 101 disposed on the first surface 311 of the first housing 310 and the second surface 321 of the second housing 320.

In an embodiment, in the display state 660, the first information 661 may include a text guiding to check an alignment with the external electronic device 102. For example, since the size of the other display is smaller than the size of the other display illustrated through the description of FIG. 6B, the text in the first information 661 may have more simplified information than the text 615. For example, since the size of the other display is smaller than the size of the other display illustrated through the description of FIG. 6B, the first information 661 may not include a visual object such as the visual object 616. For example, since the other display does not cover the location where the coil 160 is disposed in the second housing 320, the first information 661 may not include a visual object such as the visual object 616. As another example, unlike the illustration of FIG. 6C, the first information 661 may include a visual object such as the visual object 616 and may not include any texts. For example, when the coil 160 is included in a position in which the other display is disposed, the visual object in the first information 661 may be displayed at a position corresponding to the position of the coil 160. For another example, when the coil 160 is not included in the position in which the other display is disposed, the visual object in the first information 661 may be displayed at a position independent of the position of the coil 160. However, the arrangement is not limited thereto. In an embodiment, the first screen 662 may further include an executable object 663 for executing a function of ceasing to display the first screen 662. However, it is not limited thereto.

In an embodiment, displaying on the first screen 662 may change over time or based on the occurrence of another event. For example, the processor 110 may increase the luminance of the first screen 662 to call the user's attention, on condition that a specified time duration has elapsed from the timing of displaying the first screen 662 or based on the occurrence of another event. For example, the processor 110 may increase the size of the text in the first information 661 to draw the user's attention, on condition that a specified time has elapsed from the timing of displaying the first screen 662 or based on the occurrence of another event. For example, the processor 110 may change the color of the text in the first information 661 to draw the user's attention more, on condition that a specified time duration has elapsed from the timing of displaying the first screen 662 or based on the occurrence of another event. For example, on condition that a specified time duration has elapsed from the timing of displaying the first screen 662 or based on the occurrence of another event, the processor 110 may further display a visual effect around the text in the first information 661 to draw the user's attention further. For example, the processor 110 may control the other display to cause the text in the first information 661 to blink so as to draw the user's attention more, on condition that a specified time duration has elapsed from the timing of displaying the first screen 662 or based on the occurrence of another event. According to embodiments, the processor 110 may output audio signals via the speaker of the electronic device 101 or provide vibrations through the actuator of the electronic device 101 to draw the user's attention more, in lieu of changing displaying on the first screen 662, on condition that a specified time duration has elapsed from the timing of displaying the first screen 614 or based on the occurrence of another event. However, it is not limited thereto.

Referring back to FIG. 6A, in operation 610, the processor 110, based on identifying that the state of the electronic device 101 is the second state, may display a second screen including the first information and second information guiding to change the state of the electronic device 101 to the first state. For example, since a width of the electronic device in the second state is wider than that of the electronic device in the first state, the stability when the electronic device 101 in the second state is positioned relative to the external electronic device 102 may be lower than the stability when the electronic device 101 in the first state is positioned relative to the external electronic device 102. For example, the stability in alignment of the electronic device 101 in the second state with the external electronic device 102 is lower than the stability in alignment of the electronic device 101 in the first state with the external electronic device 102, and therefore, the second screen may further include the second information, unlike the first screen.

For example, referring to FIG. 6B, the processor 110 may provide a state 620, based on identifying that the state of the electronic device 101 is the second state defined through the description of FIGS. 2A and 2B. In the display state 620, the processor 110 may display the second screen 622 further including the second information 621. For example, unlike the first screen 614, the second screen 622 may be displayed through the foldable display disposed on the first surface 211 of the first housing 210 and the second surface 221 of the second housing 220.

In an embodiment, the second screen 622 may further include the second information 621, unlike the first screen 614. In an embodiment, the second information 621 may include a text guiding to change the state of the electronic device 101 to the first state. Although not shown in FIG. 6B, in an embodiment, the second information 621 may further include an image or an animation for guiding to change the state of the electronic device 101 to the first state.

In an embodiment, a visual object 616 in the second screen 622 may be displayed in an area adjacent to an edge 623 of the foldable display, unlike the visual object 616 displayed in the center area of the first screen 614. For example, since the visual object 616 in the second screen 622 is displayed at a position corresponding to the position where the coil 160 is located in the second state, the visual object 616 in the second screen 622 may be displayed in an area adjacent to the edge 623 of the foldable display.

In an embodiment, as opposed to the illustration of FIG. 6B, the second screen 622 may not include the first information 613, the text 615 in the first information 613, or the visual object 616 in the first information 613. For example, the processor 110 may display the second information 621 instead of displaying the first information 613, the text 615 in the first information 613, or the visual object 616 in the first information 613, within the screen 622 provided in the display state 620. In an embodiment, the screen 622 may include part of the first information 613, part of the text 615 in first information 613, or the visual object 616 in the first information 613, and the second information 621. However, it is not limited thereto.

In an embodiment, the second screen 622 may be superimposed on another screen, like the first screen 614. For example, the second screen 622 may be superimposed on a lock screen 617. For example, the second screen 622 may be superimposed on the screen that was displayed through the other display immediately before displaying the second screen 622, in order to inform that the electronic device 101 is in a state different from the user's intention to charge the battery 150 of the electronic device 101. In an embodiment, the second screen 622 may further include a visual object 618 to provide at least part of information in the screen disposed beneath the second screen 622. Since the size of the second screen 622 is larger than the size of the first screen 614, the visual object 618 in the second screen 622 may provide more information than the visual object 618 in the first screen 614. For example, the visual object 618 in the second screen 622 may include a thumbnail image of a screen disposed beneath the second screen 622, unlike the visual object 618 in the first screen 614. For example, the visual object 618 in the second screen 622 may further include at least one executable element 624 for executing at least one function provided through the screen disposed beneath the second screen 622, unlike the visual object 618 in the first screen 614. However, it is not limited thereto.

In an embodiment, displaying on the second screen 622 may change over time, as in displaying on the first screen 614.

As another example, referring to FIG. 6C, the processor 110 may provide a display state 670, based on identifying that the state of the electronic device 101 is the second state defined through the description of FIGS. 3A and 3B. In the display state 670, the processor 110 may display a second screen 672 including first information 671 and second information 675. For example, unlike the first screen 662, the second screen 672 may be displayed through the foldable display disposed on the first surface 311 of the first housing 310 and the second surface 321 of the second housing 320.

For example, the first information 671 may include a text 673 providing a more detailed description than the text in the first information 661. For example, the first information 671 may further include a visual object 674, unlike the first information 661. For example, the visual object 674 may at least partially overlap at least part of the coil 160 (or the first antenna 183), when the foldable display is viewed from above. For example, the visual object 674 may at least partially overlap at least part of the second antenna 184, when the foldable display is viewed from above.

For example, the second screen 672 may further include the second information 675, unlike the first screen 662. For example, the second screen 672 may further include an executable object 676 like the executable object 663 in the first screen 662. However, it is not limited thereto.

In an embodiment, the second screen 672 may be superimposed on another screen. For example, the second screen 672 may be superimposed on a lock screen 677. In an embodiment, the second screen 672 superimposed on the other screen (e.g., the lock screen 677) may further include a visual object 678 to provide at least some of information in the other screen. For example, the visual object 678 may include information on the local time in the lock screen 677. However, it is not limited thereto. In an embodiment, the second screen 672 may be configured to be translucent, unlike the first screen 662. For example, the processor 110 may display the second screen 672 translucently, so that information on the lock screen 677 can be viewed disposed below the second screen 672 in the remaining area in the second screen 672 excepting the area displaying the first information 671 and the second information 675. In an embodiment, the second screen 672 may include an opaque area displaying the first information 671 and the second information 675, and a semi-transparent remaining area. However, the arrangement is not limited thereto.

In an embodiment, displaying on the second screen 672 may change over time.

The visual object 616 and the visual object 674 may further include a visual element to guide the position of at least one coil of the external electronic device 102 or the center of the at least one coil. For example, each of the visual object 616 and the visual object 674 may further include a visual element 690 to indicate the position of the at least one coil or the center of the at least one coil of the external electronic device 102, as in a display state 691. For example, the visual element 690 may be displayed at a position identified based on the wireless signal. For example, the position of the visual element 690 may be identified through the second antenna 184. For example, the position of the visual element 690 may be identified through the first antenna 183 (or the coil 160) and the second antenna 184. For example, the visual element 690 may be moved according to a change in the relative location relationship between the electronic device 101 and the external electronic device 102. For example, the movement of the visual element 690 may be identified via the first antenna 183 (or the coil 160) and/or the second antenna 184. For example, when the first antenna 183 (or the coil 160) and the second antenna 184 are included within one housing, each of the visual object 616 and the visual object 674 may further include a portion 692 that at least partially overlaps the second antenna 184 when viewed from above. However, the disclosure is not limited thereto.

For example, when the user changes the position of the electronic device 101 or the position of the external electronic device 102, the display state 691 may be changed to the display state 693. For example, the change in the position of the electronic device 101 or the position of the external electronic device 102 may be identified through the first antenna 183 and/or the second antenna 184. In the display state 693, the visual element 690 may be displayed at the changed position.

The visual object 616 and/or the visual object 674 may further include a visual element for guiding the charging area of the electronic device 101, the at least one coil, or the position of the center of the at least one coil. For example, as in the display state 691, the visual object 616 and the visual object 674 may further include a visual element 690 indicating the charging area of the electronic device 101, the charging area of the external electronic device 102, the at least one coil of the external electronic device 102, or the position of the center of the at least one coil. For example, the visual element 690 may indicate the direction of the at least one coil of the external electronic device 102 with respect to the first antenna 183 (or coil 160) and/or the second antenna 184 (or the center of the first antenna 183 and/or the second antenna 184). Although FIG. 6A shows, in operation 610, an example of displaying the second screen including the first information and the second information, the processor 110 may display the first information of the first information and the second information in operation 610. For example, unlike the operation 608, the processor 110 may display, in operation 610, the second information instead of displaying the first information. In an embodiment, the processor 110 may display part of the first information and the second information. However, it is not limited thereto.

Referring back to FIG. 6A, in operation 611, the processor 110 may display a third screen including third information to guide that the battery 150 is in charging, based on identifying that the power is equal to or greater than the designated power. In an embodiment, the third screen may further include fourth information, on condition that the state of the electronic device 101 is the second state. For example, the fourth information may be displayed in the third screen to guide a recommendation to change the state of the electronic device 101 to the first state.

For example, referring to FIG. 6B, the processor 110 may provide a display state 640, based on identifying that the power is no less than the designated power while the state of the electronic device 101 is the first state defined through the description of FIGS. 2A and 2B. For example, in the display state 640, the processor 110 may display a third screen 642 including third information 641 to guide that the battery 150 is in charging. For example, the third information 641 may be displayed on the coil 160 (or the first antenna 183) or on the second antenna 184. For example, the third information 641 may include at least one of a visual object or a text for indicating the remaining amount of the battery 150 in charging. In an embodiment, the third screen 642 may further include information 643 indicating a time to be taken until the battery 150 is fully charged. However, it is not limited thereto. In an embodiment, the third screen 642 may disappear after being displayed for a specified time duration.

For another example, the processor 110 may provide a display state 650 based on identifying that the power is greater than or equal to the designated power while the state of the electronic device 101 is the second state defined through the description of FIGS. 2A and 2B. For example, in the display state 650, the processor 110 may display a third screen 652 including fourth information 651 as well as the third information 641. For example, since the electronic device 101 in the second state is positioned relative to the external electronic device 102 in a more unstable state than the electronic device 101 in the first state, the third screen 652 may further include the fourth include information 651. For example, the fourth information 651 may include a text to guide a recommendation to change the state of the electronic device 101 to the first state. For example, the third screen 652 may further include information 653 to indicate the time to be taken until the battery 150 is fully charged, like the information 643 in the third screen 642. However, it is not limited thereto. In an embodiment, the third screen 652 may disappear after being displayed for a specified time duration.

The display state 650 shows an example in which the third information 641 is displayed in the center area, but the third information 641 may be displayed in the coil 160 (or the first antenna 183) and/or on the second antenna 184. However, the present disclosure is not limited thereto.

For another example, referring to FIG. 6C, the processor 110 may provide a display state 680 based on identifying that the power is greater than or equal to the designated power while the state of the electronic device 101 is the second state defined through the description of FIGS. 3A and 3B. For example, in the display state 680, the processor 110 may display the third screen 682 including the third information 681. For example, the third information 681 may be displayed in the coil 160 (or the first antenna 183) and/or on the second antenna 184. However, the present disclosure is not limited thereto.

For example, the third information 681 may include at least one of a visual object or a text for indicating a remaining amount of the battery 150 in charging. Although not shown in FIG. 6C, the third screen 682 may further include information to indicate a time to be taken until the battery 150 is fully charged. However, it is not limited thereto. In an embodiment, the third screen 682 may disappear after being displayed for a specified time duration.

For another example, the processor 110 may provide a display state 683 based on identifying that the power is greater than or equal to the designated power while the state of the electronic device 101 is the second state defined through the description of FIGS. 3A and 3B. For example, in the display state 683, the processor 110 may display a third screen 685 including fourth information 684 as well as the third information 681. For example, the electronic device 101 in the second state is positioned relative to the external electronic device 102 in a more unstable state than the electronic device 101 in the first state, and therefore, the third screen 685 may further include the fourth information 684. For example, the fourth information 684 may include a text to guide a recommendation to change the state of the electronic device 101 to the first state. For example, the third screen 685 may further include information 686 indicating a time to be taken until the battery 150 is fully charged. However, it is not limited thereto. In an embodiment, the third screen 685 may disappear after being displayed for a specified time duration.

As described above, the electronic device 101 can adaptively display a screen according to the state of the electronic device 101. For example, the electronic device 101 can provide different screens according to whether the state of the electronic device 101 is either the first state or the second state, on condition that the electric power is less than a designated power level, thereby preventing charging of the battery 150 from being not performed or abnormally performed due to misalignment in between the electronic device 101 and the external electronic device 102.

Figure 7A:
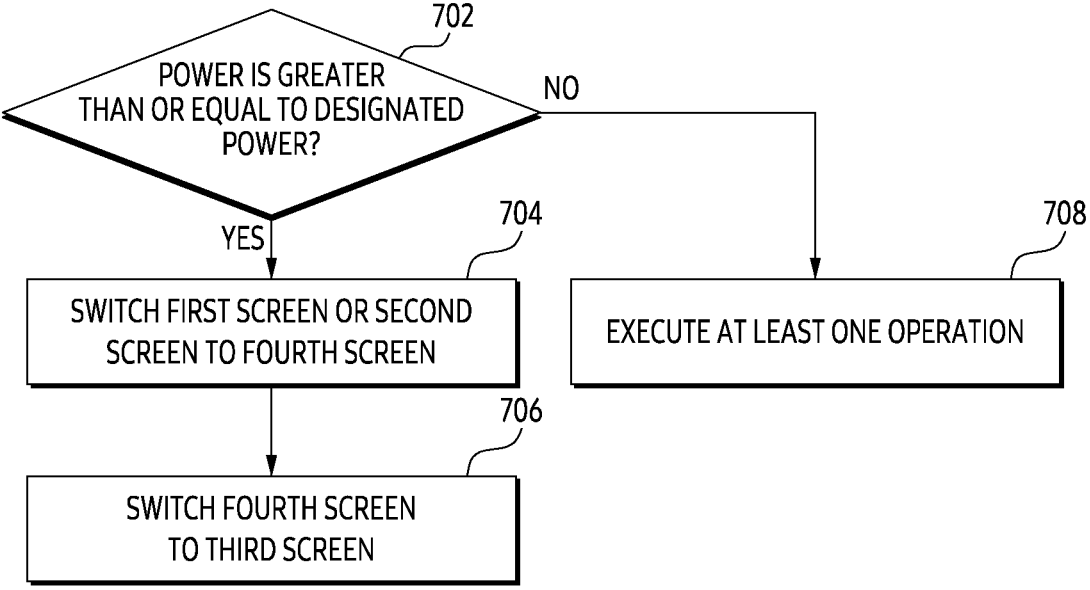
FIG. 7A is a flowchart illustrating a method of switching a screen according to an embodiment.

FIG. 7A is a flowchart illustrating a method of switching the screen according to an embodiment. This method may be executed by the electronic device 101 illustrated in FIGS. 1A, 1B, 1C, 2A, 2B, 3A and 3B or the processor 110 of the electronic device 101 illustrated in FIG. 1C.

Figure 7B:
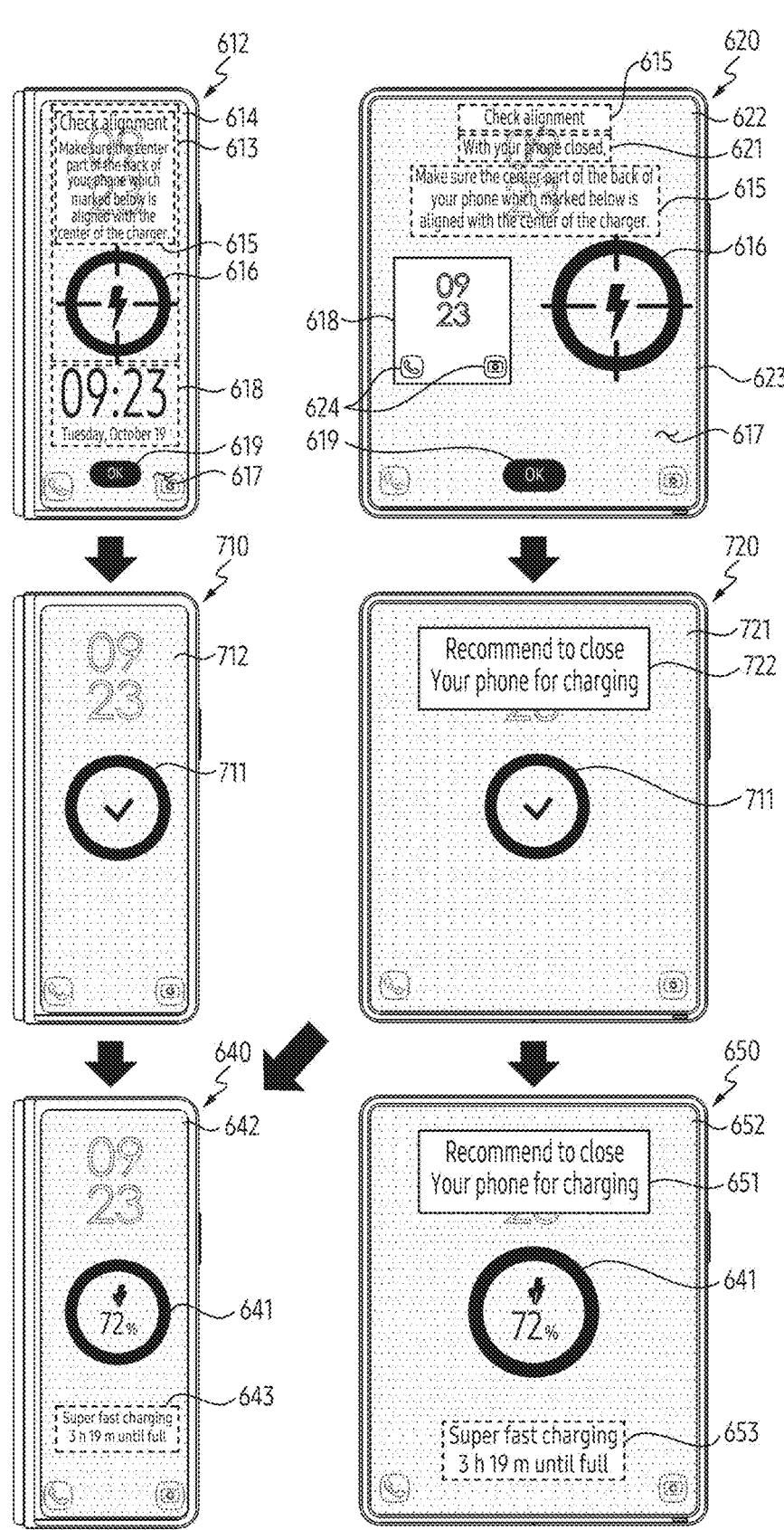
FIG. 7B illustrates examples of screens switched in an unfolding state or a folding state according to an embodiment.

FIG. 7B illustrates examples of a screen switched in an unfolding state or a folding state, according to an embodiment.

Figure 7C:
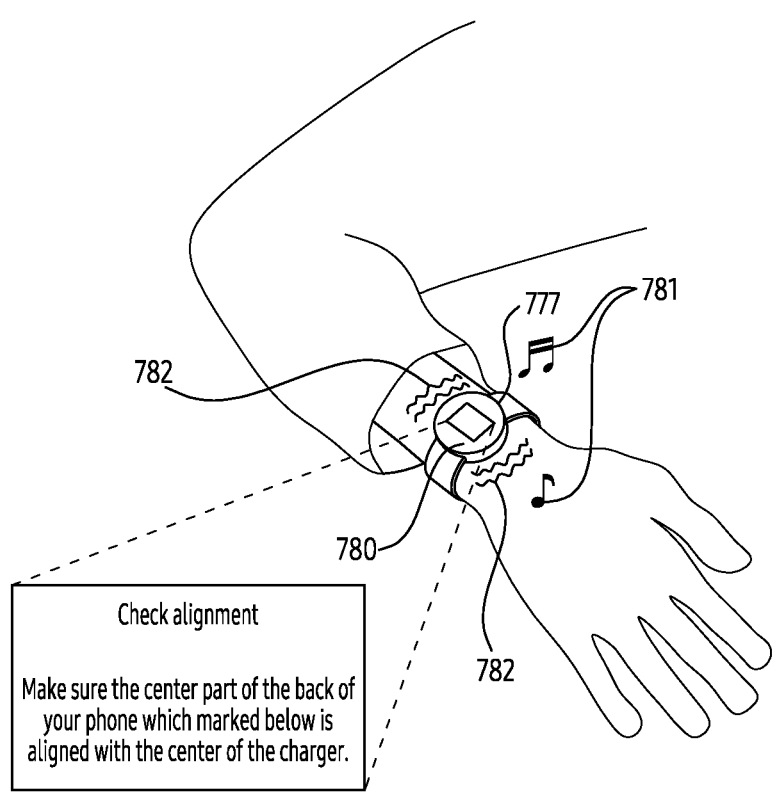
FIG. 7C illustrates an example of providing a notification through a wearable electronic device when electric power is kept at less than a predetermined power level, according to an embodiment.
Figure 7C:
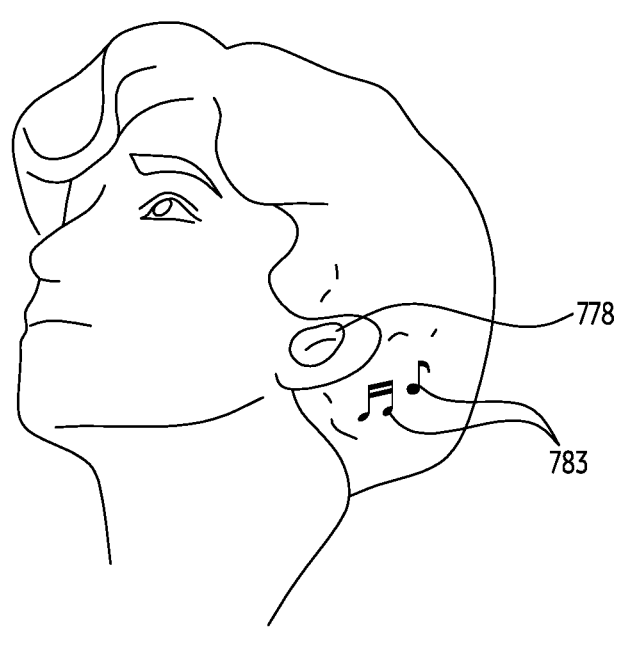

FIG. 7C illustrates an example of providing a notification through a wearable electronic device when it is maintained the state that the power is less than a designated power, according to an embodiment.

Referring to FIG. 7A, in operation 702, the processor 110 may identify whether the power provided based on the wireless signal is greater than or equal to a designated power, based on displaying the first screen or the second screen defined through the description of FIGS. 6A to 6D. For example, the processor 110 may identify whether or not the power is greater than or equal to the designated power, in order to identify whether the power for charging the battery 150 is changed from a first power less than the designated power to a second power greater than or equal to the designated power. In an embodiment, the processor 110 may execute operation 704 on condition that the power obtained from the external electronic device 102 is equal to or greater than the designated power after displaying the first screen or the second screen, or execute operation 708 on condition that the power is less than the designated power after a specified time duration has elapsed from the timing of displaying the first screen or the second screen.

In operation 704, the processor 110 may switch the first screen or the second screen to a fourth screen including fourth information to guide the electronic device 101 to be in alignment with the external electronic device 102, based on identifying that the power is equal to or greater than the designated power. For example, the fourth information may be displayed in the fourth screen to indicate that charging of the battery 150 is to be carried out with the arrangement. For example, referring to FIG. 7B, on condition that the power is equal to or greater than the designated power, the processor 110 may change the display state 612 displaying the first screen 614 to the display state 710 or change the display state 620 displaying the second screen 622 to the display state 720. For example, when the user adjusts the position of the electronic device 101 in the first state positioned relative to the external electronic device 102 for alignment in between the electronic device 101 and the external electronic device 102, the processor 110 may change the display state 612 to the display state 710. As another example, when the user switches the state of the electronic device 101 positioned relative to the external electronic device 102 from the second state to the first state and causes the electronic device 101 in the switched first state to align with the external electronic device 102, the processor 110 may change the display state 620 to the display state 720. However, it is not limited thereto.

For example, in the display state 710, the processor 110 may display a fourth screen 712 including fourth information 711 to guide that the electronic device 101 is aligned with the external electronic device 102. For example, the fourth screen 712 may be displayed through the other display. For example, the fourth information 711 in the fourth screen 712 may include a visual object. For example, the visual object may be displayed at a position corresponding to the position of the coil 160. For example, the visual object may have a shape in which part of the shape of the visual object 616 is changed. For example, the visual object may have a shape in which part of the shape of the visual object 616 is changed, in order to indicate that the alignment state in between the electronic device 101 and the external electronic device 102 in relation to charging of the battery 150 is changed from a misaligned arrangement to an aligned arrangement. However, it is not limited thereto.

In an embodiment, although not shown in FIG. 7A, the processor 110 may change the display state 620 to the display state 720, on condition that the electronic device 101 in the second state is aligned with the external electronic device 102. For example, in the display state 720, the processor 110 may display a fifth screen 721 including fourth information 711 to guide that the electronic device 101 is aligned with the external electronic device 102 and fifth information 722 to guide to change the state of the electronic device 101 to the first state. For example, a difference between the size of the electronic device 101 in the second state and the size of the external electronic device 102 is larger than a difference between the size of the electronic device 101 in the first state and the size of the external electronic device 102, and therefore, the alignment of the electronic device 101 in the second state and the external electronic device 102 may be more easily broken by an external force or impact than the alignment of the electronic device 101 in the first state and the external electronic device 102. Since the stability in alignment of the electronic device 101 in the first state and the external electronic device 102 is higher than the stability in alignment of the electronic device 101 in the second state and the external electronic device 102, the processor 110 may display the fifth screen 721 further including the fifth information 722 to guide to change to the first state.

In an embodiment, the fourth information 711 may be displayed at a position corresponding to the displayed position of the visual object 616 in the display state 620, unlike the illustration of FIG. 7B displaying the fourth information 711 in the center area of the other display. However, it is not limited thereto.

Referring back to FIG. 7A, in operation 706, the processor 110 may switch the fourth screen to the third screen, after displaying the fourth screen for a specified time duration or after some other condition occurs. For example, the processor 110 may change the fourth screen to the third screen. For example, the third screen may be the third screen defined through the description of the operation 611 in FIG. 6A. For example, referring to FIG. 7B, the processor 110 may change the display state 710 to the display state 640, based on identifying that the specified time duration has elapsed from the timing of providing the display state 710.

Although not shown in FIG. 7A, in an embodiment, the processor 110 may change the display state 720 to the display state 640, on condition that the state of the electronic device 101 is changed to the first state while providing the display state 720.

Although not shown in FIG. 7A, in an embodiment, the processor 110 may change the display state 720 to the display state 650, based on identifying that the specified time duration has elapsed from the timing of providing the display state 720 and the second state is maintained.

Referring back to FIG. 7A, in operation 708, the processor 110 may execute at least one operation, based on identifying that after a lapse of the specified time duration from the timing of displaying the first screen or the second screen the power is maintained in a level less than the designated power.

In an embodiment, the processor 110 may execute the at least one operation by changing displaying of the first screen or the second screen, based on identifying that after a lapse of the specified time duration from the timing of displaying the first screen or the second screen the power is maintained in a level less than the designated power. For example, changing displaying of the first screen or the second screen may be executed by the operations exemplified through the descriptions of FIGS. 5A and 5B and 6A, 6B, 6C and 6D.

In an embodiment, the processor 110, based on identifying that after a lapse of the specified time duration from the timing of displaying the first screen or the second screen the power is maintained in a level less than the designated power, may execute the at least one operation by providing a preset notification using another output device distinct from at least one display (e.g., a display 125) of the electronic device 101. For example, the processor 110 may provide the preset notification by outputting audio signals through a speaker of the electronic device 101. In an embodiment, the audio signals are generated by a device communicatively connected or otherwise associated with the electronic device 101, such as a wearable device (e.g., headphones, a smart watch), a speaker, another electronic device, or the like. In an embodiment, the audio signals may be output based on a direction in which the electronic device 101 positioned relative the external electronic device 102 is moved for alignment of the electronic device 101 with the external electronic device 102. For example, when the direction in which the electronic device 101 is to be moved is a first direction and the electronic device 101 includes a plurality of speakers, the processor 110 may identify at least one speaker of the plurality of speakers, disposed at a position corresponding to the first direction, and then output the audio signals through the at least one speaker. As another example, the processor 110 may provide the preset notification by providing vibrations or bounce through an actuator of the electronic device 101. In an embodiment, the vibrations may be provided in a direction in which the electronic device 101 positioned relative to the external electronic device 102 is moved to align the electronic device 101 with the external electronic device 102. For example, when the direction in which the electronic device 101 is to be moved is the first direction, the processor 110 may identify at least one actuator that can provide vibrations in the first direction, among a plurality of actuators included in the electronic device 101, and then provide the vibrations through the at least one actuator.

In an embodiment, the processor 110, based on identifying that the power is maintained below the designated power after the specified time duration has elapsed from the timing of displaying the first screen or the second screen, may execute the at least one operation by transmitting to another electronic device a signal for providing a preset notification via other electronic device, through the communication circuitry 130. For example, the other electronic device may be the external electronic device 102 or another external electronic device that cooperates with or is connected to the electronic device 101. In an embodiment, the other electronic device may be a wearable device connected to the electronic device 101 such as, e.g., a smart watch, earbuds, AR glasses or the like.

For example, referring to FIG. 7C, the processor 110, based on identifying that the power is maintained below the designated power after the specified time duration has elapsed from the timing of displaying the first screen or the second screen, may transmit the signal through the communication circuitry 130 to a wearable device 777 (e.g., a smart watch) connected to the electronic device 101 and worn by the user of the electronic device 101. For example, the signal may cause the wearable device 777 to display a screen 780 including at least one of the first information or the second information through a display of the wearable device 777. For example, the signal may cause the wearable device 777 to output preset audio signals 781 through a speaker of the wearable device 777. For example, the signal may cause the wearable device 777 to provide preset vibrations 782 through an actuator of the wearable device 777.

As another example, the processor 110, based on identifying that the power is maintained below the designated power after the specified time duration has elapsed from the timing of displaying the second screen, may transmit the signal to the wearable device 778 (e.g., an earbud) worn by the user of the electronic device 101, through the communication circuitry 130. For example, the signal may cause the wearable device 778 to output preset audio signals 783 through a speaker of the wearable device 778. For example, the preset audio signals 783 may include voice signals, unlike the preset audio signals 781. For example, the voice signals may provide vocal content to guide the electronic device 101 to be aligned with the external electronic device 102 for charging the battery 150. However, it is not limited thereto.

As described above, the electronic device 101 can provide such a notification using various schemes after a lapse of a specified time duration from the timing of displaying the first screen or the second screen or based on another condition occurring, so that the user can easily recognize that the charging of the battery 150 is abnormally performed or substantially not performed, as opposed to the user's intention.

Figure 8:
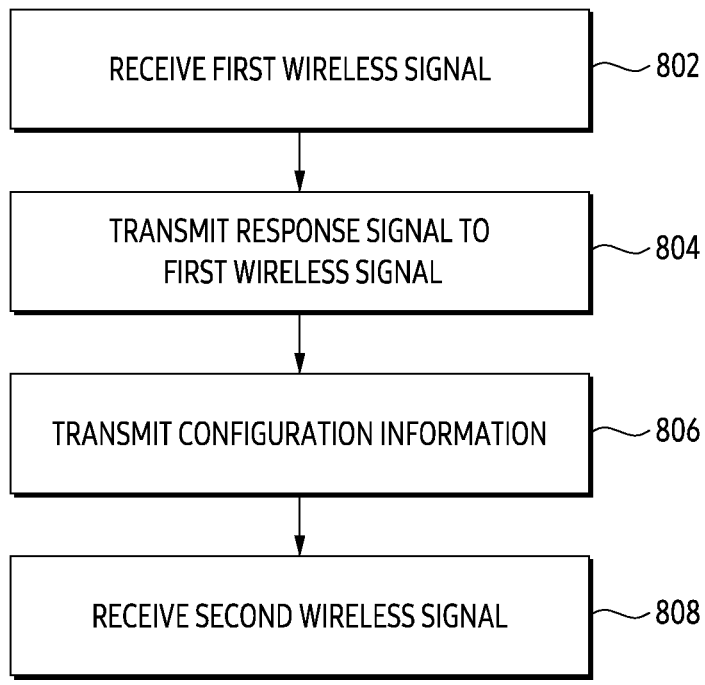
FIG. 8 is a flowchart illustrating a method of wirelessly acquiring electric power according to an embodiment.

FIG. 8 is a flowchart illustrating a method of wirelessly obtaining the electric power according to an embodiment. This method may be executed by the electronic device 101 illustrated in FIGS. 1A, 1B, 1C, 2A, 2B, 3A, 3B, 4A and 4B or the processor 110 of the electronic device 101 illustrated in FIG. 1C.

Operations 802 to 808 of FIG. 8 may be associated with the operation 602.

Referring to FIG. 8, in operation 802, the processor 110 may receive a first wireless signal from the external electronic device 102 through the coil 160. For example, the first wireless signal may be a signal distinct from the wireless signal received in the operation 602 of FIG. 6A. For example, the first wireless signal may be a signal transmitted from the external electronic device 102 to identify whether the electronic device 101 positioned relative to the external electronic device 102 requires charging of the power. For example, the external electronic device 102 may transmit the first wireless signal, in order to identify that an object comes into contact with at least a part of a housing of the external electronic device 102, and based on the identification, identify whether the object brought into contact with the part is a device requiring charging of the power like the electronic device 101 or any other foreign matter. For example, the external electronic device 102 may identify that the object is in contact with the at least a part of the housing of the external electronic device 102, based on a change in capacitance caused to the at least a part of the housing of the external electronic device 102. For another example, the external electronic device 102 may identify that the object is in contact with the at least a part of the housing of the external electronic device 102, based on a signal received through an NFC circuitry or a UWB communication circuitry of the external electronic device 102. However, it is not limited thereto.

In operation 804, in response to receiving the first wireless signal, the processor 110 may transmit a response signal to the first wireless signal to the external electronic device 102 through the coil 160. For example, the processor 110 may obtain the response signal based on load modulation, and then transmit the obtained response signal to the external electronic device 102 through the coil 160. For example, the response signal may be transmitted from the electronic device 101 to the external electronic device 102 to indicate that the electronic device 101 is to obtain the power wirelessly from the external electronic device 102.

In operation 806, after transmitting the response signal, the processor 110 may transmit identification information of the electronic device 101 and/or configuration information including information indicating the maximum amount of power that the electronic device 101 can obtain or process, to the external electronic device 102 through the coil 160. Based on receiving the response signal within a specified time duration from the timing of transmitting the first wireless signal or some other condition being satisfied, the external electronic device 102 may identify that the object in contact with the at least a part of the housing of the external electronic device 102 is a device requesting charging of the battery, and based on the identification, receive the configuration information from the electronic device 101.

In an embodiment, the designated power defined through the description of the operation 604 of FIG. 6A may be identified based on the configuration information. For example, the designated power may be identified based on the maximum amount of power that the electronic device 101 can obtain or process. For example, the designated power may be identified based on a requested amount of power that the electronic device 101 requests from the external electronic device 102.

The designated power may be identified based on another criterion distinct from the configuration information. In an embodiment, the designated power may be identified based on the remaining amount of the battery 150. For example, on condition that the remaining amount of the battery 150 is of a first value, the processor 110 may identify the designated power as a first power value, and on condition that the remaining amount of the battery 150 is of a second value lower than the first value, the processor 110 may identify the designated power as a second power value lower than the first power value.

In an embodiment, the designated power may be identified based on a place where the electronic device 101 is located. For example, when the electronic device 101 is connected to a head unit in a vehicle through a Bluetooth communication circuitry, the processor 110 may identify data on the charging history in the vehicle, identify the power that can be wirelessly obtained from the external electronic device 102 located in the vehicle based on the data, and then identify the designated power based on the identified power. However, it is not limited thereto.

In an embodiment, the designated power may be identified based on time of day. For example, the processor 110 may store information on the charging history of the battery 150 whenever the battery 150 is charged, and identify the designated power based on the power obtained in hours when charging of the battery 150 occurs most frequently from the stored information. However, it is not limited thereto.

In an embodiment, the designated power may be identified based on a health condition of the battery 150.

In operation 808, the processor 110 may receive a second wireless signal from the external electronic device 102 through the coil 160. For example, the second wireless signal may be the wireless signal defined through the description of the operation 602. For example, the second wireless signal may be transmitted from the external electronic device 102 to the electronic device 101 until a transmission complete packet is received from the electronic device 101. For example, the transmission complete packet may be transmitted from the electronic device 101 to the external electronic device 102 based on identifying that the charging of the battery 150 is complete.

As described above, the electronic device 101 can obtain the power wirelessly from the external electronic device 102 by exchanging signals or information with the external electronic device 102 through the coil 160. In an embodiment, the electronic device 101 may identify the designated power used in the operation 604 of FIG. 6A, based on exchanging the signals or the information with the external electronic device 102. Since the designated power is used to define a condition to display the first screen, the second screen, or the third screen, the electronic device 101 can provide a screen (e.g., the first screen, the second screen, or the third screen) that is suitable for its situation.

Figure 9:
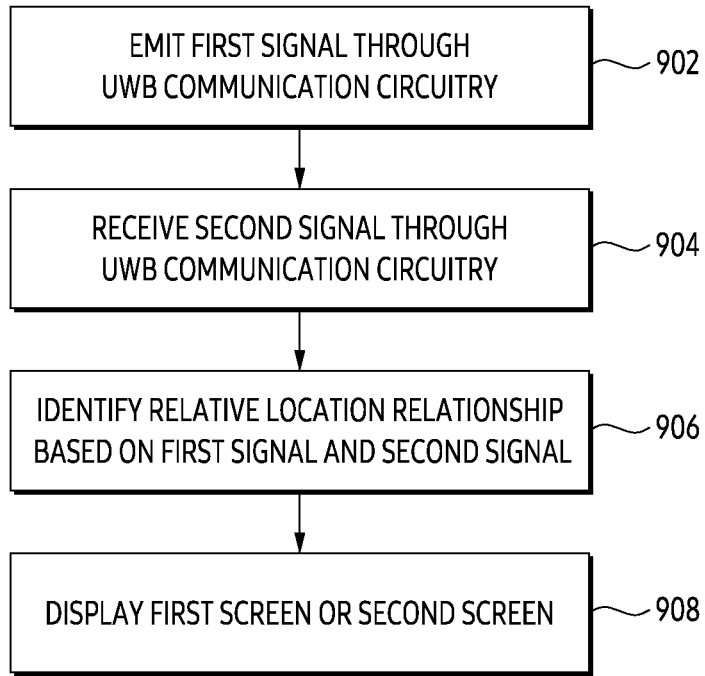
FIG. 9 is a flowchart illustrating a method of identifying a relative location relationship between an electronic device and an external electronic device through an ultra-wide band (UWB) communication circuitry according to an embodiment.

FIG. 9 is a flowchart illustrating a method of identifying a relative location relationship between an electronic device and an external electronic device through a UWB communication circuitry according to an embodiment. This method may be executed by the electronic device 101 illustrated in FIGS. 1A, 1B, 1C, 2A, 2B, 3A, 3B, 4A and 4B or the processor 110 of the electronic device 101 illustrated in FIG. 1C.

Operations 902 to 908 of FIG. 9 may be related to the operations 604, 608, and 610 of FIG. 6A.

Referring to FIG. 9, in operation 902, the processor 110 may emit a first signal through a UWB communication circuitry (e.g., a communication circuitry 130). In an embodiment, the processor 110, based on the wireless signal received in the operation 602 of FIG. 6A or the first wireless signal received in the operation 802 of FIG. 8, may emit the first signal through the UWB communication circuitry. In an embodiment, the processor 110 may identify a time slot in which charging of the battery 150 has been frequently performed based on the information on the charging history stored in the electronic device 101, and then emit the first signal based on the identified time slot. In an embodiment, the processor 110 may emit the first signal based on establishing connection with another electronic device. For example, the other electronic device may be the external electronic device 102 or another external electronic device distinct from the external electronic device 102.

In operation 904, the processor 110 may receive a second signal in which at least part of the first signal has been reflected by the external electronic device 102, through the UWB communication circuitry.

In operation 906, the processor 110 may identify a relative location relationship between the electronic device 101 and the external electronic device 102 based on the first signal and the second signal. For example, the processor 110 may identify the relative location relationship based on at least one of the transmission timing of the first signal, the reception timing of the second signal, the transmission strength of the first signal, the reception strength of the second signal, or angle of arrival (AoA) of the second signal. For example, the processor 110 may transmit the first signal via a first antenna and a second antenna connected to the UWB communication circuitry, receive the second signal via the first antenna and the second antenna, and identify AoA of the second signal, based on a phase difference between the second signal received through the first antenna and the second signal received through the second antenna. However, the arrangement is not limited thereto.

In operation 908, the processor 110 may display the first screen or the second screen based on the relative location relationship. In an embodiment, the processor 110 may use only the relative location relationship without identifying whether the power is less than the designated power as in operation 604, to identify that the charging of the battery 150 is abnormally performed or substantially not performed, and based on the identification, display the first screen or the second screen. In an embodiment, the processor 110 may display the first screen or the second screen, based on identifying the relative location relationship together with identifying whether the power is less than the designated power, as in operation 604.

As described above, based on the first signal transmitted through the UWB communication circuitry and the second signal received through the UWB communication circuitry, the electronic device 101 can identify the relative location relationship between the electronic device 101 and the external electronic device 102 and identify the charging state of the battery 150 based on the identified relative location relationship, thereby enhancing the function of charging the battery 150.

Figure 10:
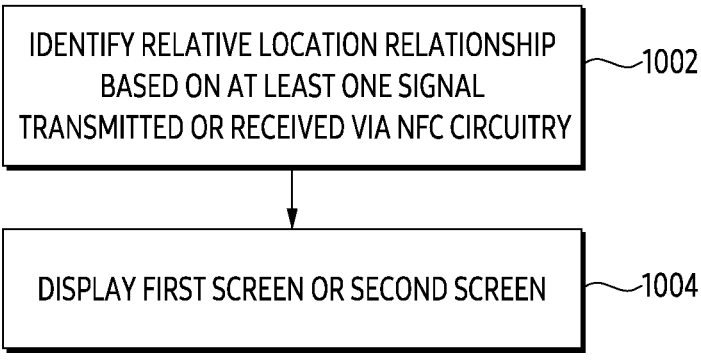
FIG. 10 is a flowchart illustrating a method of identifying a relative location relationship between an electronic device and an external electronic device through a near-field communication (NFC) communication circuitry according to an embodiment.

FIG. 10 is a flowchart illustrating a method of identifying a relative location relationship between an electronic device and an external electronic device through an NFC communication circuitry according to an embodiment. This method may be executed by the electronic device 101 illustrated in FIGS. 1A, 1B, 1C, 2A, 2B, 3A, 3B, 4A and 4B or the processor 110 of the electronic device 101 illustrated in FIG. 1C.

Operations 1002 and 1004 of FIG. 10 may be associated with the operations 604, 608, and 610 of FIG. 6A.

Referring to FIG. 10, in operation 1002, the processor 110 may identify a relative location relationship between the electronic device 101 and the external electronic device 102 based on at least one signal transmitted or received through the NFC circuitry. In an embodiment, the processor 110 may transmit a signal through the NFC circuitry based on the wireless signal received in the operation 602 of FIG. 6A or the wireless signal received in the operation 802 of FIG. 8, and receive a response signal to the signal from the external electronic device 102. For example, the processor 110 may identify the relative location relationship between the electronic device 101 and the external electronic device 102 based on the reception strength of the response signal.

In operation 1004, the processor 110 may display the first screen or the second screen based on the relative location relationship. In an embodiment, the processor 110 may identify that the charging of the battery 150 is abnormally performed or substantially not performed, by only using the relative location relationship without identifying whether the power is less than the designated power as in operation 604, and display the first screen or the second screen based on the identification. In an embodiment, the processor 110 may display the first screen or the second screen, based on identifying the relative location relationship together with identifying whether the power is less than the designated power as in operation 604.

As described above, the electronic device 101 can identify the relative location relationship between the electronic device 101 and the external electronic device 102 based on the at least one signal transmitted or received through the NFC circuitry, and identify the state of charging of the battery 150 based on the identified relative location relationship, thereby enhancing the function of charging the battery 150.

Figure 11:
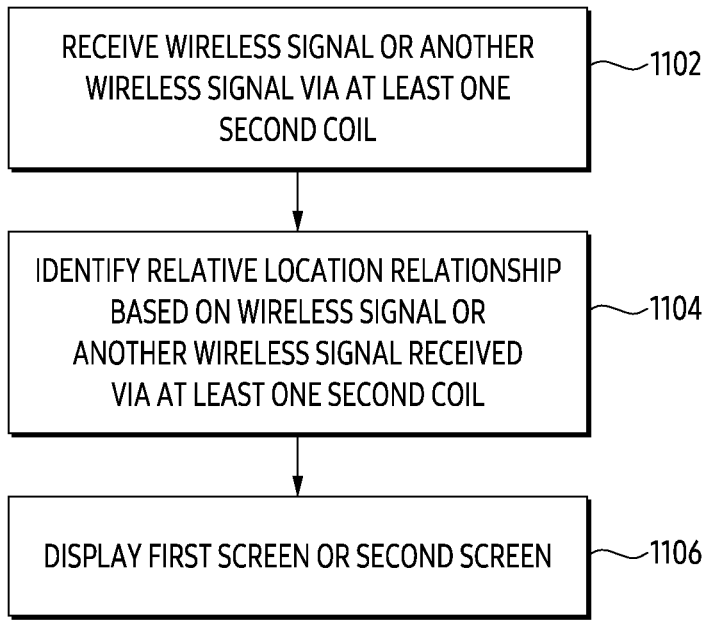
FIG. 11 is a flowchart illustrating a method of identifying a relative location relationship between an electronic device and an external electronic device through at least one second coil according to an embodiment.

FIG. 11 is a flowchart illustrating a method of identifying a relative location relationship between an electronic device and an external electronic device through at least one second coil, according to an embodiment. This method may be executed by the electronic device 101 illustrated in FIGS. 1A, 1B, 1C, 2A, 2B, 3A, 3B, 4A and 4B or the processor 110 of the electronic device 101 illustrated in FIG. 1C.

Operations 1102 to 1106 of FIG. 11 may be associated with the operations 604, 608, and 610 of FIG. 6A.

Referring to FIG. 11, in operation 1102, while receiving the wireless signal defined through the description of the operation 602 of FIG. 6A, through at least one first coil of the electronic device 101, the processor 110 may receive the wireless signal through at least one second coil of the electronic device 101, or receive another wireless signal distinct from the wireless signal through the at least one second coil. For example, the coil 160 may include the at least one first coil and the at least one second coil. For example, the at least one first coil may be used to obtain the power for charging the battery 150, and the at least one second coil may be used to identify whether the electronic device 101 is aligned with the external electronic device 102. For example, the other wireless signal may be used to identify whether the electronic device 101 is aligned with the external electronic device 102, unlike the wireless signal used to charge the battery 150. In an embodiment, the at least one second coil may be disposed at another position distinct from the position at which the at least one first coil is disposed. In an embodiment, the at least one second coil may be electrically separated from the at least one first coil. However, it is not limited thereto.

In operation 1104, the processor 110, based on the wireless signal received through the at least one second coil or the other wireless signal received through the at least one second coil, may identify the relative location relationship between the electronic device 101 and the external electronic device 102. For example, based on the reception strength of the wireless signal received through the at least one second coil or the reception strength of the other wireless signal received through the at least one second coil, the processor 110 may identify the relative location relationship. However, it is not limited thereto.

In operation 1106, the processor 110 may display the first screen or the second screen based on the relative location relationship. In an embodiment, the processor 110 may identify that the charging of the battery 150 is abnormally performed or substantially not performed, by only using the relative location relationship without identifying whether the power is less than the designated power as in operation 604, and then display the first screen or the second screen based on the identification. In an embodiment, the processor 110 may display the first screen or the second screen, based on identifying the relative location relationship together with identifying whether the power is less than the designated power as in operation 604.

As described above, the electronic device 101 can identify the relative location relationship between the electronic device 101 and the external electronic device 102, based on the wireless signal or the other wireless signal received through the at least one second coil distinct from the at least one first coil used for charging the battery 150, and identify the state of charging of the battery 150 based on the identified relative location relationship, thereby enhancing the function of charging the battery 150.

Figure 12A:
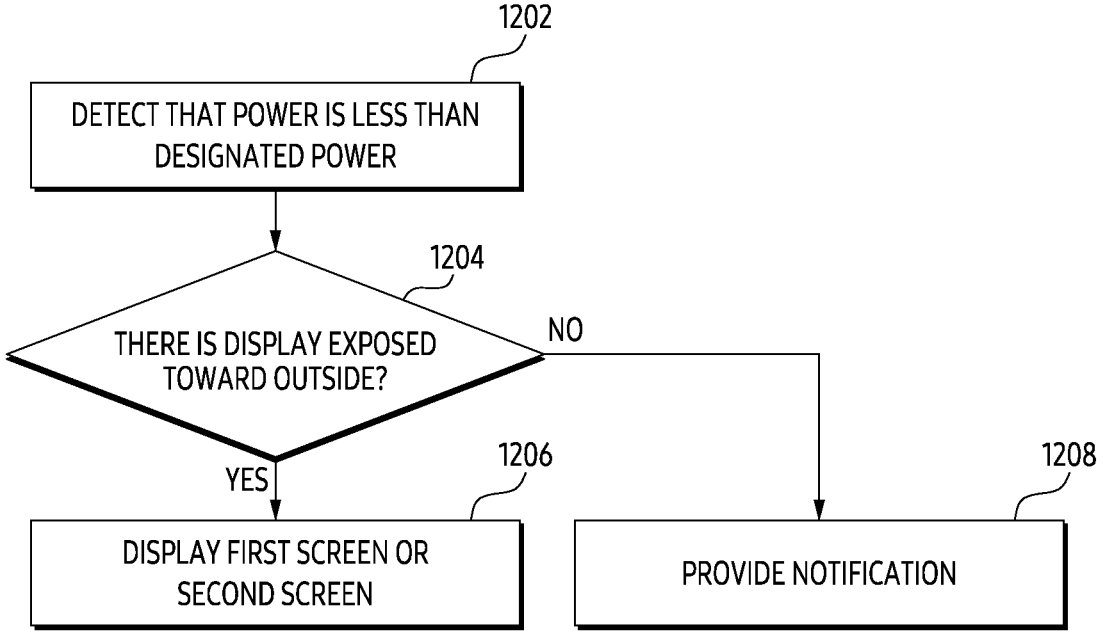
FIG. 12A is a flowchart illustrating a method of providing a notification when a surface of a housing of an electronic device including a display comes into contact with an external electronic device according to an embodiment.

FIG. 12A is a flowchart illustrating a method of providing a notification when a surface of a housing of an electronic device including a display comes into contact with an external electronic device, according to an embodiment. This method may be executed by the electronic device 101 illustrated in FIGS. 1A, 1B, 1C, 2A, 2B, 3A and 3B or the processor 110 of the electronic device 101 illustrated in FIG. 1C.

Figure 12B:
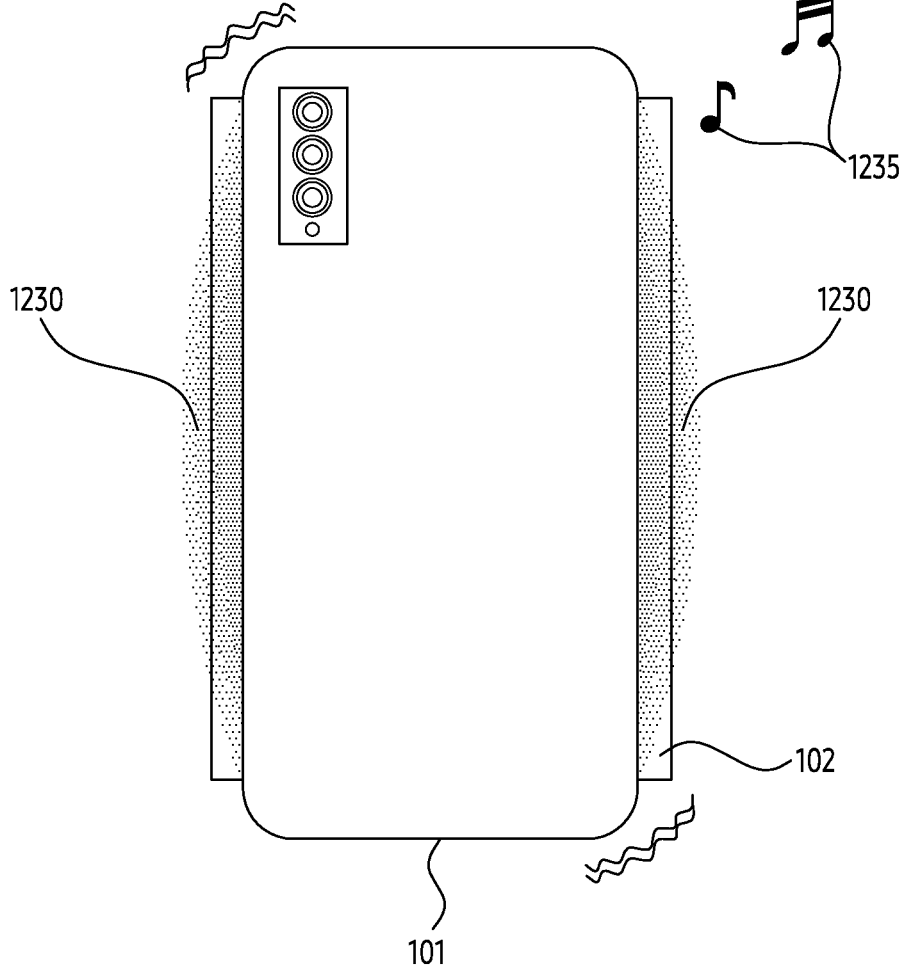
FIG. 12B illustrates an example of a notification provided when a surface of a housing of an electronic device including a display comes into contact with an external electronic device, according to an embodiment.

FIG. 12B illustrates an example of a notification provided when a surface of a housing of an electronic device including a display is brought into contact with an external electronic device, according to an embodiment.

Referring to FIG. 12A, in operation 1202, the processor 110 may detect that the power obtained based on the wireless signal received from the external electronic device 102 through the coil 160 is less than the designated power. For example, the processor 110, based on detecting that the power is less than the designated power, may identify that the electronic device 101 positioned relative to the external electronic device 102 for charging the battery 150 is not properly aligned with the external electronic device.

In operation 1204, based on the detection, the processor 110 may identify whether there is a display exposed toward the outside of at least one display of the electronic device 101 positioned relative to the external electronic device 102. For example, the processor 110 may identify whether there is a display exposed to the outside, for identifying a method to inform that the electronic device 101 positioned relative to the external electronic device 102 for charging the battery 150 is not properly aligned with the external electronic device 102.

In an embodiment, the processor 110 may identify a posture of the electronic device 101 positioned relative to the external electronic device 102 based on the detection, and identify whether there is a display exposed toward the outside, based on identifying whether the posture is a posture having a display exposed toward the outside of the at least one display of the electronic device 101.

In an embodiment, the processor 110 may obtain sensed values through a touch sensor in the at least one display of the electronic device 101 based on the detection, and identify whether there is a display exposed toward the outside based on the sensed values.

The processor 110 may execute operation 1206 on a condition that there is a display exposed to the outside, and execute operation 1208 on a condition that there is no display exposed to the outside.

In the operation 1206, the processor 110 may display the first screen or the second screen based on identifying that there is a display exposed to the outside.

In the operation 1208, the processor 110, based on identifying that there is no display exposed to the outside, may provide a notification to guide that the electronic device 101 is abnormally positioned relative to the external electronic device 102. For example, when no display exists exposed to the outside, it means that there is no display in a state of being viewed by the user, and therefore, the notification may be provided by means of at least one of audio signals, vibrations, or blinking. For example, referring to FIG. 12B, the processor 110 may provide such a notification by displaying a visual effect 1230 along at least one of the sides of the display in contact with the external electronic device 102 without being exposed to the outside, on condition that there is no display exposed toward the outside. In an embodiment, the visual effect may include blinking to draw the user's attention more. In an embodiment, the visual effect may be provided with a brightness greater than or equal to a predetermined brightness. For example, the brightness may change depending on the illuminance around the electronic device 101. However, the configuration is not limited thereto.

As another example, the processor 110 may output audio signals 1235 via a speaker of the electronic device 101, on condition that there is no display exposed toward the outside. In an embodiment, when the electronic device 101 has a plurality of speakers, the processor 110 may obtain voice signals through microphones of the electronic device 101 while outputting the audio signals 1235, identify a location of a user based on the strength of the voice signals obtained through each of the microphones, and output audio signals through at least one speaker disposed at a location corresponding to the identified location of the plurality of speakers. However, it is not limited thereto.

As another example, the processor 110 may output vibrations through an actuator of the electronic device 101 on condition that there is no display exposed to the outside. In an embodiment, to draw the user's attention more, the intensity of the vibrations may be increased over time. However, it is not limited thereto.

FIG. 12A shows an example of executing the operation 1204 based on detecting that the power is less than the designated power, but the conditions for executing that operation 1204 may be defined in various ways. For example, the processor 110 may identify the relative location relationship between the electronic device 101 and the external electronic device 102 based on the operations exemplified through the descriptions of FIGS. 9 to 11, and then execute the operation 1204 based on the relative location relationship.

As described above, when there is no display exposed toward the outside, the electronic device 101 may provide a notification in lieu of displaying the first screen or the second screen. Therefore, the electronic device 101 can intuitively communicate that the state of charging of the battery 150 is not in good order, thanks to providing such a notification.

Figure 13A:
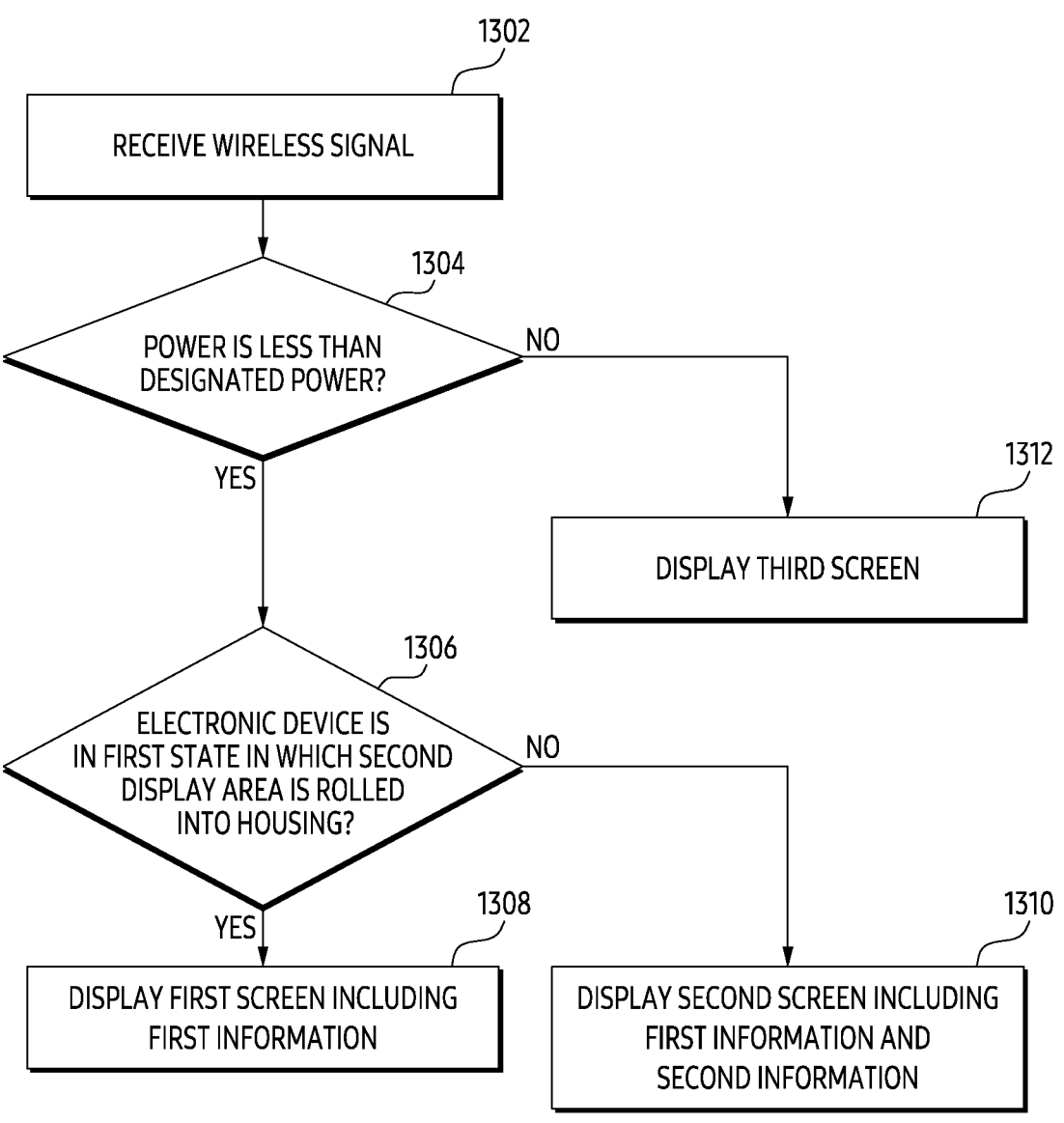
FIG. 13A is a flowchart illustrating a method of displaying a screen based on a state of an electronic device including a rollable display according to an embodiment.

FIG. 13A is a flowchart illustrating a method of displaying a screen based on a state of an electronic device including a rollable display, according to an embodiment. This method may be executed by the electronic device 101 shown in FIGS. 1A, 1B, 1C, 4A, and 4B or the processor 110 of the electronic device 101 shown in FIG. 1C.

Figure 13B:
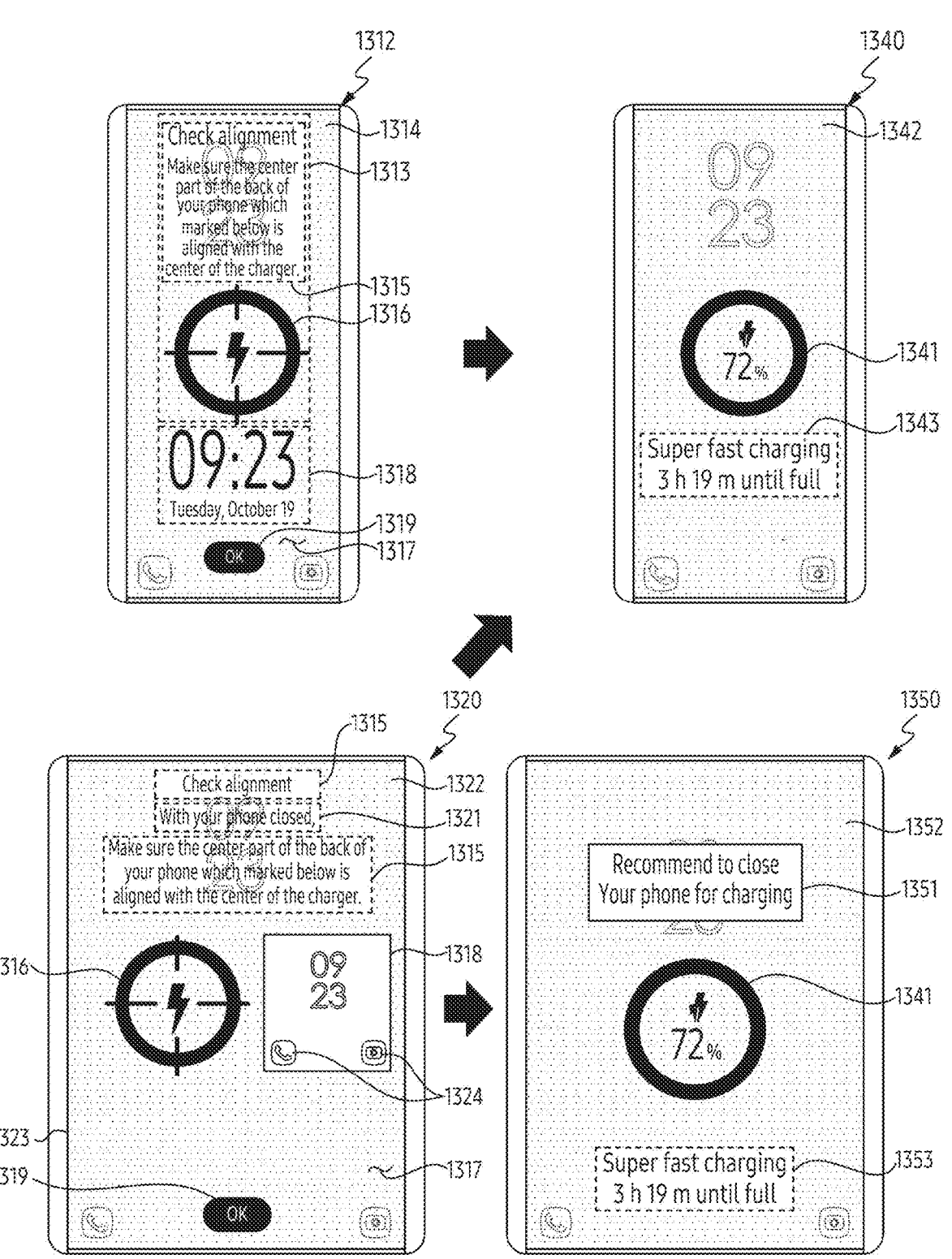
FIG. 13B illustrates examples of various screens displayed through a rollable display exposed to the outside according to an embodiment.

FIG. 13B illustrates examples of a screen displayed through a rollable display exposed toward the outside, according to an embodiment.

Referring to FIG. 13A, in operation 1302, the processor 110 may receive a wireless signal for charging the battery 150 from the external electronic device 102. For example, the wireless signal may be received from at least one coil of the external electronic device 102 through the coil 160. For example, the processor 110 may obtain the power for charging the battery 150 using a PMIC 140, based on the wireless signal received through the coil 160. For example, the processor 110 may obtain the power provided based on the wireless signal.

In operation 1304, the processor 110 may identify whether the power is less than a designated power. For example, the processor 110 may identify whether the power is less than the designated power in order to identify whether the electronic device 101 is aligned with the external electronic device 102. For example, the designated power may be a parameter defined in the electronic device 101 to identify whether the power capable of normally charging the battery 150 is obtained based on the wireless signal. For example, the designated power may be a parameter defined in the electronic device 101 to identify whether the electronic device 101 is aligned with the external electronic device 102 for charging the battery 150. In an embodiment, the designated power may be of a fixed value. In an embodiment, the designated power may be of a value capable of changing according to at least one of the capability of the electronic device 101, the state of the electronic device 101, the capability of the external electronic device 102, or the state of the external electronic device 102.

In an embodiment, the processor 110 may execute operation 1306 on condition that the power is less than the designated power, and perform operation 1311 on condition that the power is greater than or equal to the designated power.

In the operation 1306, the processor 110, based on identifying that the power is less than the designated power, may identify whether the electronic device 101 is in a first state in which a first display area of the display 125 is exposed and a second display area of the display 125 adjacent to the first display area is rolled into a housing 400, or it is in a second state in which both the first display area and the second display area are exposed. For example, the first state may be the first state defined through the description of FIGS. 4A and 4B, and the second state may be the second state defined through the description of FIGS. 4A and 4B. For example, since the electronic device 101 in the second state providing a larger size than the electronic device 101 in the first state is more likely to be unstably mounted on or positioned relative to the external electronic device 102, the processor 110 may identify whether the state of the electronic device 101 is the first state or the second state. In an embodiment, the processor 110 may execute operation 1308 on condition that the electronic device 101 is in the first state, and execute operation 1310 on condition that the electronic device 101 is in the second state.

FIG. 13A shows an example of executing the operation 1306 after executing the operation 1304, but it is only for convenience of description. The operations 1304 and 1306 may be replaced with other similar operations, respectively. For example, on condition that the power is less than the designated power and the electronic device 101 is in the first state, the processor 110 may execute the operation 1308, and on condition that the power is less than the designated power and the electronic device 101 is in the second state, the processor 110 may execute the operation 1310, and further, on condition that the power is equal to or greater than the designated power, the processor 110 may execute operation 1311. As another example, the processor 110 may execute the operation 1308 on condition that the power is less than the designated power while the electronic device 101 is in the first state, the processor 110 may execute the operation 1310 on condition that the power is less than the designated power while the electronic device 101 is in the second state, then the processor 110 may execute the operation 1311 on condition that the power is equal to or greater than the designated power. However, it is not limited thereto.

In operation 1308, the processor 110 may display a first screen including first information to guide the electronic device 101 to be aligned with the external electronic device 102 for charging the battery 150, based on identifying that the electronic device 101 is in the first state.

For example, referring to FIG. 13B, the processor 110 may provide a state 1312 based on identifying that the state of the electronic device 101 is the first state defined through the description of FIGS. 4A and 4B. In the display state 1312, the processor 110 may display a first screen 1314 including first information 1313 to guide the electronic device 101 to be aligned with the external electronic device 102 for charging the battery 150. For example, the first screen 1314 may be displayed in the first display area of the display 125 exposed out of the housing 400.

In an embodiment, in the display state 1312, the first information 1313 may include a text 1315 to guide a center part of a surface of the housing 400 to be aligned with a center part of the external electronic device 102. For example, the first information 1313 may include a visual object 1316 in an area of the first screen 1314 corresponding to the area in the housing 400 in which the coil 160 of the electronic device 101 is located. For example, the visual object 1316 may at least partially overlap at least part of the coil 160 when the display 125 is viewed from above. For example, the processor 110 may display the visual object 1316 in an area of the first screen 1314 corresponding to the area in which the coil 160 is located, so that the user of the electronic device 101 can recognize how to change the position (or posture) of the electronic device 101 or the external electronic device 102 to align the electronic device 101 with the external electronic device 102. In an embodiment, the first screen 1314 may further include an executable object 1319 for executing a function of ceasing to display the first screen 1314. However, it is not limited thereto.

In an embodiment, the first screen 1314 may be superimposed on another screen. For example, the first screen 1314 may be superimposed on a lock screen 1317. For example, the first screen 1314 may be superimposed on the screen displayed through the display 125 immediately before displaying the first screen 1314, in order to inform that the electronic device 101 is in a state different from the user's intention to charge the battery 150 of the electronic device 101. In an embodiment, the first screen 1314 may further include a visual object 618 for providing at least part of information in the screen disposed beneath the first screen 1314. For example, the processor 110 may further display in the first screen 614 a visual object 1318 for providing information on the local time within a lock screen 617 covered with displaying the first screen 614 as superimposed on the lock screen 617. However, it is not limited thereto. In an embodiment, at least part of the first screen 1314 may be formed to be translucent. For example, the processor 110 may display the first screen 1314 semi-transparently so that the user can view the information of the lock screen 1317 disposed below the first screen 1314 in the remaining area of the first screen 1314 excluding the area displaying the first information 1313. In an embodiment, the first screen 1314 may include an opaque area displaying the first information 1313 and a semi-transparent remaining area. However, it is not limited thereto.

In an embodiment, displaying on the first screen 1314 may change over time or responsive to another condition being satisfied. For example, the processor 110 may increase the luminance of the first screen 1314 to draw the user's attention, on condition that a specified time duration has elapsed from the timing of displaying the first screen 1314 or responsive to the occurrence of another condition. For example, the processor 110 may increase the size of a text 1315 in order to draw the user's attention more, on condition that a specified time duration has elapsed from the timing of displaying the first screen 1314 or responsive to the occurrence of another condition. For example, the processor 110 may change the color of the text 1315 or the visual object 1316 to draw the user's attention more, on condition that a specified time duration has elapsed from the timing of displaying the first screen 1314 or responsive to the occurrence of another condition. For example, on condition that a specified time duration has elapsed from the timing of displaying the first screen 1314 or responsive to the occurrence of another condition, the processor 110 may further display a visual effect around the text 1315 or the visual object 1316 to draw the user's attention further. For example, the processor 110 may control the display 125 to cause at least one of the text 1315 and the visual object 1316 to blink, so as to draw the user's attention more, on condition that a specified time duration has elapsed from the timing of displaying the first screen 1314 or responsive to the occurrence of another condition. According to embodiments, the processor 110 may output audio signals via a speaker of the electronic device 101 or provide vibrations through an actuator of the electronic device 101 to draw the user's attention further, in lieu of changing displaying of the first screen 1314, on condition that a specified time duration has elapsed from the timing of displaying the first screen 1314 or responsive to the occurrence of another condition. However, the configuration is not limited thereto.

In operation 1310, the processor 110 may display a second screen including the first information and second information for guiding to change the state of the electronic device 101 to the first state, based on identifying that the electronic device 101 is the second state. For example, since the width of the electronic device in the second state is wider than that of the electronic device in the first state, the stability when the electronic device 101 in the second state is positioned relative to the external electronic device 102 may be lower than stability when the electronic device 101 in the first state is positioned relative to the external electronic device 102. For example, the stability in alignment of the external electronic device 102 and the electronic device 101 in the second state may be lower than the stability in alignment of the external electronic device 102 and the electronic device 101 in the first state, and therefore, the second screen may further include the second information, unlike the first screen.

For example, referring to FIG. 13B, the processor 110 may provide a display state 1320, based on identifying that the state of the electronic device 101 is the second state defined through the description of FIGS. 4A and 4B. In the display state 1320, the processor 110 may display a second screen 1322 including the second information 1321. For example, the second screen 1322 may be displayed in the first display area and the second display area of the display 125 exposed out of the housing 400, unlike the first screen 1314.

In an embodiment, the second screen 1322 may further include second information 1321, unlike the first screen 1314. In an embodiment, the second information 1321 may include a text guiding to change the state of the electronic device 101 to the first state. Although not shown in FIG. 13B, in an embodiment, the second information 1321 may further include an image or an animation for guiding to change the state of the electronic device 101 to the first state.

In an embodiment, the visual object 1316 in the second screen 1322 may be displayed in an area adjacent to an edge 1323 of the display 125, unlike the visual object 1316 displayed in the center area of the first screen 1314. For example, since the visual object 1316 in the second screen 1322 is displayed at a position corresponding to the position where the coil 160 is disposed in the second state, the visual object 1316 in the second screen 1322 may be displayed in the area adjacent to the edge 1323 of the display 125.

In an embodiment, the second screen 1322 may be superimposed on another screen, like the first screen 1314. For example, the second screen 1322 may be superimposed on the lock screen 1317. For example, the second screen 1322 may be superimposed on the screen displayed through the display 125 immediately before displaying the second screen 1322, in order to inform that the electronic device 101 is in a state different from the user's intention to charge the battery 150 of the electronic device 101. In an embodiment, the second screen 1322 may further include a visual object 1318 for providing at least part of information in the screen disposed beneath the second screen 1322. Since the size of the second screen 1322 is larger than the size of the first screen 1314, the visual object 1318 in the second screen 1322 may provide more information than the visual object 1318 in the first screen 1314. For example, the visual object 1318 in the second screen 1322 may include a thumbnail image of a screen disposed beneath the second screen 1322, unlike the visual object 1318 in the first screen 1314. For example, the visual object 1318 in the second screen 1322 may further include at least one executable element 1324 for executing at least one function provided through a screen disposed beneath the second screen 1322, unlike the visual object 1318 in the first screen 1314. However, it is not limited thereto.

In an embodiment, displaying on the second screen 1322 may change over time, as in displaying on the first screen 1314.

Referring back to FIG. 13A, in operation 1311, the processor 110 may display a third screen including third information to guide that the battery 150 is in charging, based on identifying that the power is equal to or greater than the designated power. In an embodiment, the third screen may further include fourth information, on condition that the state of the electronic device 101 is the second state. For example, the fourth information may be displayed in the third screen to guide a recommendation to change the state of the electronic device 101 to the first state.

For example, referring to FIG. 13B, the processor 110 may provide a display state 1340 based on identifying that the power is equal to or greater than the designated power while the state of the electronic device 101 is the first state defined through the description of FIGS. 4A and 4B. For example, in the display state 1340, the processor 110 may display a third screen 1342 including third information 1341 to guide that the battery 150 is in charging, in the first display area. For example, the third information 1341 may include at least one of a visual object or a text to indicate the remaining amount of the battery 150 in charging. In an embodiment, the third screen 1342 may further include information 1343 indicating a time to be taken until the battery 150 is fully charged. However, it is not limited thereto. In an embodiment, the third screen 1342 may disappear after being displayed for a specified time duration.

For another example, the processor 110 may provide a display state 1350 based on identifying that the power is greater than or equal to the designated power while the state of the electronic device 101 is the second state defined through the description of FIGS. 4A and 4B. For example, in the display state 1350, the processor 110 may display a third screen 1352 including fourth information 1351 as well as the third information 1341. For example, the electronic device 101 in the second state is positioned relative to the external electronic device 102 in a more unstable state than the electronic device 101 in the first state, and therefore, the third screen 1352 may further include the fourth information 1351. For example, the fourth information 1351 may include a text guiding the recommendation to change the state of the electronic device 101 to the first state. For example, the third screen 1352 may further include information 1353 indicating the time to be taken until the battery 150 is fully charged, such as information 1343 in the third screen 1342. However, it is not limited thereto. In an embodiment, the third screen 1352 may disappear after being displayed for a specified time duration.

Although not shown in FIGS. 13A and 13B, based on identifying that the power is changed to the designated power or more while displaying the first screen or the second screen, the processor 110 may change the display state 1312 to the display state 1340, or change the display state 1320 to the display state 1350. In an embodiment, the processor 110 may, based on the identification, change the display state 1312 to the state 1340 via an intermediate state as a state 710, or change the display state 1320 to the state 1350 via an intermediate state as a state 720.

Figure 14:
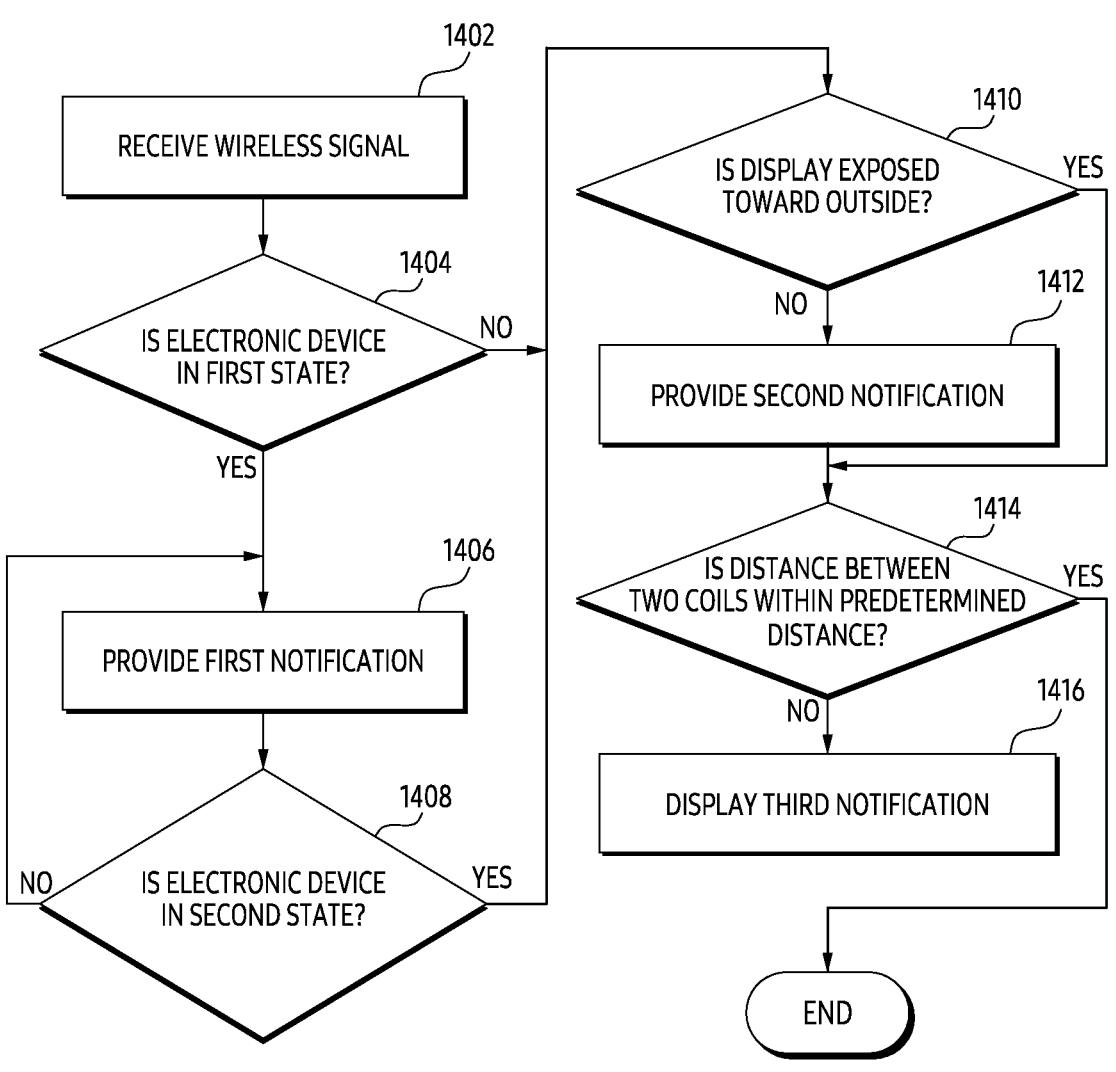
FIG. 14 is a flowchart illustrating a method of providing notifications guiding to change state of the electronic device according to an embodiment.

FIG. 14 is a flowchart illustrating a method of providing notifications guiding to change state of the electronic device according to an embodiment. This method may be applied to the electronic devices illustrated in 1B to 4B Referring to FIG. 14, in operation 1402, the processor 110 may receive a wireless signal for charging the battery 150 from the external electronic device 102. For example, the wireless signal may be received via the coil 160 from at least one coil of the external electronic device 102. For example, the processor 110 may acquire electric power for charging the battery 150, using a PMIC 140, based on the wireless signal received through the coil 160. For example, the processor 110 may obtain the power provided based on the wireless signal.

In an embodiment, the processor 110 may perform operation 1404 and the following operations 1408 to 1416 while processor 110 receives the wireless signal. In an embodiment, the processor 110 may perform operation 1404 and the following operations 1408 to 1416 while processor 110 receives the wireless signal and/or subsequent to the processor 110 receiving the wireless signal.

In the operation 1404, the processor 110 may identify whether the state of the electronic device 101 is in either a first state or a second state. For example, the second state is defined by a first total area of an exposed portion of the display 125, and the first state is defined by a second total area of an exposed portion of the display 125, the second total area being greater than the first total area. For example, if the electronic device 101 is the foldable display device illustrated in FIG. 2A to 3B, the second state may be a fully folded state of the foldable display device as shown by state 270 and state 370 of FIGS. 2B and 3B respectively, and the first state may be the other states except for the second state (e.g., one or more of the states 200, 250, 260, 300, 350, and/or 360). In another example, if the electronic device 101 is the rollable display device as shown in FIGS. 4A to 4B, the second state may a state in which a portion of the display 125 rolled into the housing as shown by the state 410 of FIG. 4A, and the first state may be other states (e.g., the state 450) except for the second state. For example, when the electronic device 101 is in the first state, and thus providing a larger size than the electronic device 101 in the second state, the electronic device 101 may be positioned relative to the external electronic device 102 in an unstable manner. The processor 110 may identify whether the state of the electronic device 101 is the first state or the second state.

In operation 1406, the processor 110, based on identifying that the state of the electronic device 101 is the first state, may provide a first notification guiding to change the first state to the second state. In a state that the display 125 is exposed toward the outside like FIG. 6B, 6C, or 13B, if the electronic device 101 is the foldable display device, the first notification may be provided by displaying the first notification like the fourth information 651 or 684 shown in FIGS. 6B and 6C, and if the electronic device 101 is the rollable display device, the first notification may be provided by displaying the first notification like the fourth information 651, 684 or 1351 shown in FIG. 6B, 6C or 13B. In a state that the display 125 is not exposed toward the outside like FIG. 12B, the first notification may be provided by audio signals through the speaker of the electronic device 101 or vibrations through the actuator of the electronic device 101, or displaying a visual effect along at least one of the sides of the display 125 like FIG. 12B.

In operation 1408, the processor 110 may detect whether the electronic device 101 is in the second state. If the electronic device 101 is in the second state, in operation 1410, the processor 110 may identify whether there is a display exposed toward the outside of at least one display of the electronic device 101 mounted on the external electronic device 102. In other words, the processor 110 may identify whether a surface of the housing on which the display 125 is not disposed faces away the external electronic device 102 like FIG. 12B.

In the operation 1412, the processor 110, based on identifying that there is no display exposed to the outside, may provide a second notification to guide that the electronic device 101 is abnormally positioned relative to the external electronic device 102. As an example, when no display is exposed to the outside (e.g., visible), it means that there is no display in a state of being viewed by the user, and therefore, the second notification may be provided by means of at least one of audio signals, vibrations, or blinking like the ways explained above with reference to FIG. 12B. As an example, when no display exists exposed to the outside, it means that there is no display in a state of being viewed by the user, and therefore, the second notification may be provided using another device, such as the wearable device 777 shown in FIG. 7C.

In operation 1414, the processor 110 may identify whether the electronic device 101 is properly aligned with the external electronic device 102. For example, the proper alignment may be determined by whether the electronic device 101 is positioned relative to the external electronic device 102 in an arrangement that a distance between the center of the coil 160 in the electronic device 101 and the center of at least one coil in the external electronic device 102 is within a certain distance (e.g., 1 cm).

In the operation 1416, the processor 110 may display a screen including information to guide the electronic device 101 to be aligned with the external electronic device 102, based on identifying that the electronic device 101 is not fittingly aligned with the external electronic device 102 using the ways explained herein.

As apparent from the foregoing, the electronic device 101 can adaptively display a screen according to the state of the electronic device 101. For example, the electronic device

101 can provide different screens depending on whether the electronic device 101 is in a first state or a second state (or some other state), on condition that the electric power is less than a designated power, so that it is possible to prevent charging of the battery 150 from being substantially not performed or abnormally performed due to a possible misalignment between an electronic device 101 and an external electronic device 102.

An electronic device according to an embodiment of the present disclosure can provide an enhanced user experience by adaptively providing a notification according to different states of the electronic device mounted onto or positioned relative to an external electronic device wirelessly providing the electric power.

As described above, an electronic device according to an embodiment includes a first housing including a first surface and a second surface opposite the first surface; a second housing including a third surface and a fourth surface opposite the third surface; a third housing including a hinge structure pivotably connecting a first side surface of the first housing and a second side surface of the second housing facing the first side surface of the first housing; a display including a flexible display disposed on the first surface and the third surface and extending across the third housing; a battery that is rechargeable; a memory configured to store instructions; and a processor, wherein the processor, when executing the instructions, is configured to receive a wireless signal for charging the battery from an external electronic device; based on detecting, while a state of the electronic device is a first state in which an angle between a first direction the first surface faces and a second direction the third surface faces is within a first range, that a power provided based on the wireless signal is less than a designated power, display, via the display, a first screen including first information guiding the electronic device to be aligned with the external electronic device for charging of the battery; and based on detecting, while the state of the electronic device is a second state in which the angle is within a second range different from the first range, that the power is less than the designated power, display, via the display, a second screen including the first information and second information guiding to change the state to the first state.

In an embodiment, the processor may be, when executing the instructions, further configured to, based on detecting, while the state of the electronic device is the first state, that the power is greater than or equal to the designated power, display, via the display, a third screen including third information guiding that the battery is being charged. In an embodiment, the processor may be, when executing the instructions, further configured to, in response to detecting, while displaying the first screen, that the power is greater than or equal to the designated power, switch the first screen displayed via the display to a fourth screen including fourth information guiding that the electronic device is aligned with the external electronic device, and after displaying via the at least one display the fourth screen for a designated time duration, switch the fourth screen to the third screen.

In an embodiment, the display may include a first display which is the flexible display and a second display disposed on the fourth surface, wherein the first screen may be displayed via the second display of the first display and the second display, and wherein the second screen may be displayed via the first screen of the first display and the second display.

In an embodiment, the display may include a first display which is the flexible display and a second display disposed on the second surface, wherein the first screen may be displayed via the second display of the first display and the second display, and wherein the second screen may be displayed via the first screen of the first display and the second display.

In an embodiment, the electronic device further includes a coil operatively coupled with the battery, the coil being used for receiving the wireless signal; and a UWB communication circuitry, wherein the processor may be, when executing the instructions, further configured to: emit, via the UWB communication circuitry, a first signal toward the external electronic device, based on at least one signal received from the external electronic device through the at least one coil before receiving the wireless signal from the external electronic device; receive, via the UWB communication circuitry, a second signal in which at least a portion of the first signal is reflected by the external electronic device; identify, based on the first signal and the second signal, a relative location relationship between the electronic device and the external electronic device; and display, further based on the relative location relationship, the first screen or the second screen.

In an embodiment, the electronic device further includes NFC circuitry, wherein the processor is, when executing the instructions, further configured to identify, based on a signal transmitted via the NFC circuitry to the external electronic device or received via the NFC circuitry from the external electronic device while receiving the wireless signal, a relative location relationship between the electronic device and the external electronic device, and display, further based on the relative location relationship, the first screen or the second screen.

In an embodiment, the electronic device further includes a first coil operatively coupled with the battery, the coil being used for receiving the wireless signal, and a second coil electrically separated from the first coil, wherein the processor is, when executing the instructions, further configured to, while receiving the wireless signal through the first coil, receive the wireless signal or receive another wireless signal distinct from the wireless signal, through the second coil from the external electronic device, identify a relative location relationship between the electronic device and the external electronic device, based on the wireless signal received through the second coil or the other wireless signal received through the second coil, and display, further based on the relative location relationship, the first screen or the second screen.

In an embodiment, the processor may be, when executing the instructions, further configured to display the first screen or the second screen, at least partially superimposed on a third screen displayed via the display before the detection, wherein the first screen or the second screen at least partially superimposed on the third screen may be translucent such that at least portion of the third screen is visible.

In an embodiment, the electronic device further includes a coil operatively coupled with the battery, the coil being used for receiving the wireless signal, wherein the first information may include a visual object for indicating a location of center of the coil. In an embodiment, the first information further includes another visual object for indicating a location of center of a coil in the external electronic device used for transmitting the wireless signal.

In an embodiment, the electronic device further includes a communication circuitry, wherein the processor may be, when executing the instructions, further configured to, based on identifying that a designated time duration has elapsed after displaying the first screen or the second screen, identify whether the power is changed from a first power less than the designated power to a second power greater than or equal to the designated power, and based on identifying that the power is not changed from the first power to the second power, transmit, via the communication circuitry to a wearable electronic device, a message for providing through the wearable electronic device a notification guiding the electronic device to be aligned with the external electronic device. In an embodiment, the processor may be, when executing the instructions, further configured to, on condition that the wearable electronic device is earbuds worn by a user of the electronic device, transmit, via the communication circuitry to the wearable electronic device, the message for outputting the notification through a speaker of the wearable electronic device, and on condition that the wearable electronic device is a watch worn by the user of the electronic device, transmit, via the communication circuitry to the wearable electronic device, the message for displaying the notification through a display of the wearable electronic device.

In an embodiment, the electronic device further includes a coil operatively coupled with the battery, the coil being used for receiving the wireless signal, wherein the processor is, when executing the instructions, configured to, identify the designated power, based on a signal exchanged with the external electronic device through the coil by using in-band communication before receiving the wireless signal, and detect, while receiving the wireless signal through the coil from the external electronic device, whether the power is less than the designated power.

In an embodiment, the electronic device further includes a sensor, wherein the display may include a first display which is the flexible display and a second display disposed on the fourth surface, and wherein the processor may be, when executing the instructions, further configured to, based on detecting, while the state is the first state and the second surface is brought into contact with the external electronic device, that the power is less than the designated power, display the first screen via the second display of the first display and the second display, based on detecting, while the state is the second state and the second surface is brought into contact with the external electronic device, that the power is less than the designated power, display the second screen via the first display of the first display and the second display, and based on detecting, while the state is the first state or the second state, that for charging of the battery the fourth surface is brought into contact with the external electronic device, through the sensor, provide a notification guiding that the electronic device is abnormally positioned relative to the external electronic device. In an embodiment, the notification may be outputted through a speaker of the electronic device, provided through vibrations of an actuator of the electronic device, or displayed along at least a portion of sides of the second display.

In an embodiment, the display may include a first display which is the flexible display and a second display disposed on the second surface, wherein the processor may be, when executing the instructions, further configured to, based on detecting, while the state is the first state and the fourth surface is brought into contact with the external electronic device, that the power is less than the designated power, display the first screen via the second display of the first display and the second display, based on detecting, while the state is the second state and the fourth surface is brought into contact with the external electronic device, that the power is less than the designated power, display the second screen via the first display of the first display and the second display, and based on detecting, while the state is the first state or the second state, that for charging of the battery the second surface is brought into contact with the external electronic device, through the sensor, based on the power less than the designated power, provide a notification guiding that the electronic device is abnormally positioned relative to the external electronic device.

As described above, an electronic device according to an embodiment includes a housing, a display rollable into the housing, a battery that is rechargeable, a memory configured to store instructions, and a processor, the processor, when executing the instructions, may be configured to receive, from an external electronic device, a wireless signal for charging the battery, based on detecting, while the electronic device is in a first state in which a first display area of the display is exposed and a second display area of the display adjacent to the first display area is at least partially rolled into the housing, that a power provided based on the wireless signal is less than a designated power, display, within the first display area, a first screen including first information guiding the electronic device to be aligned with the external electronic device for charging of the battery, and based on detecting, while the electronic device is in a second state in which both the first display area and the second display area are exposed, that the power is less than the designated power, display, within the first display area and the second display area, a second screen including the first information and second information guiding to change the state of the electronic device to the first state.

In an embodiment, the processor, when executing the instructions, may be further configured to, based on detecting, while the electronic device is in the first state, that the power is greater than or equal to the designated power, display, within the first display area, a third screen including third information guiding that the battery is being charged. In an embodiment, the processor, when executing the instructions, may be further configured to, in response to detecting, while the first information is displayed, that the power is greater than or equal to the designated power, switch the first screen displayed within the first display area to a fourth screen including fourth information guiding that the electronic device is aligned with the external electronic device, and after displaying the fourth screen within the first display area for a designated time duration, switch the fourth screen to the third screen.

As described above, an electronic device according to an embodiment includes a first housing, a second housing that is caused to move or rotate with respect to the first housing, a first antenna within the first housing, a second antenna within the second housing, a flexible display that is deformed according to movement or rotation of the second housing with respect to the first housing, a battery that is rechargeable, a charging circuit, a sensing circuit, a memory configured to: store instructions, and a processor, when executing the instructions, configured to charge the battery using the charging circuit, based on a wireless signal received from an external electronic device via the first antenna; in response to identifying that the power for charging of the battery is less than a designated power, based on the wireless signal received via the second antenna from the external electronic device, identify a relative location relationship between at least one of the first antenna or the second antennas and at least one coil of the external electronic device using the sensing circuit; and based on the relative location relationship, display information to inform that the electronic device is to be aligned with the external electronic device, using the flexible display.

According to an embodiment, the information may be displayed in a portion of the flexible display, located on the first antenna in the first housing, or a portion of the flexible display, located on the second antenna in the second housing. According to an embodiment, the processor may be configured to, when the instructions are executed, in response to identifying that the power is equal to or greater than the designated power, display other information indicating that the battery is being charged, using the flexible display.

The electronic device according to various embodiments disclosed in this document may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software including one or more instructions that are stored in a storage medium (e.g., a memory 120) that is readable by a machine (e.g., an electronic device 101). For example, a processor (e.g., a processor 110) of the machine (e.g., an electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first housing part and
   a second housing part rotatably coupled to the first housing part between a folded state and an unfolded state;
   a display including:
   a first display, including a portion bent when the electronic device is in the folded state, visible from a front side of the first housing part and a front side of the second housing part, and
   a second display visible from a rear side of the second housing part;
   a battery that is rechargeable;
   memory comprising one or more storage media storing instructions; and at least one processor comprising processing circuitry,
wherein the instructions, when executed by the at least
one processor, cause the electronic device to:
receive a wireless signal for charging the battery from
an external electronic device;
identify power provided by the wireless signal;
based on the power provided by the wireless signal
being identified in the folded state as less than a
defined power, display, via the second display, a first
screen including first information guiding the elec-
tronic device to be aligned with the external elec-
tronic device for charging of the battery; and
based on the power being identified in the unfolded
state of the electronic device as less than the defined
power, display, via the first display, a second screen
including the first information and second informa-
tion guiding to change a state of the electronic device
to the folded state.

2. The electronic device of claim 1, wherein the instruc-
tions, when executed by the at least one processor, cause the
electronic device to, based on the power being identified as
greater than the defined power, display, via the first display
or the second display, a third screen including third infor-
mation guiding that the battery is being charged.

3. The electronic device of claim 2, wherein the instruc-
tions, when executed by the at least one processor, cause the
electronic device to:
in response to the power being identified as greater than
the defined power, switch the first screen displayed via
the second display to a fourth screen including fourth
information guiding that the electronic device is
aligned with the external electronic device; and
after displaying via the second display the fourth screen
for a designated time duration, switch the fourth screen
to the third screen.

4. The electronic device of claim 1, further comprising:
a coil electrically connected to the battery, the coil being
used for receiving the wireless signal; and
ultra-wide band (UWB) communication circuitry,
wherein the instructions, when executed by the at least
one processor, cause the electronic device to:
radiate, via the UWB communication circuitry, a first
signal, based on at least one signal received from the
external electronic device through the coil before
receiving the wireless signal from the external elec-
tronic device;
receive, via the UWB communication circuitry, a sec-
ond signal in which at least a portion of the first
signal is reflected by the external electronic device;
identify, based on the first signal and the second signal,
a relative location relationship between the elec-
tronic device and the external electronic device; and
display, further based on the relative location relation-
ship, the first screen or the second screen.

5. The electronic device of claim 1, further comprising:
near field communication (NFC) circuitry,
wherein the instructions, when executed by the at least
one processor, cause the electronic device to:
identify, based on a signal transmitted via the NFC
circuitry to the external electronic device or received
via the NFC circuitry from the external electronic
device while receiving the wireless signal, a relative
location relationship between the electronic device
and the external electronic device; and
display, further based on the relative location relation-
ship, the first screen or the second screen.

6. The electronic device of claim 1, further comprising:
a first coil electrically connected to the battery, the first
coil being used for receiving the wireless signal; and
a second coil electrically separated from the first coil,
wherein the instructions, when executed by the at least
one processor, cause the electronic device to:
while receiving the wireless signal through the first
coil, receive the wireless signal or receive another
wireless signal distinct from the wireless signal,
through the second coil from the external electronic
device;
identify a relative location relationship between the
electronic device and the external electronic device,
based on the wireless signal received through the
second coil or the other wireless signal received
through the second coil; and
display, further based on the relative location relation-
ship, the first screen or the second screen.

7. The electronic device of claim 1, wherein the instruc-
tions, when executed by the at least one processor, cause the
electronic device to:
display the first screen or the second screen, at least
partially superimposed on a third screen displayed via
the display before the power is identified as less than
the defined power,
wherein the first screen or the second screen at least
partially superimposed on the third screen is translucent
such that at least portion of the third screen is visible.

8. The electronic device of claim 1, further comprising:
a coil electrically connected to the battery, the coil being
used for receiving the wireless signal,
wherein the first information includes a visual object for
indicating a location of center of the coil.

9. The electronic device of claim 8, wherein the first
information further includes another visual object for indi-
cating a location of center of a coil in of the external
electronic device used for transmitting the wireless signal.

10. The electronic device of claim 1, further comprising:
communication circuitry,
wherein the instructions, when executed by the at least
one processor, cause the electronic device to:
based on identifying that a defined time duration
elapses after displaying the first screen or the second
screen, identify whether the power is changed from
a first power less than the defined power to a second
power greater than the defined power; and
based on identifying that the power is not changed from
the first power to the second power, transmit, via the
communication circuitry to a wearable electronic
device, a message for providing through the wear-
able electronic device a notification guiding the
electronic device to be aligned with the external
electronic device.

11. The electronic device of claim 10, wherein the instruc-
tions, when executed by the at least one processor, cause the
electronic device to:
on condition that the wearable electronic device is ear-
buds worn by a user of the electronic device, transmit,
via the communication circuitry to the wearable elec-
tronic device, the message for outputting the notifica-
tion through a speaker of the wearable electronic
device; and
on condition that the wearable electronic device is a watch
worn by the user of the electronic device, transmit, via
the communication circuitry to the wearable electronic
device, the message for displaying the notification
through a display of the wearable electronic device.

12. The electronic device of claim 1, further comprising:
a coil electrically connected to the battery, the coil being used for receiving the wireless signal,
wherein the instructions, when executed by the at least one processor, cause the electronic device to:
    identify the defined power, based on a signal exchanged with the external electronic device through the coil by using in-band communication before receiving the wireless signal; and
    identify, while receiving the wireless signal through the coil from the external electronic device, whether the power is less than the designated power.

13. The electronic device of claim 1, further comprising:
a sensor,
wherein the instructions, when executed by the at least one processor, cause the electronic device to:
    based on the power being identified in the folded state as less than the defined power and a rear side of the first housing part being identified via the sensor as contacted with the external electronic device, display the first screen via the second display of the first display and the second display;
    based on the power being identified in the unfolded state as less than the defined power and the rear side of the first housing part being identified via the sensor as contacted with the external electronic device, display the second screen via the first display; and
    based on the rear side of the second housing part being identified in the unfolded state or the folded state via the sensor as contacted with the external electronic device, provide a notification guiding that the electronic device is abnormally positioned relative to the external electronic device.

14. The electronic device of claim 13, wherein the notification is outputted through a speaker of the electronic device, provided through vibrations of an actuator of the electronic device, or displayed along at least a portion of sides of the second display.

15. An electronic device comprising:
    a housing including a first housing part and a second housing part configured to movably engage with the first housing part between a retracted state of the housing and an extended state of the housing;
    a flexible display coupled to the first and second housing parts such that a size of an area of the flexible display visible from a front side of the housing changes as a state of the housing is changed between the retracted state and the extended state;
    a battery that is rechargeable;
    memory comprising one or more storage media storing instructions; and
    at least one processor comprising processing circuitry,
    wherein the instructions, when executed by the at least one processor, cause the electronic device to:
    receive a wireless signal for charging the battery from an external electronic device; identify power provided by the wireless signal;
        based on the power provided by the wireless signal being identified in the retracted state as less than a defined power, display, via the flexible display, a first screen including first information guiding the electronic device to be aligned with the external electronic device for charging of the battery; and
        based on the power being identified in the extended state of the electronic device as less than the defined power, display, via the flexible display, a second screen including the first information and second information guiding to change a state of the electronic device to the retracted state.

16. The electronic device of claim 15, wherein the instructions, when executed by the at least one processor, cause the electronic device to, based on the power being identified as greater than the defined power, display, via the flexible display, a third screen including third information guiding that the battery is being charged.

17. The electronic device of claim 16, wherein the instructions, when executed by the at least one processor, cause the electronic device to:
    in response to the power being identified as greater than the defined power, switch the first screen displayed via the flexible display to a fourth screen including fourth information guiding that the electronic device is aligned with the external electronic device; and
    after displaying via the flexible display the fourth screen for a designated time duration, switch the fourth screen to the third screen.

18. The electronic device of claim 15, further comprising:
a coil electrically connected to the battery, the coil being used for receiving the wireless signal; and
ultra-wide band (UWB) communication circuitry,
wherein the instructions, when executed by the at least one processor, cause the electronic device to:
    radiate, via the UWB communication circuitry, a first signal, based on at least one signal received from the external electronic device through the coil before receiving the wireless signal from the external electronic device;
    receive, via the UWB communication circuitry, a second signal in which at least a portion of the first signal is reflected by the external electronic device;
    identify, based on the first signal and the second signal, a relative location relationship between the electronic device and the external electronic device; and
    display, further based on the relative location relationship, the first screen or the second screen.

19. The electronic device of claim 15, further comprising:
near field communication (NFC) circuitry,
wherein the instructions, when executed by the at least one processor, cause the electronic device to:
    identify, based on a signal transmitted via the NFC circuitry to the external electronic device or received via the NFC circuitry from the external electronic device while receiving the wireless signal, a relative location relationship between the electronic device and the external electronic device; and
    display, further based on the relative location relationship, the first screen or the second screen.

20. The electronic device of claim 15, further comprising:
a first coil electrically connected to the battery, the first coil being used for receiving the wireless signal; and
a second coil electrically separated from the first coil,
wherein the instructions, when executed by the at least one processor, cause the electronic device to:
    while receiving the wireless signal through the first coil, receive the wireless signal or receive another wireless signal distinct from the wireless signal, through the second coil from the external electronic device;
    identify a relative location relationship between the electronic device and the external electronic device, based on the wireless signal received through the second coil or the other wireless signal received through the second coil; and display, further based on the relative location relation-
ship, the first screen or the second screen.

\* \* \* \* \*